(12) United States Patent
Rosenthal et al.

(10) Patent No.: US 8,589,280 B2
(45) Date of Patent: *Nov. 19, 2013

(54) METHOD AND SYSTEM FOR PROVIDING AUTOMATIC EXECUTION OF GRAY BOX STRATEGIES FOR ELECTRONIC TRADING

(75) Inventors: Leslie Rosenthal, Chicago, IL (US); J. Robert Collins, Burr Ridge, IL (US)

(73) Assignee: Rosenthal Collins Group, LLC, Chicago, IL (US)

( * ) Notice: Subject to any disclaimer, the term of this patent is extended or adjusted under 35 U.S.C. 154(b) by 365 days.

This patent is subject to a terminal disclaimer.

(21) Appl. No.: 12/898,833

(22) Filed: Oct. 6, 2010

(65) Prior Publication Data

US 2011/0035308 A1  Feb. 10, 2011

Related U.S. Application Data

(63) Continuation-in-part of application No. 12/881,740, filed on Sep. 14, 2010, which is a continuation-in-part of application No. 11/417,596, filed on May 4, 2006, now Pat. No. 7,801,801.

(60) Provisional application No. 60/678,106, filed on May 4, 2005.

(51) Int. Cl.
*G06Q 40/00* (2012.01)

(52) U.S. Cl.
USPC .................................. 705/37; 705/35; 705/36

(58) Field of Classification Search
USPC .......................................................... 705/37
See application file for complete search history.

(56) References Cited

U.S. PATENT DOCUMENTS

| | | | |
|---|---|---|---|
| 5,136,501 A | 8/1992 | Silverman |
| 5,168,446 A | 12/1992 | Wiseman |
| 5,297,031 A | 3/1994 | Gutterman |
| 5,412,769 A | 5/1995 | Maruoka et al. |
| 5,555,357 A | 9/1996 | Fernandes et al. |
| 5,600,346 A | 2/1997 | Kamata et al. |
| 5,704,050 A | 12/1997 | Redpath |
| 5,774,877 A | 6/1998 | Patterson, Jr. et al. |
| 5,777,874 A | 7/1998 | Flood et al. |
| 5,796,402 A | 8/1998 | Ellison-Taylor |
| 5,799,151 A | 8/1998 | Hoffer |

(Continued)

OTHER PUBLICATIONS

Partial International Search Report for PCT/US2006/043,726, Sep. 11, 2007.

(Continued)

*Primary Examiner* — Hai Tran
(74) *Attorney, Agent, or Firm* — Marshall, Gerstein & Borun LLP

(57) ABSTRACT

A method and system for providing automatic execution of gray box trading strategies for electronic trading. A gray box trading entity is created from two or more real or synthetic trading entities including real or synthetic contracts or financial instruments. The gray box trading entity includes a black box portion (automatic trade execution) and a white box portion (manual trade execution). An electronic trader selects trades for black box and white box trades in the gray box trading entity. The trades can be dynamically changed. Selected trades for gray box trading entity are automatically traded with a black box trading entity on one or more electronic trading exchanges while a trader is prompted to manually execute selected other trades for the gray box trading entity with a white box trading entity.

16 Claims, 21 Drawing Sheets

(56) References Cited

U.S. PATENT DOCUMENTS

| | | |
|---|---|---|
| 5,801,699 A | 9/1998 | Hocker |
| 5,809,483 A | 9/1998 | Broka et al. |
| 5,835,090 A | 11/1998 | Clark et al. |
| 5,873,071 A | 2/1999 | Ferstenberg |
| 5,924,083 A | 7/1999 | Silverman |
| 5,977,973 A | 11/1999 | Sobenski et al. |
| 6,014,643 A | 1/2000 | Minton |
| 6,016,483 A | 1/2000 | Rickard |
| 6,029,146 A | 2/2000 | Hawkins |
| 6,058,379 A | 5/2000 | Odom |
| 6,088,027 A | 7/2000 | Konar et al. |
| 6,134,535 A | 10/2000 | Belzberg |
| 6,209,004 B1 | 3/2001 | Taylor |
| 6,211,880 B1 | 4/2001 | Impink |
| 6,216,126 B1 | 4/2001 | Ronstrom |
| 6,317,728 B1 | 11/2001 | Kane |
| 6,343,278 B1 | 1/2002 | Jain |
| 6,408,282 B1 | 6/2002 | Buist |
| 6,418,419 B1 | 7/2002 | Nieboer |
| 6,421,653 B1 | 7/2002 | May |
| 6,505,175 B1 | 1/2003 | Silverman |
| 6,513,019 B2 | 1/2003 | Lewis |
| 6,519,574 B1 | 2/2003 | Wilton |
| H2064 H | 5/2003 | Buchalter |
| 6,615,188 B1 | 9/2003 | Breen |
| 6,766,304 B2 | 7/2004 | Kemp, II et al. |
| 6,772,132 B1 | 8/2004 | Kemp, II et al. |
| 6,828,968 B1 | 12/2004 | Tenorio |
| 6,850,907 B2 | 2/2005 | Lutnick |
| 6,868,400 B1 | 3/2005 | Sundaresan |
| 6,892,186 B1 | 5/2005 | Preist |
| 6,938,011 B1 | 8/2005 | Kemp, II et al. |
| 6,963,856 B2 | 11/2005 | Lutnick |
| 6,993,504 B1 | 1/2006 | Friesen et al. |
| 6,996,540 B1 | 2/2006 | May |
| 7,003,486 B1 | 2/2006 | Condamoor |
| 7,020,626 B1 | 3/2006 | Eng et al. |
| 7,020,632 B1 | 3/2006 | Kohls |
| 7,024,632 B1 | 4/2006 | Stuart |
| 7,062,459 B1 | 6/2006 | Herbst et al. |
| 7,080,033 B2 | 7/2006 | Wilton et al. |
| 7,099,661 B1 | 8/2006 | Longbottom et al. |
| 7,113,190 B2 | 9/2006 | Heaton |
| 7,113,924 B2 | 9/2006 | Fishbain |
| 7,117,450 B1 | 10/2006 | Chaudhri |
| 7,124,110 B1 | 10/2006 | Kemp, II et al. |
| 7,127,424 B2 | 10/2006 | Kemp, II et al. |
| 7,130,789 B2 | 10/2006 | Glodjo |
| 7,146,336 B2 | 12/2006 | Olsen |
| 7,155,410 B1 | 12/2006 | Woodmansey |
| 7,177,833 B1 | 2/2007 | Marynowski |
| 7,184,984 B2 | 2/2007 | Glodjo |
| D538,294 S | 3/2007 | Noviello et al. |
| D538,295 S | 3/2007 | Noviello et al. |
| D538,815 S | 3/2007 | Noviello et al. |
| D538,816 S | 3/2007 | Noviello et al. |
| D538,817 S | 3/2007 | Noviello et al. |
| D538,818 S | 3/2007 | Noviello et al. |
| D539,297 S | 3/2007 | Noviello et al. |
| 7,197,483 B2 | 3/2007 | Brady et al. |
| D539,807 S | 4/2007 | Noviello et al. |
| 7,212,999 B2 | 5/2007 | Friesen |
| 7,218,325 B1 | 5/2007 | Buck |
| 7,228,289 B2 | 6/2007 | Brumfield |
| 7,243,083 B2 | 7/2007 | Burns |
| D549,717 S | 8/2007 | Noviello et al. |
| D551,675 S | 9/2007 | Noviello et al. |
| 7,272,580 B2 | 9/2007 | Brady et al. |
| D552,617 S | 10/2007 | Noviello et al. |
| D553,139 S | 10/2007 | Noviello et al. |
| D553,140 S | 10/2007 | Noviello et al. |
| D553,141 S | 10/2007 | Noviello et al. |
| D554,653 S | 11/2007 | Noviello et al. |
| D558,213 S | 12/2007 | Noviello et al. |
| D559,259 S | 1/2008 | Noviello et al. |
| D559,260 S | 1/2008 | Noviello et al. |
| 7,337,140 B2 | 2/2008 | Brady et al. |
| 7,348,981 B1 | 3/2008 | Buck |
| 7,359,879 B1 | 4/2008 | Braig et al. |
| 7,363,272 B1 | 4/2008 | Braig et al. |
| 7,366,691 B1 | 4/2008 | Kemp, II |
| 7,373,327 B1 | 5/2008 | Kemp, II |
| 7,389,258 B2 | 6/2008 | Brumfield |
| 7,389,264 B2 | 6/2008 | Kemp, II |
| 7,389,268 B1 | 6/2008 | Kemp, II et al. |
| 7,392,219 B2 | 6/2008 | Singer |
| 7,403,921 B2 | 7/2008 | Tanpoco |
| 7,412,416 B2 | 8/2008 | Friesen |
| 7,418,422 B2 | 8/2008 | Burns |
| 7,424,450 B2 | 9/2008 | Kemp, II et al. |
| 7,426,490 B1 | 9/2008 | Borsand |
| 7,426,491 B1 | 9/2008 | Singer |
| 7,437,325 B2 | 10/2008 | Kemp, II et al. |
| 7,447,655 B2 | 11/2008 | Brumfield |
| 7,454,382 B1 | 11/2008 | Triplett |
| 7,461,026 B2 | 12/2008 | Schluetter |
| 7,483,850 B1 | 1/2009 | Fishbain et al. |
| 7,483,854 B2 | 1/2009 | Liu |
| 7,483,855 B1 | 1/2009 | Borsand et al. |
| 7,487,125 B2 | 2/2009 | Littlewood |
| 7,505,932 B2 | 3/2009 | Kemp, II et al. |
| 7,509,276 B2 | 3/2009 | Brumfield et al. |
| 7,509,283 B2 | 3/2009 | Friesen et al. |
| 7,512,557 B1 | 3/2009 | Fishbain et al. |
| 7,512,561 B2 | 3/2009 | Burns |
| 7,523,064 B2 | 4/2009 | Burns et al. |
| 7,533,056 B2 | 5/2009 | Friesen et al. |
| 7,536,328 B2 | 5/2009 | Singer et al. |
| 7,536,339 B1 | 5/2009 | Burns |
| 7,536,344 B2 | 5/2009 | Singer et al. |
| 7,536,345 B1 | 5/2009 | Burns |
| 7,539,640 B2 | 5/2009 | Burns et al. |
| 7,539,643 B2 | 5/2009 | Cummings et al. |
| 7,542,937 B1 | 6/2009 | Cohen |
| 7,542,938 B1 | 6/2009 | Tam |
| 7,542,940 B2 | 6/2009 | Burns et al. |
| 7,542,941 B1 | 6/2009 | Cohen |
| 7,546,550 B1 | 6/2009 | Buck |
| 7,548,882 B1 | 6/2009 | Pazner |
| 7,552,073 B1 | 6/2009 | Brumfield et al. |
| 7,552,077 B1 | 6/2009 | Schluetter et al. |
| 7,555,456 B2 | 6/2009 | Rosenthal et al. |
| 7,555,457 B2 | 6/2009 | Burns et al. |
| 7,558,750 B1 | 7/2009 | Zagara et al. |
| 7,558,754 B1 | 7/2009 | Singer et al. |
| 7,559,036 B1 | 7/2009 | Buck |
| 7,562,038 B1 | 7/2009 | Brumfield et al. |
| 7,562,044 B1 | 7/2009 | Tenorio |
| 7,562,047 B2 | 7/2009 | Friesen et al. |
| 7,565,315 B2 | 7/2009 | West et al. |
| 7,565,317 B1 | 7/2009 | West et al. |
| 7,565,318 B2 | 7/2009 | Tanpoco et al. |
| 7,565,319 B1 | 7/2009 | Strauss et al. |
| 7,567,929 B2 | 7/2009 | Kemp, II et al. |
| 7,567,930 B1 | 7/2009 | Schluetter et al. |
| 7,567,932 B1 | 7/2009 | Salvadori et al. |
| 7,571,134 B1 | 8/2009 | Burns et al. |
| 7,574,388 B1 | 8/2009 | Peebler |
| 7,574,391 B1 | 8/2009 | Monroe et al. |
| 7,574,397 B1 | 8/2009 | Kline |
| 7,577,600 B1 | 8/2009 | Zagara et al. |
| 7,577,602 B1 | 8/2009 | Singer |
| 7,577,607 B2 | 8/2009 | Singer |
| 7,577,608 B1 | 8/2009 | Mintz |
| 7,580,881 B2 | 8/2009 | Singer et al. |
| 7,580,882 B2 | 8/2009 | West |
| 7,580,883 B2 | 8/2009 | Borts |
| 7,584,130 B1 | 9/2009 | Schluetter |
| 7,584,140 B2 | 9/2009 | Brady et al. |
| 7,584,141 B1 | 9/2009 | Andrews |
| 7,584,142 B1 | 9/2009 | Kline |
| 7,584,143 B2 | 9/2009 | West |
| 7,584,144 B2 | 9/2009 | Friesen |
| 7,587,347 B2 | 9/2009 | Griffin et al. |

(56) References Cited

U.S. PATENT DOCUMENTS

| | | |
|---|---|---|
| 7,587,356 B2 | 9/2009 | West |
| 7,587,357 B1 | 9/2009 | Buck |
| 7,590,576 B1 | 9/2009 | Zagara et al. |
| 7,590,578 B2 | 9/2009 | Burns et al. |
| 7,590,587 B2 | 9/2009 | Duquette |
| 7,596,528 B1 | 9/2009 | Herz |
| 7,599,867 B1 | 10/2009 | Monroe |
| 7,599,868 B1 | 10/2009 | Tanpoco |
| 7,599,880 B1 | 10/2009 | Tam |
| 7,603,290 B1 | 10/2009 | Tenorio |
| 7,603,303 B1 | 10/2009 | Kraus et al. |
| 7,603,309 B2 | 10/2009 | Griffin et al. |
| 7,606,748 B1 | 10/2009 | Brumfield et al. |
| 7,610,237 B1 | 10/2009 | Strauss et al. |
| 7,610,240 B2 | 10/2009 | Mintz et al. |
| 7,613,651 B1 | 11/2009 | Buck |
| 7,617,149 B2 | 11/2009 | Rosenthal et al. |
| 7,620,566 B2 | 11/2009 | Tenorio |
| 7,620,575 B1 | 11/2009 | Tenorio |
| 7,620,576 B1 | 11/2009 | Andrews et al. |
| 7,620,579 B2 | 11/2009 | West et al. |
| 7,620,586 B2 | 11/2009 | Rosenthal et al. |
| 7,620,587 B2 | 11/2009 | Duquette |
| 7,620,588 B1 | 11/2009 | Duquette |
| 7,624,063 B1 | 11/2009 | Andrews |
| 7,624,064 B2 | 11/2009 | Rosenthal et al. |
| 7,627,517 B2 | 12/2009 | Badenhorst et al. |
| 7,627,518 B1 | 12/2009 | West |
| 7,627,519 B2 | 12/2009 | Burns |
| 7,629,975 B2 | 12/2009 | Buck |
| 7,634,437 B1 | 12/2009 | Tanpoco |
| 7,640,206 B1 | 12/2009 | O'Connor et al. |
| 7,640,207 B1 | 12/2009 | Tanpoco |
| 7,644,030 B2 | 1/2010 | Burns et al. |
| 7,647,266 B1 | 1/2010 | Triplett |
| 7,650,305 B1 | 1/2010 | Tenorio |
| 7,653,589 B1 | 1/2010 | Schluetter et al. |
| 7,668,767 B1 | 2/2010 | Borsand |
| 7,672,895 B2 | 3/2010 | Mintz et al. |
| 7,672,896 B2 | 3/2010 | Burns et al. |
| 7,672,898 B1 | 3/2010 | McNicholas |
| 7,676,411 B2 | 3/2010 | Kemp, II et al. |
| 7,680,723 B2 | 3/2010 | Friesen et al. |
| 7,680,724 B2 | 3/2010 | Kemp et al. |
| 7,680,727 B2 | 3/2010 | Kemp, II et al. |
| 7,685,042 B1 | 3/2010 | Monroe et al. |
| 7,685,049 B1 | 3/2010 | Singer |
| 7,685,055 B2 | 3/2010 | Brumfield et al. |
| 7,689,499 B1 | 3/2010 | Duquette |
| 7,693,768 B2 | 4/2010 | Kemp, II et al. |
| 7,701,456 B1 | 4/2010 | Buck |
| 7,702,562 B1 | 4/2010 | Tenorio |
| 7,702,566 B2 | 4/2010 | Kemp, II et al. |
| 7,702,568 B1 | 4/2010 | Tanpoco |
| 7,702,569 B1 | 4/2010 | Tanpoco |
| 7,707,086 B2 | 4/2010 | Burns et al. |
| 7,707,098 B2 | 4/2010 | West et al. |
| 7,711,630 B2 | 5/2010 | O'Connor et al. |
| 7,711,631 B2 | 5/2010 | Singer et al. |
| 7,716,112 B1 | 5/2010 | Highland |
| 7,725,382 B2 | 5/2010 | Kemp, II et al. |
| 7,729,978 B2 | 6/2010 | Mintz et al. |
| 7,734,528 B1 | 6/2010 | O'Connor et al. |
| 7,734,532 B2 | 6/2010 | Fishbain |
| 7,734,533 B2 | 6/2010 | Mackey et al. |
| 7,734,535 B1 | 6/2010 | Burns |
| 7,739,164 B1 | 6/2010 | West et al. |
| 7,739,184 B1 | 6/2010 | Neri |
| 7,742,962 B1 | 6/2010 | Singer |
| 7,742,974 B2 | 6/2010 | Owens et al. |
| 7,742,976 B1 | 6/2010 | Burns et al. |
| 7,742,977 B1 | 6/2010 | Borsand |
| 7,747,493 B1 | 6/2010 | Monroe |
| 7,747,510 B1 | 6/2010 | Burns et al. |
| 7,747,513 B2 | 6/2010 | Duquette et al. |
| 7,752,115 B2 | 7/2010 | Schluetter |
| 7,752,117 B2 | 7/2010 | Burns et al. |
| 7,752,118 B1 | 7/2010 | West et al. |
| 7,752,122 B2 | 7/2010 | Friesen et al. |
| 7,756,775 B1 | 7/2010 | Ebersole et al. |
| 7,756,782 B2 | 7/2010 | Monroe et al. |
| 7,761,362 B2 | 7/2010 | Triplett |
| 7,765,134 B1 | 7/2010 | Pazner |
| 7,765,143 B1 | 7/2010 | West |
| 7,769,652 B1 | 8/2010 | Monroe |
| 7,769,656 B1 | 8/2010 | Andrews et al. |
| 7,769,671 B2 | 8/2010 | Triplett |
| 7,774,249 B1 | 8/2010 | West et al. |
| 7,774,261 B1 | 8/2010 | Mintz et al. |
| 7,774,262 B1 | 8/2010 | Mintz et al. |
| 7,774,267 B2 | 8/2010 | Burns et al. |
| 7,783,556 B1 | 8/2010 | Singer |
| 7,783,558 B1 | 8/2010 | Schwartz et al. |
| 7,783,559 B1 | 8/2010 | Schwartz et al. |
| 7,788,167 B1 | 8/2010 | Deitz et al. |
| 7,792,734 B1 | 9/2010 | Burns et al. |
| 7,792,735 B1 | 9/2010 | Schluetter |
| 7,792,741 B1 | 9/2010 | West |
| 7,797,228 B2 | 9/2010 | Tanpoco et al. |
| 7,801,800 B1 | 9/2010 | West |
| 7,801,801 B2 | 9/2010 | Rosenthal et al. |
| 7,801,806 B2 | 9/2010 | Burns et al. |
| 7,805,356 B2 | 9/2010 | O'Connor et al. |
| 7,805,361 B2 | 9/2010 | West |
| 7,809,623 B1 | 10/2010 | Peebler |
| 7,809,628 B1 | 10/2010 | West et al. |
| 7,809,841 B1 | 10/2010 | Crouch |
| 7,813,994 B1 | 10/2010 | Ebersole et al. |
| 7,813,995 B2 | 10/2010 | Burns et al. |
| 7,813,996 B2 | 10/2010 | Kemp, II et al. |
| 7,813,997 B2 | 10/2010 | Burns et al. |
| 7,813,998 B1 | 10/2010 | Mauro, Jr. et al. |
| 7,818,247 B2 | 10/2010 | Kemp et al. |
| 7,831,505 B2 | 11/2010 | Herz |
| 7,831,506 B2 | 11/2010 | Andrews |
| 7,835,964 B1 | 11/2010 | Zagara et al. |
| 7,835,981 B2 | 11/2010 | Highland et al. |
| 7,844,524 B1 | 11/2010 | Brumfield et al. |
| 7,844,525 B1 | 11/2010 | Borsand |
| 7,844,531 B1 | 11/2010 | Monroe et al. |
| 7,844,532 B2 | 11/2010 | Singer |
| 7,844,536 B1 | 11/2010 | Andrews et al. |
| 7,844,541 B1 | 11/2010 | Tam |
| 7,844,726 B2 | 11/2010 | Foygel et al. |
| 7,848,990 B1 | 12/2010 | West et al. |
| 7,848,991 B1 | 12/2010 | Buck |
| 7,848,993 B1 | 12/2010 | Buck |
| 7,848,994 B1 | 12/2010 | Andrews et al. |
| 7,849,000 B2 | 12/2010 | Mackey, Jr. et al. |
| 7,849,001 B2 | 12/2010 | Burns et al. |
| 7,853,504 B1 | 12/2010 | Zagara et al. |
| 7,856,392 B1 | 12/2010 | Fishbain et al. |
| 7,856,393 B1 | 12/2010 | Fishbain et al. |
| 7,861,185 B1 | 12/2010 | Tanpoco |
| 7,870,063 B1 | 1/2011 | Pazner |
| 7,882,002 B2 | 2/2011 | Monroe et al. |
| 7,882,012 B1 | 2/2011 | West et al. |
| 7,882,018 B2 | 2/2011 | Schwarz et al. |
| 2001/0032097 A1 | 10/2001 | Levey |
| 2002/0026401 A1 | 2/2002 | Hueler |
| 2002/0046301 A1 | 4/2002 | Shannon et al. |
| 2002/0049666 A1 | 4/2002 | Reuter |
| 2002/0052824 A1 | 5/2002 | Mahanti |
| 2002/0052836 A1 | 5/2002 | Galperin et al. |
| 2002/0059129 A1 | 5/2002 | Kemp, II et al. |
| 2002/0070915 A1 | 6/2002 | Mazza et al. |
| 2002/0091624 A1 | 7/2002 | Glodjo et al. |
| 2002/0101967 A1 | 8/2002 | Eng et al. |
| 2002/0120555 A1 | 8/2002 | Lerner |
| 2002/0138390 A1 | 9/2002 | May |
| 2002/0138400 A1 | 9/2002 | Kitchen et al. |
| 2002/0169704 A1 | 11/2002 | Gilbert |
| 2003/0009419 A1 | 1/2003 | Chavez et al. |
| 2003/0018561 A1 | 1/2003 | Kitchen et al. |

(56) References Cited

U.S. PATENT DOCUMENTS

| | | |
|---|---|---|
| 2003/0023542 A1 | 1/2003 | Kemp et al. |
| 2003/0033240 A1 | 2/2003 | Belson et al. |
| 2003/0055737 A1 | 3/2003 | Pope et al. |
| 2003/0055989 A1 | 3/2003 | Zamanzadeh |
| 2003/0083973 A1 | 5/2003 | Horsfall |
| 2003/0088495 A1 | 5/2003 | Gilbert et al. |
| 2003/0088509 A1 | 5/2003 | Wilton |
| 2003/0093351 A1 | 5/2003 | Sarabanchong |
| 2003/0093360 A1 | 5/2003 | May |
| 2003/0097325 A1 | 5/2003 | Friesen |
| 2003/0101129 A1 | 5/2003 | Waddell et al. |
| 2003/0101130 A1 | 5/2003 | Cliff |
| 2003/0120591 A1 | 6/2003 | Birkhead et al. |
| 2003/0177411 A1 | 9/2003 | Dinker et al. |
| 2003/0200167 A1* | 10/2003 | Kemp et al. ............... 705/37 |
| 2003/0225648 A1 | 12/2003 | Hylton |
| 2003/0233313 A1 | 12/2003 | Bartolucci |
| 2003/0236737 A1 | 12/2003 | Kemp, II et al. |
| 2004/0030635 A1 | 2/2004 | Marigliano |
| 2004/0049446 A1 | 3/2004 | Seljeseth |
| 2004/0049738 A1 | 3/2004 | Thompson et al. |
| 2004/0064395 A1 | 4/2004 | Mintz |
| 2004/0066414 A1 | 4/2004 | Czerwinski et al. |
| 2004/0068461 A1 | 4/2004 | Schluetter |
| 2004/0083452 A1 | 4/2004 | Minor et al. |
| 2004/0093300 A1 | 5/2004 | Burns |
| 2004/0100467 A1 | 5/2004 | Heaton |
| 2004/0103054 A1 | 5/2004 | Singer |
| 2004/0117292 A1 | 6/2004 | Brumfield |
| 2004/0143542 A1 | 7/2004 | Magill et al. |
| 2004/0148242 A1 | 7/2004 | Liu |
| 2004/0153391 A1 | 8/2004 | Burns |
| 2004/0153392 A1 | 8/2004 | West et al. |
| 2004/0153393 A1 | 8/2004 | West et al. |
| 2004/0153394 A1 | 8/2004 | West et al. |
| 2004/0162772 A1 | 8/2004 | Lewis |
| 2004/0181474 A1 | 9/2004 | Grubb et al. |
| 2004/0193526 A1 | 9/2004 | Singer |
| 2004/0210511 A1 | 10/2004 | Waelbroeck |
| 2004/0210514 A1 | 10/2004 | Kemp |
| 2004/0210847 A1 | 10/2004 | Berson et al. |
| 2004/0236669 A1 | 11/2004 | Horst |
| 2005/0015323 A1 | 1/2005 | Myr |
| 2005/0027635 A1 | 2/2005 | Monroe |
| 2005/0075966 A1 | 4/2005 | Duka |
| 2005/0102217 A1 | 5/2005 | Burns |
| 2005/0125327 A1* | 6/2005 | Fishbain ............... 705/37 |
| 2005/0125328 A1 | 6/2005 | Schluetter |
| 2005/0144112 A1 | 6/2005 | Singer |
| 2005/0149429 A1 | 7/2005 | Kemp |
| 2005/0154668 A1 | 7/2005 | Burns |
| 2005/0165670 A1 | 7/2005 | Woodmansey |
| 2005/0188329 A1 | 8/2005 | Cutler et al. |
| 2005/0192920 A1 | 9/2005 | Hodge et al. |
| 2005/0203825 A1 | 9/2005 | Angle |
| 2005/0228743 A1 | 10/2005 | Warsaw et al. |
| 2005/0251475 A1* | 11/2005 | Sato ............... 705/39 |
| 2005/0256799 A1 | 11/2005 | Warsaw |
| 2005/0262003 A1 | 11/2005 | Brumfield |
| 2005/0272812 A1 | 12/2005 | Pettegrew et al. |
| 2005/0273408 A1 | 12/2005 | Bandman et al. |
| 2005/0273421 A1 | 12/2005 | Rosenthal et al. |
| 2005/0278237 A1 | 12/2005 | Dankovchik et al. |
| 2006/0010066 A1 | 1/2006 | Rosenthal et al. |
| 2006/0015436 A1 | 1/2006 | Burns |
| 2006/0026090 A1 | 2/2006 | Balabon |
| 2006/0037038 A1 | 2/2006 | Buck |
| 2006/0059083 A1 | 3/2006 | Friesen |
| 2006/0069635 A1 | 3/2006 | Ram et al. |
| 2006/0069636 A1 | 3/2006 | Griffin et al. |
| 2006/0080196 A1 | 4/2006 | Griffin et al. |
| 2006/0080223 A1 | 4/2006 | Rosenthal et al. |
| 2006/0085310 A1 | 4/2006 | Mylet et al. |
| 2006/0085312 A1 | 4/2006 | Griffin et al. |
| 2006/0085320 A1 | 4/2006 | Owens |
| 2006/0085321 A1 | 4/2006 | Staib et al. |
| 2006/0085741 A1 | 4/2006 | Weiner et al. |
| 2006/0088614 A1 | 4/2006 | Pettegrew et al. |
| 2006/0100951 A1 | 5/2006 | Mylet et al. |
| 2006/0106708 A1 | 5/2006 | Abushaban |
| 2006/0112000 A1 | 5/2006 | Ellis et al. |
| 2006/0129446 A1 | 6/2006 | Ruhl et al. |
| 2006/0129474 A1 | 6/2006 | Kelly |
| 2006/0129475 A1 | 6/2006 | Badenhorst et al. |
| 2006/0149654 A1 | 7/2006 | Burns |
| 2006/0149707 A1 | 7/2006 | Mitchell et al. |
| 2006/0155626 A1 | 7/2006 | Wigzell |
| 2006/0161494 A1 | 7/2006 | Littlewood |
| 2006/0161495 A1 | 7/2006 | Wigzell |
| 2006/0167781 A1 | 7/2006 | Kemp |
| 2006/0195387 A1 | 8/2006 | Kemp |
| 2006/0195388 A1 | 8/2006 | Kemp |
| 2006/0195389 A1 | 8/2006 | Kemp |
| 2006/0200405 A1 | 9/2006 | Burns |
| 2006/0229971 A1 | 10/2006 | Kelly |
| 2006/0235786 A1 | 10/2006 | DiSalvo |
| 2006/0235787 A1 | 10/2006 | Burns |
| 2006/0247997 A1 | 11/2006 | West |
| 2006/0253371 A1 | 11/2006 | Rutt |
| 2006/0253373 A1 | 11/2006 | Rosenthal et al. |
| 2006/0253377 A1 | 11/2006 | Burns |
| 2006/0259382 A1 | 11/2006 | Kemp |
| 2006/0259383 A1 | 11/2006 | Kemp |
| 2006/0259384 A1 | 11/2006 | Schluetter |
| 2006/0259395 A1 | 11/2006 | Burns |
| 2006/0259396 A1 | 11/2006 | Burns |
| 2006/0259397 A1 | 11/2006 | Schluetter |
| 2006/0259398 A1 | 11/2006 | Singer |
| 2006/0259399 A1 | 11/2006 | Mintz |
| 2006/0259400 A1 | 11/2006 | Monroe |
| 2006/0259401 A1 | 11/2006 | West |
| 2006/0259402 A1 | 11/2006 | West |
| 2006/0259403 A1 | 11/2006 | Monroe |
| 2006/0259404 A1 | 11/2006 | Brumfield |
| 2006/0259405 A1 | 11/2006 | Friesen |
| 2006/0259406 A1 | 11/2006 | Kemp |
| 2006/0259407 A1 | 11/2006 | Rosenthal et al. |
| 2006/0259409 A1 | 11/2006 | Burns |
| 2006/0259410 A1 | 11/2006 | Friesen |
| 2006/0259411 A1 | 11/2006 | Burns |
| 2006/0259412 A1 | 11/2006 | Kemp |
| 2006/0259413 A1 | 11/2006 | Friesen |
| 2006/0259414 A1 | 11/2006 | Singer |
| 2006/0265239 A1 | 11/2006 | Schluetter |
| 2006/0265240 A1 | 11/2006 | Schluetter |
| 2006/0265303 A1 | 11/2006 | Kemp |
| 2006/0265304 A1 | 11/2006 | Brumfield |
| 2006/0265305 A1 | 11/2006 | Schluetter |
| 2006/0265314 A1 | 11/2006 | Singer |
| 2006/0265315 A1 | 11/2006 | Friesen |
| 2006/0265316 A1 | 11/2006 | Brumfield |
| 2006/0265317 A1 | 11/2006 | Duquette |
| 2006/0265318 A1 | 11/2006 | Friesen |
| 2006/0265319 A1 | 11/2006 | Friesen |
| 2006/0265320 A1 | 11/2006 | Duquette |
| 2006/0265321 A1 | 11/2006 | Brumfield |
| 2006/0265322 A1 | 11/2006 | Burns |
| 2006/0265651 A1 | 11/2006 | Buck |
| 2006/0271468 A1 | 11/2006 | Rosenthal et al. |
| 2006/0271475 A1 | 11/2006 | Brumfield |
| 2006/0277136 A1 | 12/2006 | O'Connor |
| 2006/0287944 A1 | 12/2006 | Fishbain |
| 2006/0292547 A1 | 12/2006 | Pettegrew et al. |
| 2006/0293997 A1 | 12/2006 | Tanpoco |
| 2006/0293999 A1 | 12/2006 | Tanpoco |
| 2007/0016509 A1 | 1/2007 | Vogel |
| 2007/0027788 A1 | 2/2007 | Bandman et al. |
| 2007/0038543 A1 | 2/2007 | Weinstein |
| 2007/0038549 A1 | 2/2007 | Janowski et al. |
| 2007/0038554 A1 | 2/2007 | Kemp |
| 2007/0038555 A1 | 2/2007 | Kemp |
| 2007/0038556 A1 | 2/2007 | Kemp |
| 2007/0038557 A1 | 2/2007 | Kemp |
| 2007/0043647 A1 | 2/2007 | Bickford |

(56) References Cited

U.S. PATENT DOCUMENTS

| | | |
|---|---|---|
| 2007/0061452 A1 | 3/2007 | Weinstein |
| 2007/0078749 A1 | 4/2007 | Burns |
| 2007/0078752 A1 | 4/2007 | Burns |
| 2007/0083458 A1 | 4/2007 | Rosenthal et al. |
| 2007/0088658 A1 | 4/2007 | Rosenthal et al. |
| 2007/0100731 A1 | 5/2007 | Ward et al. |
| 2007/0100735 A1 | 5/2007 | Kemp |
| 2007/0100736 A1 | 5/2007 | Singer |
| 2007/0106590 A1 | 5/2007 | Triplett |
| 2007/0112665 A1 | 5/2007 | Mackey et al. |
| 2007/0156565 A1 | 7/2007 | Singer |
| 2007/0156570 A1 | 7/2007 | Singer |
| 2007/0198397 A1 | 8/2007 | McGinley et al. |
| 2007/0208647 A1 | 9/2007 | Gemuenden |
| 2007/0226126 A1 | 9/2007 | Kirwin et al. |
| 2007/0226127 A1 | 9/2007 | Kirwin et al. |
| 2007/0288351 A1 | 12/2007 | Huntley |
| 2008/0059846 A1 | 3/2008 | Rosenthal et al. |
| 2008/0097887 A1 | 4/2008 | Duquette |
| 2008/0129735 A1 | 6/2008 | Buck |
| 2008/0147535 A1 | 6/2008 | Braig et al. |
| 2008/0154764 A1 | 6/2008 | Levine et al. |
| 2008/0162324 A1 | 7/2008 | West |
| 2008/0162333 A1 | 7/2008 | Kemp et al. |
| 2008/0162378 A1 | 7/2008 | Levine et al. |
| 2008/0243709 A1 | 10/2008 | Mintz |
| 2008/0243710 A1 | 10/2008 | Borts |
| 2008/0281669 A1 | 11/2008 | Pratt |
| 2008/0288391 A1 | 11/2008 | Downs et al. |
| 2009/0006244 A1 | 1/2009 | Kemp |
| 2009/0055304 A1 | 2/2009 | Lange |
| 2009/0089196 A1 | 4/2009 | Friesen |
| 2009/0119201 A1 | 5/2009 | Burns et al. |
| 2009/0192933 A1 | 7/2009 | Singer et al. |
| 2009/0228390 A1 | 9/2009 | Burns et al. |
| 2009/0228400 A1 | 9/2009 | Burns et al. |
| 2009/0240617 A1 | 9/2009 | Burns et al. |
| 2009/0240633 A1 | 9/2009 | Schluetter et al. |
| 2009/0248566 A1 | 10/2009 | Miles |
| 2009/0276352 A1 | 11/2009 | West et al. |
| 2009/0276353 A1 | 11/2009 | West et al. |
| 2009/0276367 A1 | 11/2009 | Rosenthal |
| 2009/0276373 A1 | 11/2009 | Rosenthal |
| 2009/0292650 A1 | 11/2009 | Duquette |
| 2009/0292651 A1 | 11/2009 | Duquette |
| 2009/0292652 A1 | 11/2009 | Duquette |
| 2009/0299890 A1 | 12/2009 | Kontos et al. |
| 2009/0307127 A1 | 12/2009 | Burns et al. |
| 2009/0313179 A1 | 12/2009 | Griffin |
| 2009/0319418 A1 | 12/2009 | Herz |
| 2009/0319441 A1 | 12/2009 | Duquette |
| 2009/0319442 A1 | 12/2009 | Tanpoco |
| 2009/0319950 A1 | 12/2009 | Borts |
| 2010/0005036 A1 | 1/2010 | Kraus et al. |
| 2010/0005037 A1 | 1/2010 | Friesen et al. |
| 2010/0010929 A1 | 1/2010 | Tanpoco |
| 2010/0010936 A1 | 1/2010 | Singer |
| 2010/0010937 A1 | 1/2010 | Rosenthal et al. |
| 2010/0023443 A1 | 1/2010 | Tam |
| 2010/0023645 A1 | 1/2010 | Foygel |
| 2010/0030684 A1 | 2/2010 | Kemp, II et al. |
| 2010/0030704 A1 | 2/2010 | Griffin et al. |
| 2010/0036705 A1 | 2/2010 | Andrews |
| 2010/0036766 A1 | 2/2010 | Burns |
| 2010/0037175 A1 | 2/2010 | West |
| 2010/0039432 A1 | 2/2010 | Buck |
| 2010/0042530 A1 | 2/2010 | Mintz et al. |
| 2010/0070399 A1 | 3/2010 | O'Connor et al. |
| 2010/0070402 A1 | 3/2010 | Friesen et al. |
| 2010/0070403 A1 | 3/2010 | Burns et al. |
| 2010/0076906 A1 | 3/2010 | Eubank et al. |
| 2010/0076907 A1 | 3/2010 | Rosenthal et al. |
| 2010/0088218 A1 | 4/2010 | Rosenthal et al. |
| 2010/0094775 A1 | 4/2010 | Waelbroeck et al. |
| 2010/0094777 A1 | 4/2010 | Rosenthal et al. |
| 2010/0100504 A1 | 4/2010 | Highland et al. |
| 2010/0100830 A1 | 4/2010 | Singer |
| 2010/0114752 A1 | 5/2010 | Downs et al. |
| 2010/0114753 A1 | 5/2010 | Osmanski et al. |
| 2010/0121757 A1 | 5/2010 | McNicholas |
| 2010/0131387 A1 | 5/2010 | Duquette |
| 2010/0131404 A1 | 5/2010 | Kemp, II et al. |
| 2010/0131405 A1 | 5/2010 | Kemp, II et al. |
| 2010/0131427 A1 | 5/2010 | Monroe et al. |
| 2010/0138335 A1 | 6/2010 | Kemp, II et al. |
| 2010/0145880 A1 | 6/2010 | Andrews et al. |
| 2010/0153257 A1 | 6/2010 | Triplett |
| 2010/0161476 A1 | 6/2010 | West et al. |
| 2010/0161512 A1 | 6/2010 | Tanpoco |
| 2010/0161513 A1 | 6/2010 | West et al. |
| 2010/0169206 A1 | 7/2010 | Singer et al. |
| 2010/0191641 A1 | 7/2010 | Mintz et al. |
| 2010/0191642 A1 | 7/2010 | Borsand |
| 2010/0198747 A1 | 8/2010 | Mintz et al. |
| 2010/0198749 A1 | 8/2010 | O'Connor et al. |
| 2010/0211523 A1 | 8/2010 | Schluetter |
| 2010/0211525 A1 | 8/2010 | West et al. |
| 2010/0211529 A1 | 8/2010 | Neri |
| 2010/0217703 A1 | 8/2010 | Burns et al. |
| 2010/0228643 A1 | 9/2010 | Monroe |
| 2010/0228644 A1 | 9/2010 | Schluetter |
| 2010/0228662 A1 | 9/2010 | Owens et al. |
| 2010/0228833 A1 | 9/2010 | Duquette et al. |
| 2010/0235273 A1 | 9/2010 | Friesen et al. |
| 2010/0235301 A1 | 9/2010 | Tanpoco |
| 2010/0235302 A1 | 9/2010 | Ebersole et al. |
| 2010/0241591 A1 | 9/2010 | Fishbain |
| 2010/0250423 A1 | 9/2010 | Mintz |
| 2010/0257090 A1 | 10/2010 | West |
| 2010/0268632 A1 | 10/2010 | Rosenthal |
| 2010/0268633 A1 | 10/2010 | Rosenthal et al. |
| 2010/0268634 A1 | 10/2010 | Mackey |
| 2010/0268637 A1 | 10/2010 | Burns et al. |
| 2010/0274705 A1 | 10/2010 | Schwarz et al. |
| 2010/0274706 A1 | 10/2010 | Singer et al. |
| 2010/0280938 A1 | 11/2010 | Burns et al. |
| 2010/0287089 A1 | 11/2010 | Burns et al. |
| 2010/0293086 A1 | 11/2010 | Tanpoco et al. |
| 2010/0293088 A1 | 11/2010 | Deitz et al. |
| 2010/0293110 A1 | 11/2010 | Rosenthal et al. |
| 2010/0299223 A1 | 11/2010 | Crouch |
| 2010/0299242 A1 | 11/2010 | Ebersole et al. |
| 2010/0306098 A1 | 12/2010 | O'Connor et al. |
| 2010/0318458 A1 | 12/2010 | West |
| 2010/0318673 A1 | 12/2010 | Kemp, II et al. |
| 2010/0325034 A1 | 12/2010 | Burns et al. |
| 2010/0332367 A1 | 12/2010 | Foygel et al. |
| 2010/0332377 A1 | 12/2010 | Peeber |
| 2010/0332378 A1 | 12/2010 | Mauro, Jr. et al. |
| 2010/0332380 A1 | 12/2010 | Kemp, II et al. |
| 2011/0016035 A1 | 1/2011 | Rosenthal et al. |
| 2011/0016040 A1 | 1/2011 | Andrews |

OTHER PUBLICATIONS

Partial International Search Report for PCT/US2006/038,612, Jun. 17, 2008.
PCT/US2006/038,238, Apr. 12, 2007.
Partial International Search Report for PCT/US2006/021,052, Sep. 4, 2007.
Partial International Search Report for PCT/US2006/016,792, Jun. 11, 2008.
PCT/US2005/044,191, Jun. 15, 2006.
Partial International Search Report for PCT/US2005/039,563, Feb. 27, 2007.
Partial International Search Report for PCT/US2005/032,189, Aug. 8, 2008.
Partial International Search Report for PCT/US2005/024,590, Apr. 26, 2007.
Partial International Search Report for PCT/US2005/020,035, Sep. 6, 2006.
Anonymous; New for Traders; Futures, vol. 33, No. 14, p. 87 (Nov. 2004).

(56) References Cited

OTHER PUBLICATIONS

Barajas et al., "Interest Spreads in Banking in Colombia, 1974-96," International Monetary Fund Staff Papers, 46, 2, 196 (2), Jun. 1999.

Chen, Lin; Essays on Interest Rates, Derivatives, and Risks; vol. 56/04-A of Dissertation Abstracts International; p. 1467, 154 pages; Harvard University (1995).

Clary, Isabelle; Donahue: Winner Does Take All; Security Industry News, Securities Data Publishing (Mar. 1, 2004).

Electronic Trading Platforms Special Report, Jeremy Carter, Risk Magazine, Nov. 1999.

GL Trade, LIFFE CONNECT for Futures, User Guide V. 4.50, Beta Jan. 1999.

Grossman, Stanford J., Programs Trading and Stock and Futures Price Volitility. The Journal of Futures Markets. Aug. 1998, vol. 8, No. 4, p. 413-419.

Memorandum Opinion and Order of Federal Judge James B. Moran, Case No. 04 C 5312, *Trading Technologies International, Inc. v. eSpeed Inc., eSpeed International Ltd., and Ecco Ware Ltd.*, Jun. 20, 2007, (N.D. Ill) including claim constructions for Kemp et al, U.S. Patent Nos. 6,766,304 and 6,882,132 and definition of a static price axis.

Static Price Axis for Electronic Trading, Wit Capital Group, Digital Stock Market, Graphical User Interface Negotiations Design Document, Oct. 13, 1998, pp. 63-64.

System for Buying and Selling Futures and Options Transaction Terminal Operational Guidelines, Tokyo Stock Exchange, 1999.

Memorandum Opinion of United States Court of Appeals for the Federal Circuit, 2008-1392, -1393, -1422, *Trading Technologies International, Inc.*, Plaintiff-Appellant, v. *Espeed, Inc., ECCO LLC, ECCOWARE Ltd., and ESPEED International, Ltd.* holding in part that any price axis that moves is dynamic and not static with respect to Kemp et al, U.S. Patent Nos. 6,766,304 and 6,882,132, (Feb. 25, 2010).

Partial International Search Report for PCT/US2006/043,726.
Partial International Search Report for PCT/US2006/038,612.
Partial International Search Report for PCT/US2006/038,238.
Partial International Search Report for PCT/US2006/021,052.
Partial International Search Report for PCT/US2006/016,792.
Partial International Search Report for PCT/US2005/044,191.
Partial International Search Report for PCT/US2005/039,563.
Partial International Search Report for PCT/US2005/032,189.
Partial International Search Report for PCT/US2005/024,590.
Partial International Search Report for PCT/US2005/020,035.

\* cited by examiner

Orders Report (BETA)

User : APIDEV4
Account :
Dates : 3/1/2005 - 3/15/2005

| Account | Order ID | Instrument | Side | Quantity | Price | Order Type | Avg Price | State | Price 2 | Filled | # Fills | Open |
|---|---|---|---|---|---|---|---|---|---|---|---|---|
| APIDEV4 | 100445 | CMEMINI S&PJUN05 | Buy | 2 | 1208.5 | Limit | 1208.5 | Filled | 0 | 2 | 1 | 0 |
| APIDEV4 | 100446 | CMEMINI NSDQMAR05 | Buy | 2 | 1509 | Limit | 1509 | Filled | 0 | 2 | 1 | 0 |
| APIDEV4 | 100447 | CMEMINI S&PJUN05 | Sell | 1 | 1208.25 | Limit | 0 | Working | 0 | 0 | 0 | 1 |
| APIDEV4 | S1 | CMEMINI NSDQJUN05 | Sell | 1 | 1514.5 | SynchStop | 0 | HeldOrder | 0 | 0 | 0 | 1 |
| APIDEV4 | 101505 | CMEMINI NSDQMAR05 | Buy | 1 | 10 | Limit | 0 | Sent | 0 | 0 | 0 | 1 |
| APIDEV4 | 101506 | CMEMINI NSDQJUN05 | Buy | 2 | 14 | Limit | 0 | Sent | 0 | 0 | 0 | 2 |
| APIDEV4 | 107185 | CMEMINI NSDQMAR05 | Buy | 2 | 1510 | Limit | 1509 | Filled | 0 | 2 | 1 | 0 |

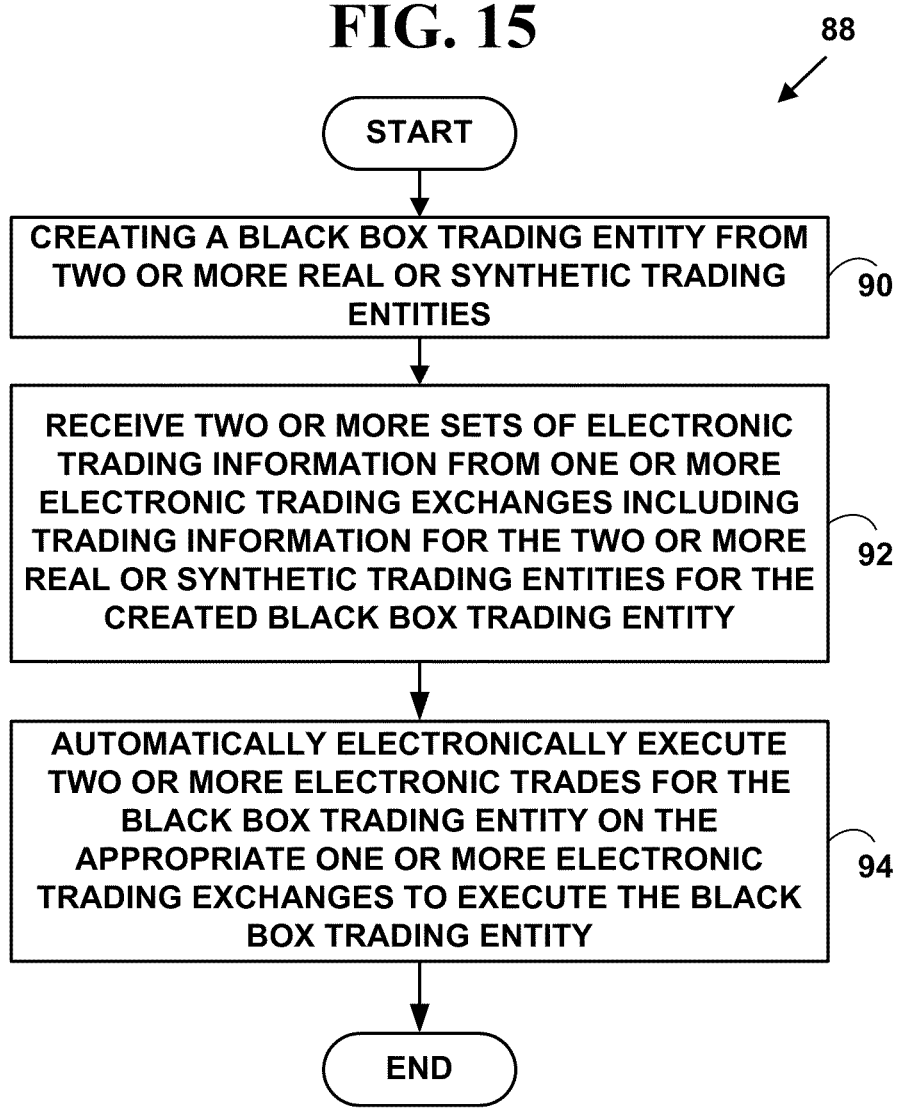

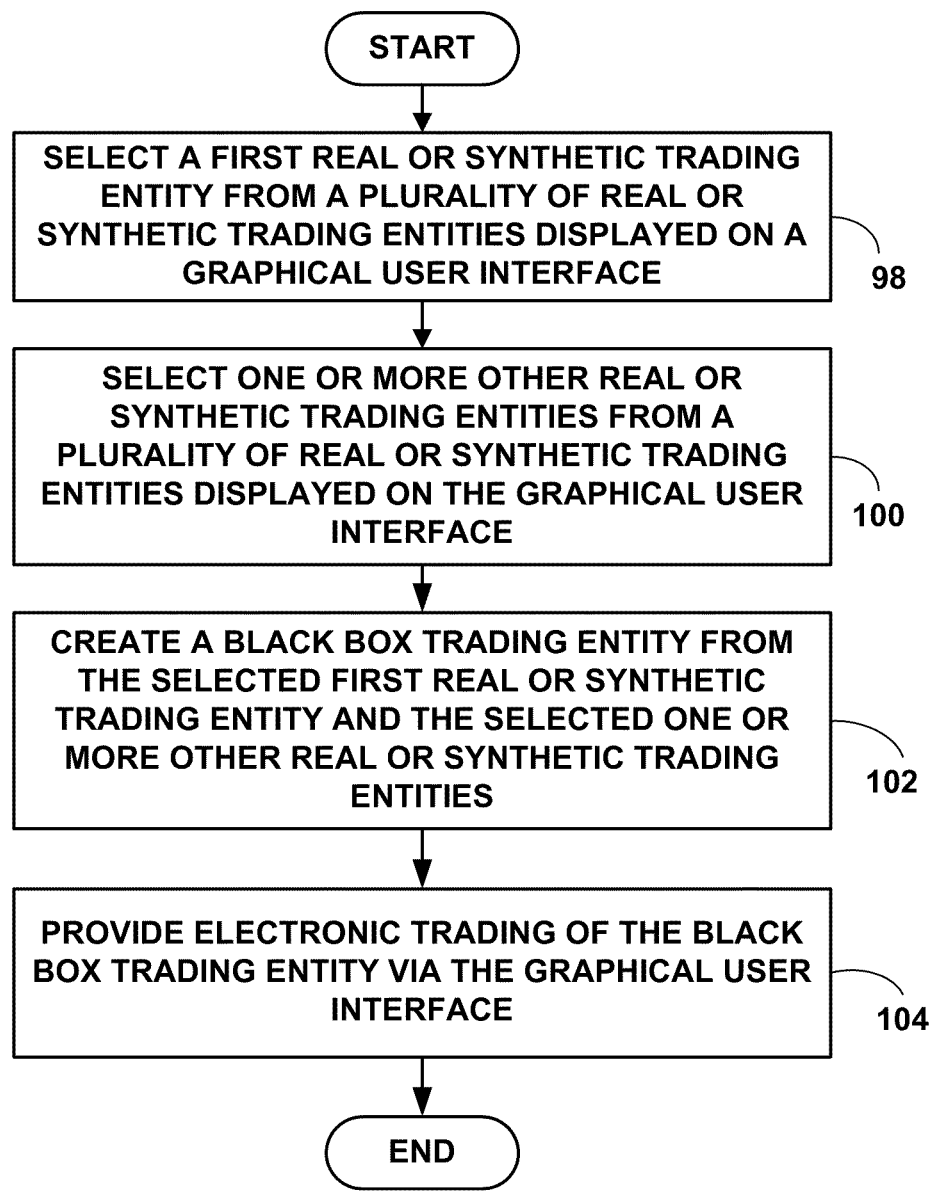

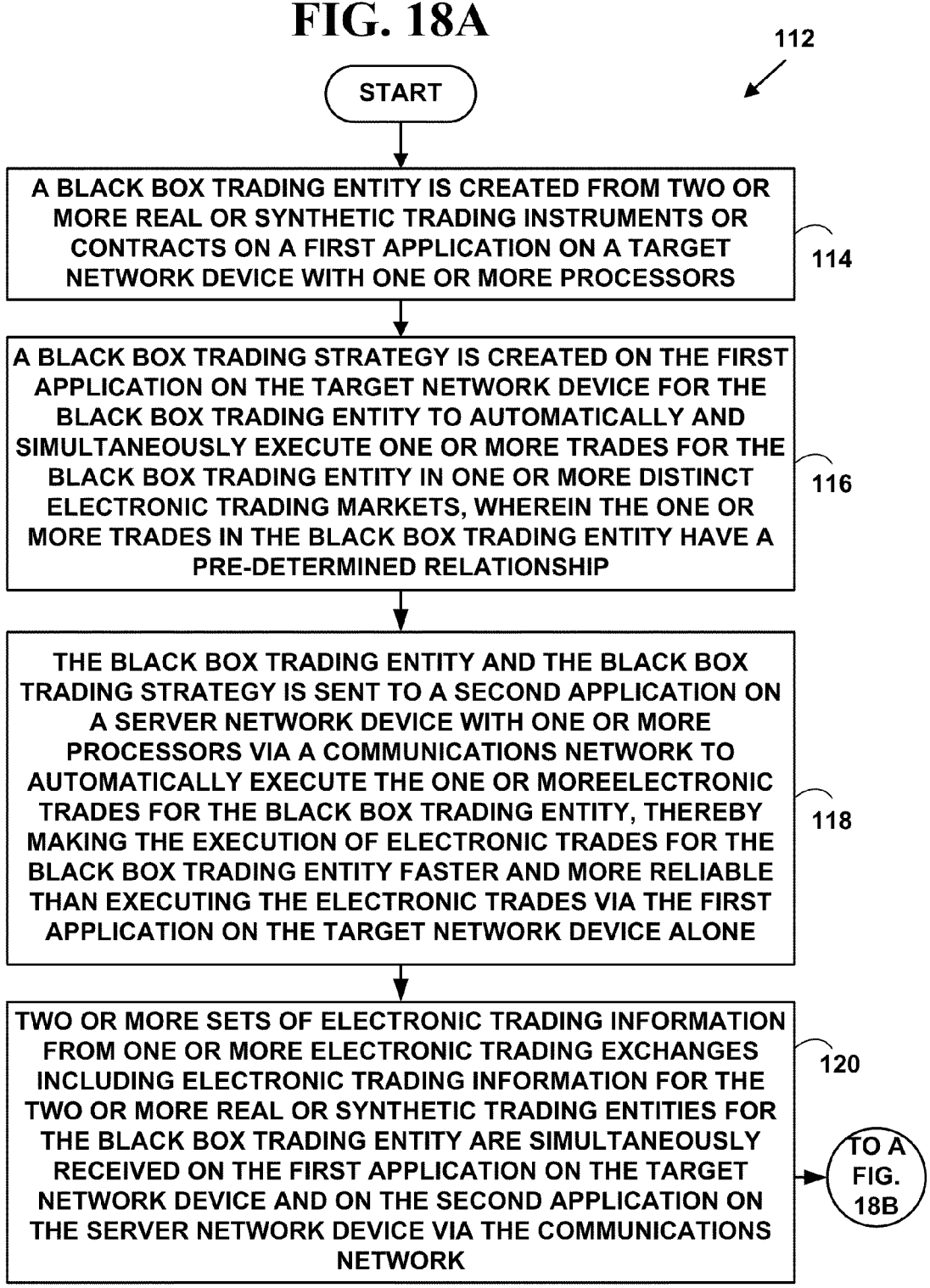

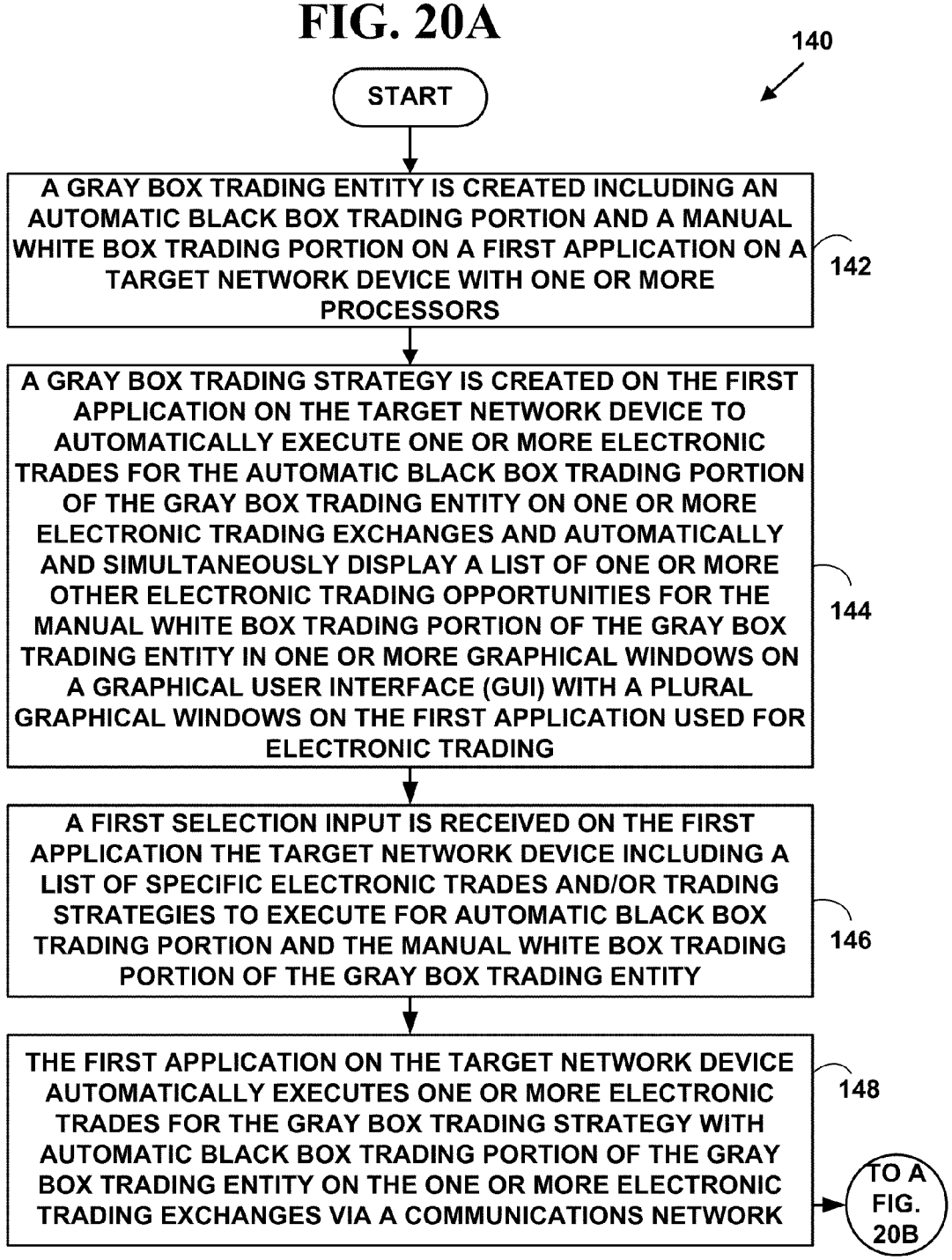

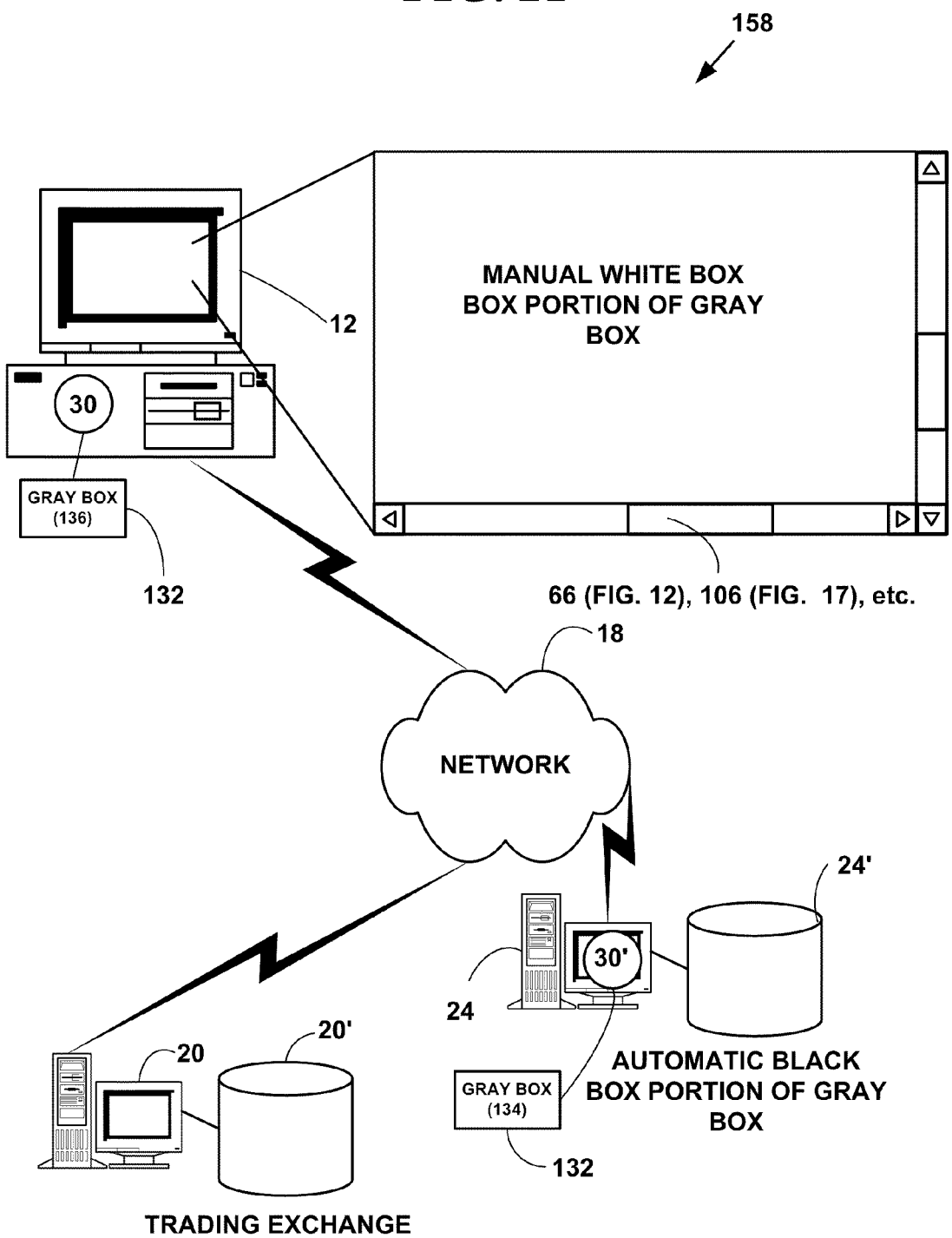

METHOD AND SYSTEM FOR PROVIDING AUTOMATIC EXECUTION OF GRAY BOX STRATEGIES FOR ELECTRONIC TRADING

CROSS REFERENCES TO RELATED APPLICATIONS

This application is a Continuation-In-Part (CIP) of U.S. utility application Ser. No. 12/881,740, filed Sep. 14, 2010, which is a CIP of U.S. utility application Ser. No. 11/417,596, filed May 4, 2006, that claims priority to U.S. Provisional Patent Application No. 60/678,106, filed May 4, 2005, wherein Ser. No. 11/417,596 issued as U.S. Pat. No. 7,801,801, on Sep. 21, 2010, the contents of all of which are incorporated by reference.

FIELD OF THE INVENTION

This invention relates to providing electronic information over a computer network for electronic trading. More specifically, it relates to a method and system for providing automatic execution of gray box trading strategies for electronic trading.

BACKGROUND OF THE INVENTION

The trading of stocks, bonds and other financial instruments over computer networks such as the Internet has become a very common activity. In many countries of the world, such stocks, bonds and other financial instruments are traded exclusively over computer networks, completely replacing prior trading systems such as "open outcry" trading in trading pits.

Trading of stocks, bonds, etc. typically requires multiple types of associated electronic information. For example, to trade stocks electronically an electronic trader typically would like to know an asking price for a stock, a current bid price for a stock, a bid quantity, an asking quantity, current information about the company the trader is trading such as profit/loss information, a current corporate forecast, current corporate earnings, etc.

The multiple types of associated electronic information have to be supplied in real-time to allow the electronic trader to make the appropriate decisions. Such electronic information is typically displayed in multiple windows on a display screen.

For an electronic trader to be successful, the trader typically develops trading strategies. For example a trading strategy may include executing a trade based on a desired ratio between two trading instruments. As another example, a trading strategy may include executing a trade based on a basis level for a trading instrument.

There are several problems with using manual trading strategies on electronic trading systems. One problem is that a trader will typically create his/her own trading strategies using disjunct or proprietary tools. For example, a trade may implement his/her own trading strategy in a spreadsheet and manually enter and update current market values of trading instruments. The trader then must take additional actions to implement his/her trading strategy based on data form the spreadsheet.

Another problem is that some electronic trading systems allow traders to enter certain data to provide automatic notification of events that are related to a trader's trading strategy (e.g., a certain buy price, a sell price, a ratio, etc.). However, then a trader must still take manual actions to execute an electronic trade such as clicking a mouse, making a keyboard input, etc.).

Another problem is that many traders execute trades across many different markets and several different electronic exchanges. Such trading typically leads a trader to manual methods to execute a desired trading strategy.

Another problem is that many traders desire to execute trades for "synthetic contracts" or contracts that don't really exist on any trading exchange. For example, a synthetic contract may include automatically selling a call and buying a put. Such a synthetic contract does not exist on any trading exchange but is desirable to a selected group of traders.

Another problem is that many traders may desire to have some trades executed automatically and execute other manually.

There have been attempts to solve some of the problems with GUIs used for electronic trading. For example, U.S. Pat. No. 6,993,504 entitled "User interface for semi-fungible trading," that issued to Frisen et al. teaches "A user interface and method are disclosed for providing trading between a plurality of semi-fungible and non-fungible goods. A plurality of book axes are displayed in a single interface, each book axis representing a market for a particular good. Orders for goods are displayed as marks on the axes to display the relative value of the orders. A value axis is provided that relates the value of the goods from each market to each other. Thus, a single interface provides the means to relate the values of different semi-fungible goods. The value axis may be displayed in units of price, or a custom value designated by a user or pre-defined by the interface. Quantity information is represented in the interface through the display of a dimension of an order icon. Precise information about each order is displayed either in a panel view or a pop-up window."

U.S. Pat. No. 6,938,011 entitled "Click based trading with market depth display," that issued to Kemp et al. teaches "A method and system for reducing the time it takes for a trader to place a trade when electronically trading commodities on an exchange, thus increasing the likelihood that the trader will have orders filled at desirable prices and quantities. Click based trading, as described herein and specifically the "Click" and "Dime" methods of the present invention, enables a trader to execute single mouse click trades for large volumes of commodities at a price within a pre-specified range."

U.S. Pat. No. 6,772,132 entitled "Click based trading with intuitive grid display of market depth," that issued to Kemp et al. teaches "A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently."

U.S. Pat. No. 6,766,304 entitled "Click based trading with intuitive grid display of market depth," that issued to Kemp et al. teaches "A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently."

U.S. Pat. No. 6,408,282 entitled "System and method for conducting securities transactions over a computer network," that issued to Buist teaches "The system and method of the preferred embodiment supports trading of securities over the Internet both on national exchanges and outside the national exchanges. The preferred embodiment supports an improved human interface and a continuous display of real-time stock quotes on the user's computer screen. The ergonomic graphical user interface (GUI) of the preferred embodiment includes several functional benefits in comparison with existing on-line consumer trading systems. In the preferred embodiment, the users are subscribers to a securities trading service offered over the Internet. Preferably, each subscriber to this service is simultaneously connected from his own computer to a first system which provides user-to-user trading capabilities and to a second system which is a broker/dealer system of his/her choice. The system providing the user-to-user trading services preferably includes a root server and a hierarchical network of replicated servers supporting replicated databases. The user-to-user system provides real-time continuously updated stock information and facilitates user-to-user trades that have been approved by the broker/dealer systems with which it interacts. Users of the preferred system can trade securities with other users of the system. As part of this user-to-user trading, a user can accept a buy or sell offer at the terms offered or he can initiate a counteroffer and negotiate a trade."

U.S. Pat. No. 5,297,031 entitled "Method and apparatus for order management by market brokers," that issued to Gutterman et al. teaches "There is provided a broker workstation for managing orders in a market for trading commodities, securities, securities options, futures contracts and futures options and other items including: a device for selectively displaying order information; a computer for receiving the orders and for controlling the displaying device; and a device for entering the orders into the computer; wherein the displaying device comprises a device for displaying selected order information about each incoming order, a device for displaying a representation of an order deck and a device for displaying a total of market orders. In another aspect of the invention, there is provided in a workstation having a computer, a device for entering order information into the computer and a device for displaying the order information entered, a method for managing orders in a market for trading commodities, securities, securities options, futures contracts and futures options and the like comprising the steps of: selectively displaying order information incoming to the workstation; accepting or rejecting orders corresponding to the incoming order information displayed; displaying accepted order information in a representation of a broker deck; and selectively displaying a total of orders at the market price."

Thus, it is desirable to solve some more of the problems associated with implementing trading strategies using electronic trading systems.

SUMMARY OF THE INVENTION

In accordance with preferred embodiments of the present invention, some of the problems associated with providing trading strategies for electronic trading systems are overcome. A method and system for providing automatic execution of gray box trading strategies for electronic trading is provided.

A gray box trading entity that includes a black box portion (automatic trade execution) and a white box portion (manual trade execution) is presented. An electronic trader selects trades for black box and white box trades in the gray box trading entity. The trades in the black box and/or white box can be dynamically changed at any time. Selected trades for gray box trading entity are automatically traded with a black box trading entity on one or more electronic trading exchanges while a trader is prompted to manually execute selected other trades for the gray box trading entity with a white box trading entity.

The foregoing and other features and advantages of preferred embodiments of the present invention is more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 7 is a block diagram of a screen shot of an exemplary order window;

FIG. 8 is a block diagram of a screen shot of an exemplary fill window;

FIG. 9 is a block diagram of a screen shot of an exemplary position and market data window;

FIG. 10 is a block diagram of a screen shot of an exemplary position and market data window for an order ticket from a sell position;

FIG. 14 is a block diagram of a screen shot of an exemplary reports window;

FIG. 15 is a flow diagram illustrating a method for automatically executing a black box trading entity;

FIG. 16 is a flow diagram illustrating a method for automatically creating a black box trading entity;

FIGS. 18A and 18B are a flow diagram illustrating a method for automatically executing a black box trading entity;

FIGS. 20A and 20B are a flow diagram illustrating a method for automatically executing a gray box trading entity; and FIG. 21 is a block diagram illustrating an exemplary gray box electronic trading system.

DETAILED DESCRIPTION OF THE INVENTION

Exemplary Electronic Trading System

Figure 1:
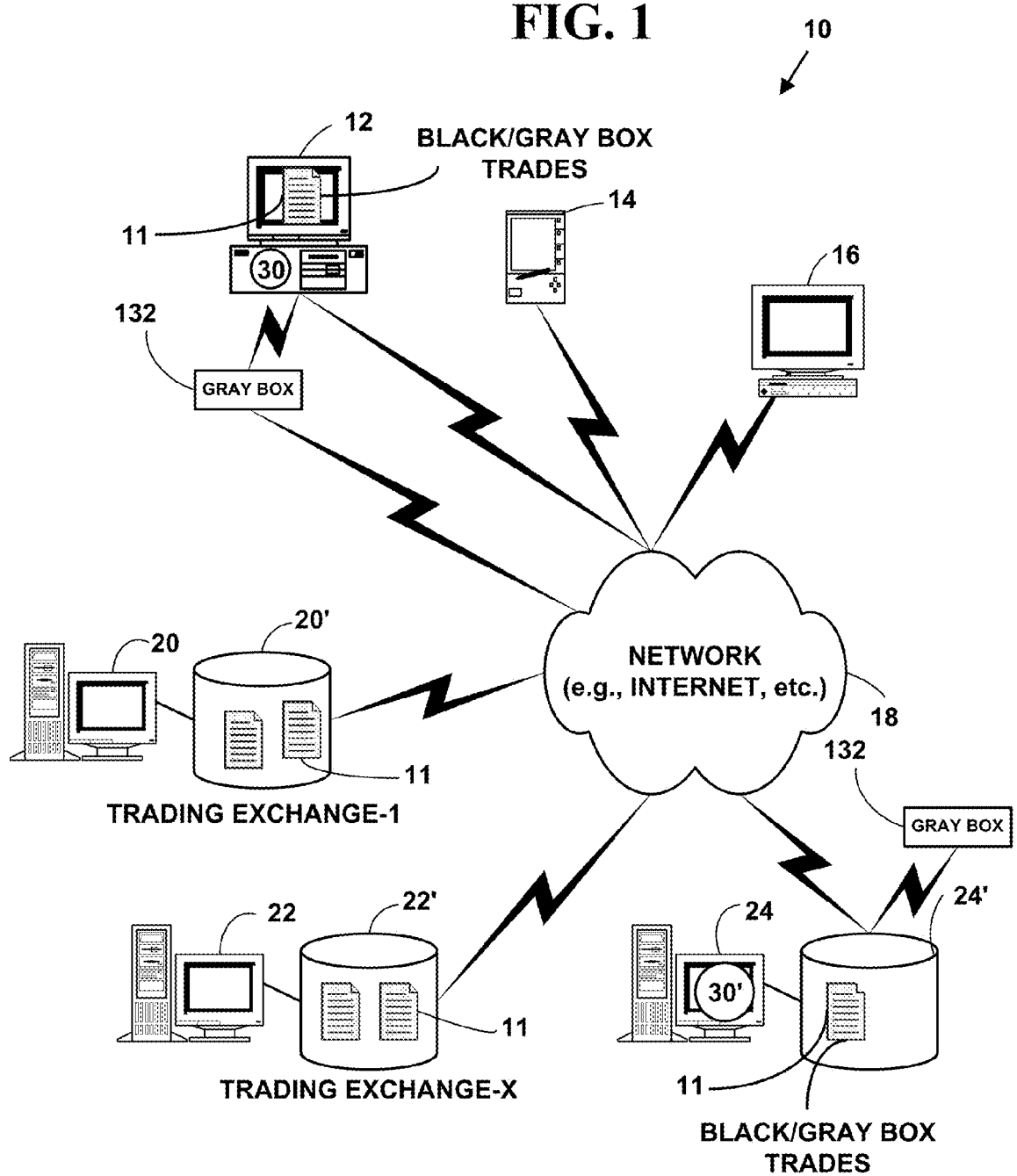
FIG. 1 is a block diagram illustrating an exemplary electronic trading system.

FIG. 1 is a block diagram illustrating an exemplary electronic trading system 10. The exemplary electronic information updating system 10 includes, but is not limited to, one or more target devices 12, 14, 16 (only three of which are illustrated). However, the present invention is not limited to these target electronic devices and more, fewer or others types of target electronic devices can also be used.

The target devices 12, 14, 16 (e.g., client target network devices, etc.) are in communications with a communications network 18. The communications includes, but is not limited to, communications over a wire connected to the target network devices, wireless communications, and other types of communications using one or more communications and/or networking protocols.

Plural server devices 20, 22, 24 (only three of which are illustrated) include one or more associated databases 20', 22', 24'. The plural network devices 20, 22, 24 are in communications with the one or more target devices 12, 14, 16 via the communications network 18. The plural server devices 20, 22, 24, include, but are not limited to, World Wide Web servers, Internet servers, file servers, other types of electronic information servers, and other types of server network devices (e.g., edge servers, firewalls, routers, gateways, etc.).

The plural server devices 20, 22, 24 include, but are not limited to, servers used for electronic trading exchanges, servers for electronic trading brokers, servers for electronic trading information providers, etc.

The one or more target devices 12, 14, 16 may be replaced with other types of devices including, but not limited to, client terminals in communications with one or more servers, or with personal digital/data assistants (PDA), laptop computers, mobile computers, Internet appliances, two-way pagers, mobile phones, or other similar desktop, mobile or hand-held electronic devices. Other or equivalent devices can also be used to practice the invention.

The communications network 18 includes, but is not limited to, the Internet, an intranet, a wired Local Area Network (LAN), a wireless LAN (WiLAN), a Wide Area Network (WAN), a Metropolitan Area Network (MAN), a Public Switched Telephone Network (PSTN) and other types of communications networks 18.

In one embodiment of the present invention, the wireless interfaces on network devices include but are not limited to, an IEEE 802.11a, 802.11b, 802.11g, 802.11n, 802.15.4 (ZigBee), "Wireless Fidelity" (Wi-Fi), "Worldwide Interoperability for Microwave Access" (WiMAX), European Telecommunications Standards Institute (ETSI), High Performance Radio Metropolitan Area Network (HIPERMAN), "RF Home" or other wireless interfaces.

The communications network 18 may include one or more gateways, routers, bridges, switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer therefore support virtually any packet protocol.

The communications network 18 may include one or more servers and one or more web-sites accessible by users to send and receive information useable by the one or more computers 12. The one or more servers, may also include one or more associated databases for storing electronic information.

The communications network 18 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is known in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 18 and the present invention is not limited to TCP/UDP/IP.

Exemplary Electronic Trading Display System

Figure 2:
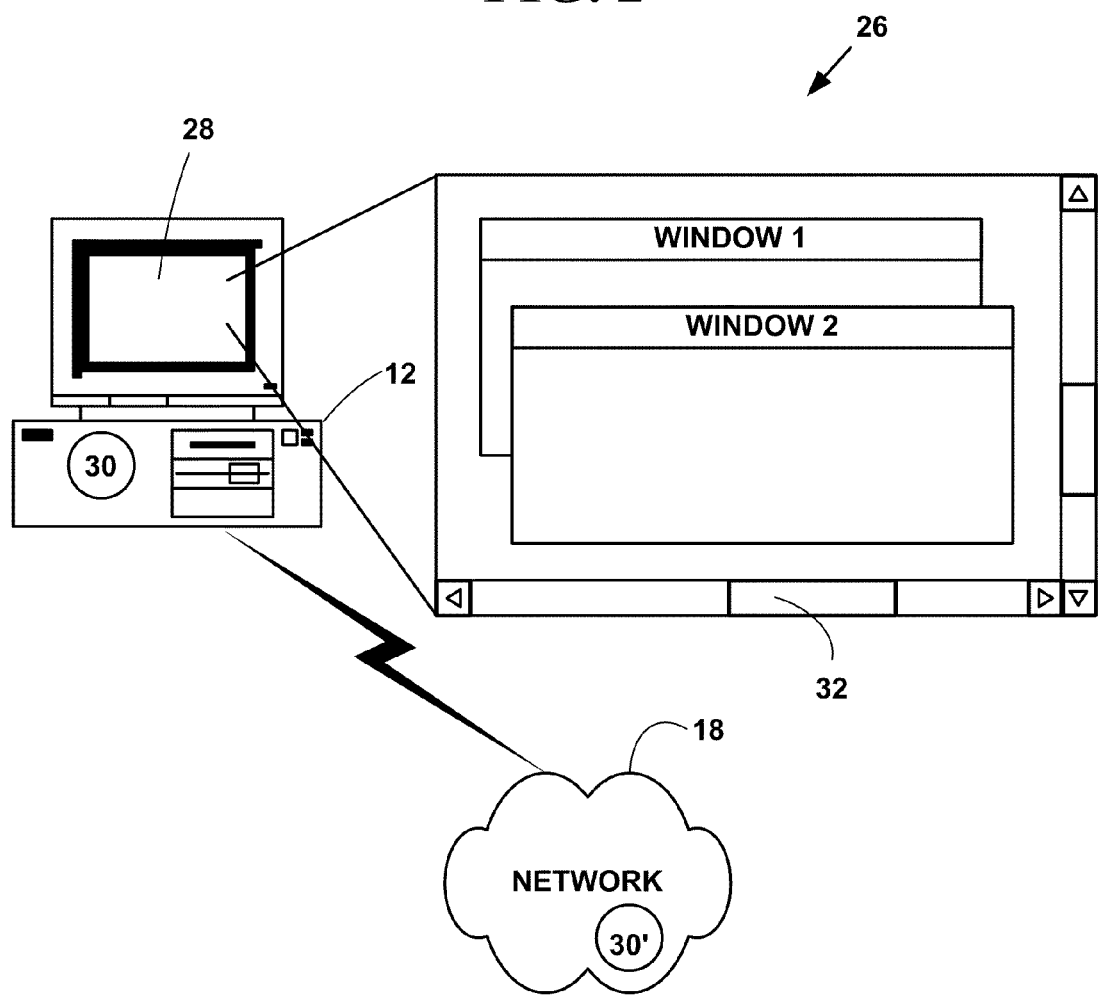
FIG. 2 is a block diagram illustrating an exemplary electronic trading display system.

FIG. 2 is a block diagram illustrating an exemplary electronic trading display system 26. The exemplary electronic trading system display system includes, but is not limited to a target device (e.g., 12) with a display 28. The target device includes an application 30 that presents a graphical user interface (GUI) 32 on the display 28. The GUI 32 presents a multi-window interface to a user.

In one embodiment of the invention, the application 30 is a software application. However, the present invention is not limited to this embodiment and the application 30 can firmware, hardware or a combination thereof.

An operating environment for the devices of the electronic trading system 10 and electronic trading display system 26 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It is appreciated that acts and symbolically represented operations or instructions include the manipulation of electrical information by the CPU or processor. An electrical system represents data bits which cause a resulting transformation or reduction of the electrical information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Exemplary Method for Processing Electronic Information for Electronic Trading

Figure 3:
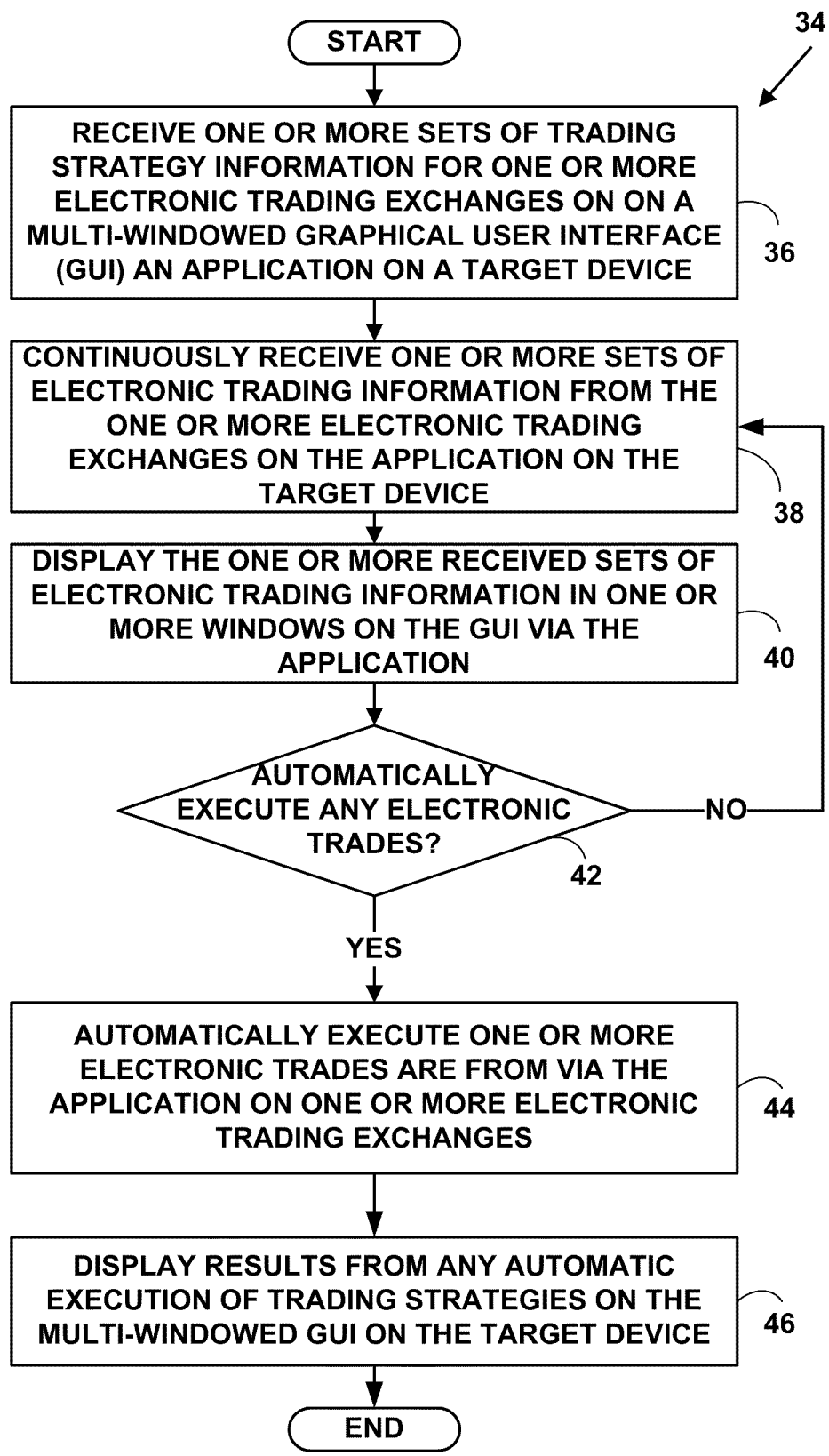
FIG. 3 is a flow diagram illustrating a method for displaying electronic information for electronic trading.

FIG. 3 is a flow diagram illustrating a Method 34 for processing electronic information for electronic trading. At Step 36, one or more sets of electronic trading strategy information is obtained via one or more windows on a application 30 on a target device 12, 14, 16 to automatically execute one or more electronic trades on one or more electronic trading exchanges 20, 22. At Step 38, one or more sets of electronic trading information are continuously received on the application 30 via one or more application program interfaces (API), fixed or dynamic connections from one or more electronic trading exchanges 20, 22. At Step 40, the one or more sets of electronic trading information are displayed in one or more windows on the GUI 32 via application 30. At Step 42, a test is conducted to determine if any electronic trades should be automatically executed based on the one or more sets of electronic trading strategy information. If any electronic trades should be automatically executed, at Step 44, one or more electronic trades are automatically electronically executed via application 30 an appropriate electronic trading exchange 20, 22. At Step 45, results from any automatic execution of any electronic trade are formatted and displayed in one more windows on a multi-windowed graphical user interface (GUI) 32.

In one embodiment the one or more sets of electronic trading strategy includes a pre-determined trading strategy created by a trader, if-then trading strategies, one-cancels-other (OCO), market-on-open (MOO), market-on-close (MCO), block trading, good-til-canceled (GTC), good-til-date (GTD), fill-and-kill (FAK), fill-or-kill (FOK), Iceberg and/or over-the-counter (OTC) trading strategies and electronic trading strategies for real and synthetic instruments or synthetic contracts, or execution of strategies based on previously executed orders.

An one-cancels-other (OCO) order is one that allows the user to have two working orders in the market at once. With the execution of one order the other is canceled.

A Market-on-Open (MOO) order is a market order that is automatically submitted at the market's open and fills at an opening market price.

A Market-on-Close (MOC) order is a market order that is automatically submitted at the market's close and fills at a closing market price. In futures markets, a market on close order will be executed within a closing range or market prices.

A "Block" trade is an order/trade submitted for sale or purchase of a large quantity of a desired financial instrument or contract.

A Good-Til-Cancelled (GTC) order is an order to buy or sell a security at a specific or limit price that lasts until the order is completed or cancelled. A GTC order will not be executed until the limit price has been reached, regardless of how many days or weeks it might take.

A Good-Til-Day/Date (GTD) order is an order to buy or sell a security at a specific or limit price that allows the user to specify the number of days/date till which the order should stay in the system if not executed.

Fill-and-Kill (FAK) orders are immediately executed against resting orders. If the order cannot be fully filled, the remaining balance is cancelled. A minimum quantity can be specified. If the specified minimum quantity cannot be filled, the order is cancelled.

Fill-or-Kill (FOK) orders must be fully filled immediately or the entire order is cancelled.

An "Iceberg" order is a large single order that is divided into smaller orders, usually by the use of an automated program, for the purpose of hiding an actual order quantity. When large participants, such as institutional investors, need to buy and sell large amounts of financial instrument and/or contracts, they divide their large orders into smaller parts so that the public sees only a small portion of the order at a time on a trading exchange just as the "tip of an iceberg" is the only visible portion of a huge mass of ice. By hiding its large size, the iceberg trade reduces price movements caused by substantial changes in a stock, commodity or other financial instrument supply and demand.

OTC (Over-the-counter) markets are decentralized markets where financial instruments and commodities are bought and sold off-exchange. An OTC contract is a bilateral contract in which two parties agree on how a particular trade or agreement is to be settled in the future. It is usually from a trading exchange or financial institutions to its clients directly. Commodity Forwards and swaps are prime examples of such bilateral contracts. The OTC market includes "two-way" business involving end-users and producers that is "naturally" hedged by parties seeking to benefit from price movement in either an up or down price direction.

As is known in the art, the pre-determined strategy trading strategy is a pre-determined trading strategy developed by a trader to apply to a desired market (e.g., cash, futures, stocks, bonds, options, spreads etc.)

As is known in the art, a "synthetic" instrument or contract includes an instrument or contract that does not really exist on any electronic trading exchange. A synthetic can be made up of one, or several contracts that trade on an exchange or multiple exchanges. For example, a synthetic contract may include automatically selling a call and buying a put. Such a synthetic contract does not exist on any trading exchange but is desirable to a selected group of traders.

As is known in the art, an API is set of routines used by an application program to direct the performance of actions by a target device. In the present invention, the application 30 is interfaced to one or more API.

In another embodiment, the application 30 is directly interfaced to a fixed or dynamic connection to one or more electronic trading exchanges without using an API.

In one exemplary embodiment of the invention, the application 30 interfaces with a Client API provided by Professional Automated Trading Systems (PATS) of London, England, or Trading Technologies, Inc. (TT) of Chicago, Ill. GL Multi-media of Paris, France and others. These APIs are intermediate APIs between the Application and other APIs provided by electronic trading exchanges. However, the present invention is not limited to such an embodiment and other APIs and other fixed or dynamic connections can also be used to practice the invention.

The application 30 (illustrated as 30' on the server network devices) presents a user a multi-windowed GUI 32 that implements the functionality exposed through API provided by electronic trading exchanges. The application 30 allows the user to subscribe to and receive real-time market data. Additionally, the application 30 allows the user to enter futures orders, cash orders, and other types of financial products orders to all supported exchanges and receive real-time order status updates. The application 30 supports at least two methods of order entry; Order Ticket and Aggregated Book View/Ask Bid Volume (ABV).

The application 30 provides flexibility to the user to configure the display of electronic information on the GUI 32. The application 30 and the GUI are now described in further detail. The application 30 may also be used by brokers to execute electronic trades on behalf of groups of clients and/or account holders, etc.

A "commodity broker" is a firm or individual who executes orders to buy or sell commodity contracts on behalf of clients and charges them a commission. A firm or individual who trades for his/her own account electronically via a commodity broker (or other broker) is called an "electronic trader." Commodity contracts include futures, options, and similar financial derivatives. Clients who trade commodity contracts are either hedgers using markets to manage risk, or speculators who are willing to assume that risk from hedgers in hopes of a profit. Other types of brokers include Futures Commission Merchants (FCMs), Independent Introducing Brokers (IIBs), Guaranteed Introducing Brokers (GIBs), Foreign Introducing Brokers (FIBs), Commodity Trading Advisors (CTAs), Commodity Pool Operators (CPOs) Broker-Dealers (B/Ds) and other types of brokers.

Desktop Layout Management

The application 30 provides the ability to manage Desktop Layouts. A Desktop Layout is a state of a GUI 32 as it appears to a user. This includes, but is not limited to, number of windows, types of windows, and the individual window settings. A user is able maintain a list of available Desktop Layouts. Each Desktop Layout has a unique name within the application 30. The user is able to create a new Desktop Layout and save it, giving it a unique name. When the user saves a Desktop Layout, it is not saved in a minimized state but is instead saved in an expanded state. The user is able to rename, copy, and delete a Desktop Layout. The user is able to load a saved desktop layout, replacing the currently displayed configuration. The application 30 receives and loads desktop layout templates from the communications network 18 upon user login. The user is able to export and import desktop layouts in order to port them from target device to target device. Desktop Layouts are saved on a user by user basis (e.g., by username). If two users access the application 30 from the same target device 12, each user sees their own list of layouts upon login.

The application 30 is launched from target device 12, 14, 16 or via the network 18 (e.g., the Internet, an intranet, etc.) The application 30 is installed on a target device 12, 14, 16 or the communications network 18. Upon startup, the application 30 detects if a new version is available. If the application 30 detects that an upgrade is warranted, a window appears, asking the user if they would like to install the latest version now. In one embodiment, if the user chooses not to install the latest version upon startup, the current (older) version of the application 30 is launched. In another embodiment, another prompt is displayed when the user logs off. In the case of a critical update, the user is not able to choose to run the application 30 without installing the update.

The application 30 is pushed information that determines which servers the application 30 is to connect to. IP addresses or Domain Name Servers (DNS) names are pushed to the client when upon login.

In one embodiment, the application 30 can be used by up to about 5,000 simultaneous users. Scalability allows the application 30 to be used by up to about 20,000 simultaneous users. However, the present invention is not limited to such an embodiment and other embodiments with other numbers of simultaneous users can also be used to practice the invention.

The application 30 indicates the status of a host connection 20, 22, 24 on the communications network 18. As a minimum, "Connecting," "Connected" and "Not Connected" statuses are indicated. The application 30 indicates the status of an electronic trading exchange server connection 20, 22. As a minimum, "Connecting," "Connected" and "Not Connected" statuses are indicated for the electronic trading exchange server connection.

If settings (e.g., accounts, contracts, etc.) change on a host system 20, 22, 24, the application 30 updates the settings. The user does not have to log back in to see the changes. The application 30 has the ability to detect if any changes to accounts or contracts have been made. The application 30 is able to detect when a system administrator has changed a network address (e.g., an Internet Protocol (IP) address, etc.) of the primary transaction server for a client.

The application 30 can log off of one network address and log onto another. Data integrity is maintained when a network address change has been made. The application 30 notifies the user of any working orders or open positions before closing. The user has the opportunity to cancel the logout if they would like to cancel working orders or close the open positions. The application 30 performs the normal logoff cycle when closed by the user. The application 30 saves all data needed to return it to the state it was in when the application 30 was closed. The application 30 saves all data necessary to restore it to the current state in the case of a catastrophic application 30 failure. If the user does not choose to download the most recent version of the application 30 upon startup, a message appears upon logoff asking the user if they would like to install the upgrade before closing.

The application 30 gracefully log users out at end of day. The user receives a warning message, stating that the session is about to be closed. The user needs to log back in to reestablish the connection. The application 30 allows the user to combine the display of data of different types. Data types include, but are not limited to, Orders, Fills, Positions and Market Data. The application 30 supports the functionality exposed through the current version of a client API.

The application 30 supports data format differences between exchanges that are not normalized by the client API. The application 30 supports differences between exchange order handling semantics that are not normalized by the client API. The application 30 gracefully handles spreads. The application 30 support systems with multiple monitors. All exchange contracts supported by a platform are considered by the application 30. Online user documentation is available to the user. The application 30 runs on Windows 2000, Windows XP operating systems and other windowed operating systems (e.g., Linux, etc.). The application 30 architecture is flexible in order to allow additional functionality to be added when needed.

Standard Windows Grid

In a Standard Windows Grid, a user can select from a list of columns to display. The user is able to add or remove columns, but all columns may not be able to be removed and certain columns may need to be added in order to add other columns (if there are dependencies). Each window will have certain columns that appear in the grid by default. The grid has a column heading with a caption (column name).

The user can change an order of the displayed columns by dragging the column heading to a new position. The user can manually resize a column. The user can resize all columns to fit the screen. The user can resize all columns to fit their contents. The user can resize a selected column to fit the column's contents. This is accomplished by double clicking on the column heading's right border. The user can change the foreground and background colors of a column. The user can rename any grid column. The user can restore the default grid column names. The user can restore all default grid settings.

The user can change the font for all columns in the grid. This includes, but is not limited to font type, color and size. The user can change the font for an individual column. This includes, but is not limited to, font type, color and size. The user can sort the data in the grid by clicking on a column heading. The user can sort the data in ascending or descending order. The user can create multiple sort criteria. The user can create a filtered view of the information in a grid. The user can filter on multiple criteria for non-numeric columns. Filters can include more then one column. Multiple filters for numeric columns can be created (e.g., for an =, ≠, <, >, ≤ or ≥ operation, etc.). This functionality also allows the user to choose a range. The user can remove filters from a grid. Data in a grid will continue to be updated while a filter is applied.

Login Window

A Login window will be launched via the application 30 when the application 30 is first accessed by the user. A user will enter a user name and password in order to log into the application 30. A successful login will allow the user full access to multi-windowed GUI 32 functionality. A failed login displays a message to the user, indicating that either the user name or password were invalid, but not which one. If Caps Lock is on, the failed login message the application 30 indicates this fact. The failed login message reminds the user about case sensitivity. The user is able to change passwords. The user does not have to be logged into the communications network 18 to change passwords.

The application 30 updates a database with the new password. All characters entered into a password field will be visible to the user as asterisks. A single login allows the user access to all supported and enabled exchanges.

Application Manager Window

An Application Manager Window allows the user to access all of the functionality of the application 30. It is via these windows that other application windows are launched and managed. The GUI 32 windows are automatically launched once the user has successfully logged in. Only one Application Manager window is launched by the application 30.

The Application Manager Window, by default, is a member of every display layout on the GUI 32 and cannot be removed. The user is able to view a list of available Desktop Layouts and select one to work with.

The user can create a new Tools window, Settings window, Contact and Quotes Window, Orders and/or Fills window, Positions/Market Data window, Aggregated Book View window, Order Ticket window and Reports window from the Application Manager Window. The user can also open a saved window from the Application Manager Window.

The user can maintain Desktop Layouts from the Application Manager Window. The user can minimize all windows and restore all windows from the Application Manager Window.

Client Messaging Window

A Client Message Window allows the user to view system messages, trading exchange messages and alerts. This window is automatically launched once the user has successfully logged in. In one embodiment, only one Client Messaging window may be launched by the application 30. In another embodiment, more than one Client Message windows may be launched by the application 30. The Message display, by default, is a member of every display layout and cannot be removed. Users who are logged on must be able to receive system messages, communications from office personnel, electronic trading exchange messages and alerts from various electronic trading exchanges 20, 22. Alert receipts are displayed for the user. The window displays the entry and cancellation of orders (as messages). Alerts are given a priority, including, but not limited to, of "Critical," "High," "Medium" or "Low."

Alerts of a high priority are presented in a more intrusive manner than lower priority alerts. Upon login, users receive alerts from the current day that were sent while they were logged off. The user is able to turn off the display of alerts and are able to turn off the display of messages.

Tools Window

Figure 4:
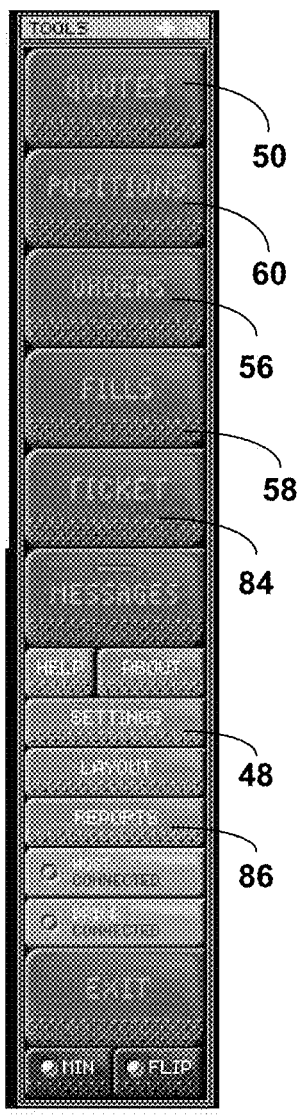
FIG. 4 is a block diagram of a screen shot of an exemplary tools window.
Figure 5:
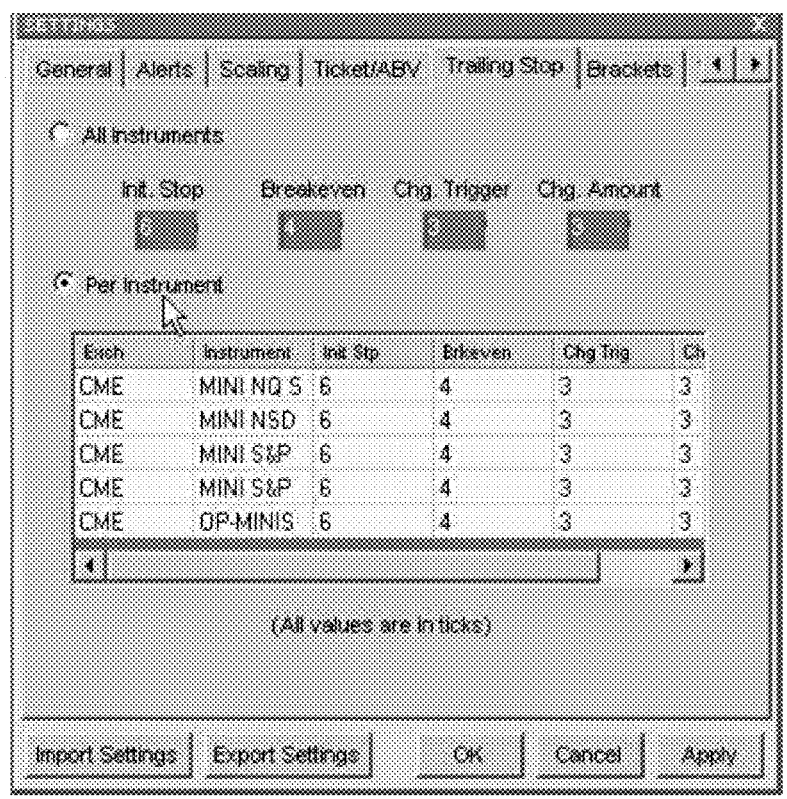
FIG. 5 is a block diagram of a screen shot of an exemplary settings window.

FIG. 4 is a block diagram of screen shot of an exemplary Tools window 46 produced by application 30 and displayed on the GUI 32. The Tools window 46 is used to launch other windows described herein on the GUI 32.

Settings Window

FIG. 4 is a block diagram of screen shot of an exemplary Settings window 48 produced by application 30 and displayed on the GUI 32. The Settings window 48 allows the user to enter application-wide settings (such as defaults, etc.) This window 48 is accessible via the Manager window. The window 48 is different from any other window in the application. Multiple Settings windows cannot be opened, and this window is not part of a Desktop Layout.

The Settings window 48 displays network address (e.g., local and Internet IP addresses) of a target device 12, 14, 16. The Setting window 48 displays the Host and Price server IP addresses and ports that are being used by the application 30.

In one embodiment, the user loads settings from a settings file via the Settings window 48. The settings file contains information necessary to replicate the configuration of an application, including settings and desktop layouts. For audible alerts, each alert should have a different sound. The user can browse for sound files to assign to events. In another embodiment, settings are loaded from automatically from data structure within the application 30.

The user can turn on or off audible and/or visual alerts for the events listed below in Table 1. However, the present invention is not limited to these audible and/or visual alert events and more, fewer or other types of audible and/or visual alert events can be used to practice the invention.

TABLE 1

Logout
Login
Receipt of a fill
Entry of an order
Entry of an order amend
Entry of a cancel request
Receipt of an order
Receipt of a cancel
Receipt of an amend
Receipt of a reject
Receipt of a message
Order state timeouts
Loss of connection to the host server
Loss of connection to the price server
Reconnection to the host server
Reconnection to the price server
Receipt of SARA alerts
A different sound/visual alert is used for each priority level.
Limit breach
Contract breach
Exchange disabled
Stop price triggered for synthetic stops and stop limit orders
Pull all orders
End of day/End of market
By exchange
This information is downloaded on login if an update is needed.
Custom Reminders
OCO fill
OCO cancel
Parked order violated
If Then fill
If Then cancel
P/L bracket fill
P/L bracket cancel The user can set the following defaults for an order ticket listed in Table 2. However, the present invention is not limited to these defaults and more, fewer or other types of defaults can be used to practice the invention.

TABLE 2

Default Account
Default Exchanges and Contracts
Default Order Type
    The user can set the default order type by exchange or to set the same
    default for all exchanges.
Default side
Default Quantity
    The user can set the default quantity by instrument or to set the same
    default for all instruments.
Close after order entry
    The user can determine whether or not the Order Ticket should close
    by default after an order has been entered.
Quantity set to zero after order entry
    The user can determine whether or not the order quantity should
    return to zero once an order has been placed.
Default price for limit orders - Sell
    The user can determine whether the price for sell limit orders should
    default to current bid, ask, or last.
Default price for limit orders - Buy
    The user can determine whether the price for buy limit orders should
    default to current bid, ask, or last.
Other Settings
Always on Top
    The user can set which window should stay on top by default (if any).
    This default may be overridden on a window by window basis.
Order State Timeouts
    The user can set the amount of time that an order can remain in a
    state of Sent, Queued, Cancel Pending or Amend Pending
    before an order state timeout alert is generated.
Custom Reminders
    The user can create and maintain a list of custom reminders, which
    will create an audible and visual alert at the set date and time.
    The user can assign a title, date, time and description to each
    reminder.
    Custom reminders are saved on the local machine.

TABLE 2-continued

ABV Market Depth
    The user can set the amount of market depth displayed on the ABV
    window.
    A Market Depth setting greater than the maximum depth
    disseminated by the exchange will be treated as the exchange
    maximum.
Hot Keys
    The user can assign program shortcuts to keyboard function keys.
Fonts
    The user can set a default font for all text on all windows.
    The user can restore all fonts to the font selected here (after
    changes have been made on individual windows).
Key Pad (for Quantity)
    The user can assign the values for keypad buttons.
    These values will be displayed on the key.
Order Quantity Limits (Fat Finger Rules)
    The user can set the maximum quantity that may be entered for
    an order.
    An order exceeding this limit will not be entered.
Commissions
    The user can enter commission amounts by exchange and/or by
    instrument.
    The commissions set here are used in the user's P&L calculations.
Print Reports
    The user can choose whether or not a window should appear upon
    logoff, asking if reports should be printed.
    From the window (if displayed), the user should be able to specify
    which reports are printed.

Contracts and Quotes Window

Figure 6:
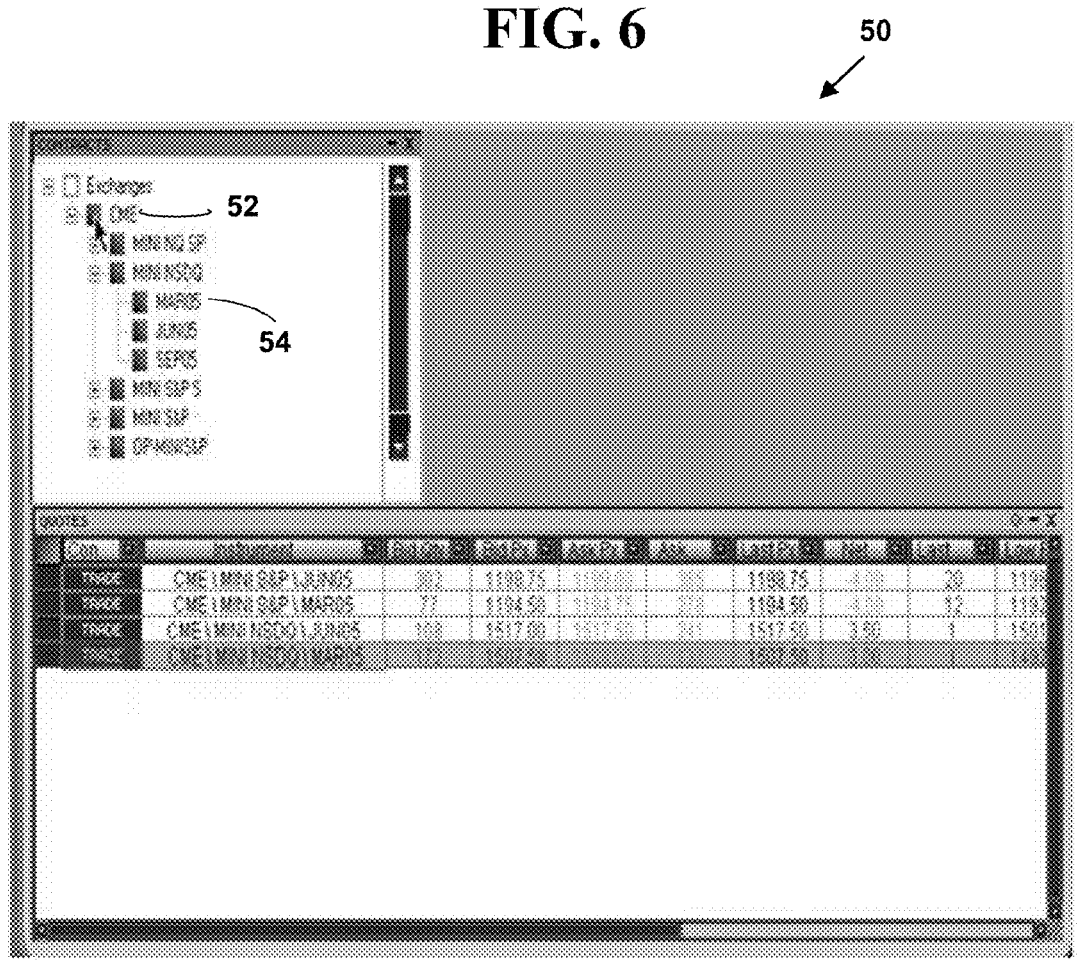
FIG. 6 is a block diagram of a screen shot of an exemplary quotes and contracts window.

FIG. 6 is a block diagram of screen shot of an exemplary Quotes and Contracts window 50 produced by application 30 and displayed on the GUI 32. The user can select which exchange 52 (e.g., Chicago Mercantile Exchange (CME), Chicago Board of Trade (CBOT), New York Stock Exchange, etc.) and which instruments, contract and contract date combinations (e.g., Mini NSDQ March 2005) to display 54. Market data associated with a position by the unique instrument information is also displayed.

Order and Fills Windows

The user is able to display any combination of order and fill information that they choose (although some information must be displayed in order for other information to be displayed) in Order and Fill windows respectively. The user is provided with an Orders template and a Fills template, which will each display different default data (and, therefore, provide different functionality based on user defined preferences set via the Settings window 48).

Figures 7, 8:
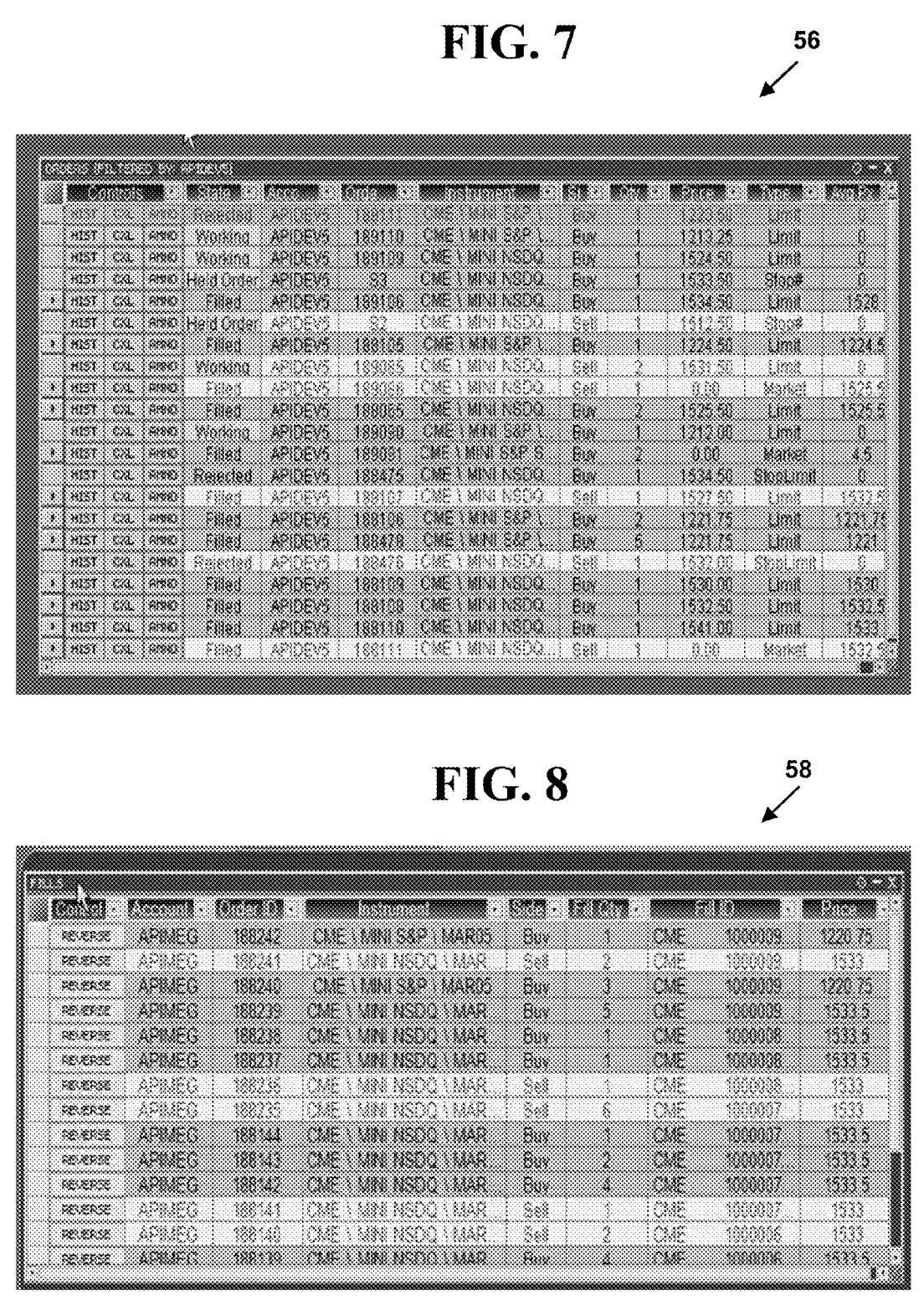

FIG. 7 is a block diagram of screen shot of an exemplary Order window 56 produced by application 30 displayed on GUI 32. Typically, an order is created by the user and submitted to an electronic trading exchange 20, 22 for possible execution. One exception to this is the Parked order. In this case, the application 30 saves the order until it is released by the user to the electronic trading exchange 20, 22.

In one embodiment, the Order window 56 displays, but is not limited to, a controls identifier, a state identifier (e.g., rejected, working, filled, held) an account identifier (e.g., APIDEV5), an order number, an instrument identifier (e.g., CME\MINI S&P), a side designation identifier (e.g., buy or sell), a quantity, a price, a type identifier (e.g., limit, predefined stop price, market price) an average price. However, the present invention is not limited to displaying these items and more, fewer or other items can be displayed in the Order window 56 to practice the invention.

FIG. 8 is a block diagram of screen shot of an exemplary Fills window 58 produced by application 30 displayed on GUI 32. Typically, a fill is an acknowledgment from an electronic trading exchange 20, 22 where the order was submitted that all or part of the order was executed. A special case is an external fill. An external fill is submitted manually by a system administrator.

In one embodiment, the Fills window 58 displays, but is not limited to, a control identifier, an order identifier, an instrument identifier, a side identifier, a fill quantity, a fill identifier and a fill price. However, the present invention is not limited to displaying these items and more, fewer or other items can be displayed in the Fills window 58 to practice the invention.

A new or saved Order and Fill windows 56, 58 can be launched from the Application Manager window. When the user creates and submits an order to an electronic trading exchange 20, 22, an order with a quantity greater then the maximum order limit will be rejected by the application 30. The user can create a trailing stop order against a filled order. The user is also able to create a Profit/Loss bracket around a filled order.

The user can also create a "Parked" order. A Parked order is an order that is created by the user but not submitted to an electronic trading exchange 20, 22. Parked orders are saved by the application 30 and made available to the user between application 30 launches. The user can change a working order to a parked order and visa versa. Changing a working order to a parked order, the application 30 sends a cancel to the selected electronic trading exchange 20, 22. On receipt of the cancel acknowledgement, the application 30 will change the order state to indicate that the order is parked.

The user can also submit a Parked order to an electronic trading exchange 30. The user can submit all parked orders at once. The user can select certain parked orders to submit (at once). The user can change the electronic trading exchange and/or contract for a parked order. If the user changes the contract, the application 30 will verify that the entered price is valid for the new contract. If the entered price is invalid for the new contract, the application 30 will prompt the user to change the price. The user can change the account for a parked order.

The user can cancel a working order. In one embodiment, a working order can be canceled with a single mouse click. In another embodiment a working order can be canceled with two mouse click, one to cancel the order and one to confirm cancellation. The user can cancel all working orders in a selected account, cancel all working buy orders in the selected account, all working sell orders in the selected account.

The user can delete a parked order. The use can delete a parked order with a single mouse click. The user can delete all parked orders in a selected account. The user can delete all parked orders in all accounts.

The user can change the following order information (for a working order) illustrated in Table 3. However, the present invention is not limited to this order information and more, fewer or other types of order information can be used to practice the invention.

TABLE 3

Prices (stop/limit/stop limit)
Quantity
    The user must be able to display the detailed order history for an order (both parked orders and those submitted to an exchange.
The order history includes orders that led to the current order if the order was created by a cancel/replace or a parked order.

The user can also create a trailing stop order against a fill. The user can create a Profit/Loss bracket around a fill. The user can launch an Order Ticket window from a specific fill. When an Order Ticket is opened from a fill, the ticket is pre-populated with the data that corresponds to that fill (e.g., exchange, instrument, quantity, etc.) The side of the Order Ticket will be opposite that of the fill. Supported order types will be available to be created from the Order Ticket. Trailing stops and brackets can be linked to another order, such as a limit order. When this order is executed the Trailing Stop or bracket, etc. is then submitted to the market, or held "working" on the target device 12, 14, 16.

The Fills window 58 displays a detailed view of a fill. A fill detail includes all available fill information (including partial fills). The application 30 handles external fills. The application 30 uses separate display indicators if the fill is external (e.g., color difference, etc) on the GUI 32.

In one embodiment, Order and Fill information is displayed following standard window rules laid out by the Standard Window. The data in this Order and Fill window is displayed in the standard grid format, as described in the Standard Grid. This window will display order and fill data. The user chooses which fields should be displayed in the grid (some fields will appear by default) on the GUI 32.

Table 4 illustrates a list of order information that used in the Order and Fill windows 56, 58. Most of the information is exposed through the APIs used. However, in a few cases the information is calculated. These exceptions are indicated where they occur. However, the present invention is not limited to this order information and more, fewer or other types of order information can be used to practice the invention.

TABLE 4

Order ID
Display ID
Exchange Order ID
User Name
Trader Account
Order Type
Exchange Name
Contract Name
Contract Date
Buy or Sell
Price
Price2
Lots
Linked Order
Amount Filled
Number of Fills
Amount Open
    This field is calculated by the application 30 using contract lots minus amount filled.
Average Price
    This field (the average price of all fills that make up an order) is calculated by the application 30 because the API does not return the correct value if there is only one lot.
Status
Date Sent
Time Sent
Date Host Received
    This field will not displayed to the user, but is used for logging.
Time Host Received
    This field will not be displayed to the user, but is used for logging
Date Exchange Received
    This field will not be displayed to the user, but is used for logging.
Time Exchange Received
Date Exchange Acknowledged
Time Exchange Acknowledged
Non Execution Reason
Good-Till-Date Table 5 illustrates a list of fill information that used in the Order and Fill windows 56, 58. Most of the information is exposed through the APIs used. However, in a few cases the information is calculated. These exceptions are indicated where they occur. However, the present invention is not limited to fill information and more, fewer or other types of fill information can be used to practice the invention.

TABLE 5

Figures 9, 10:
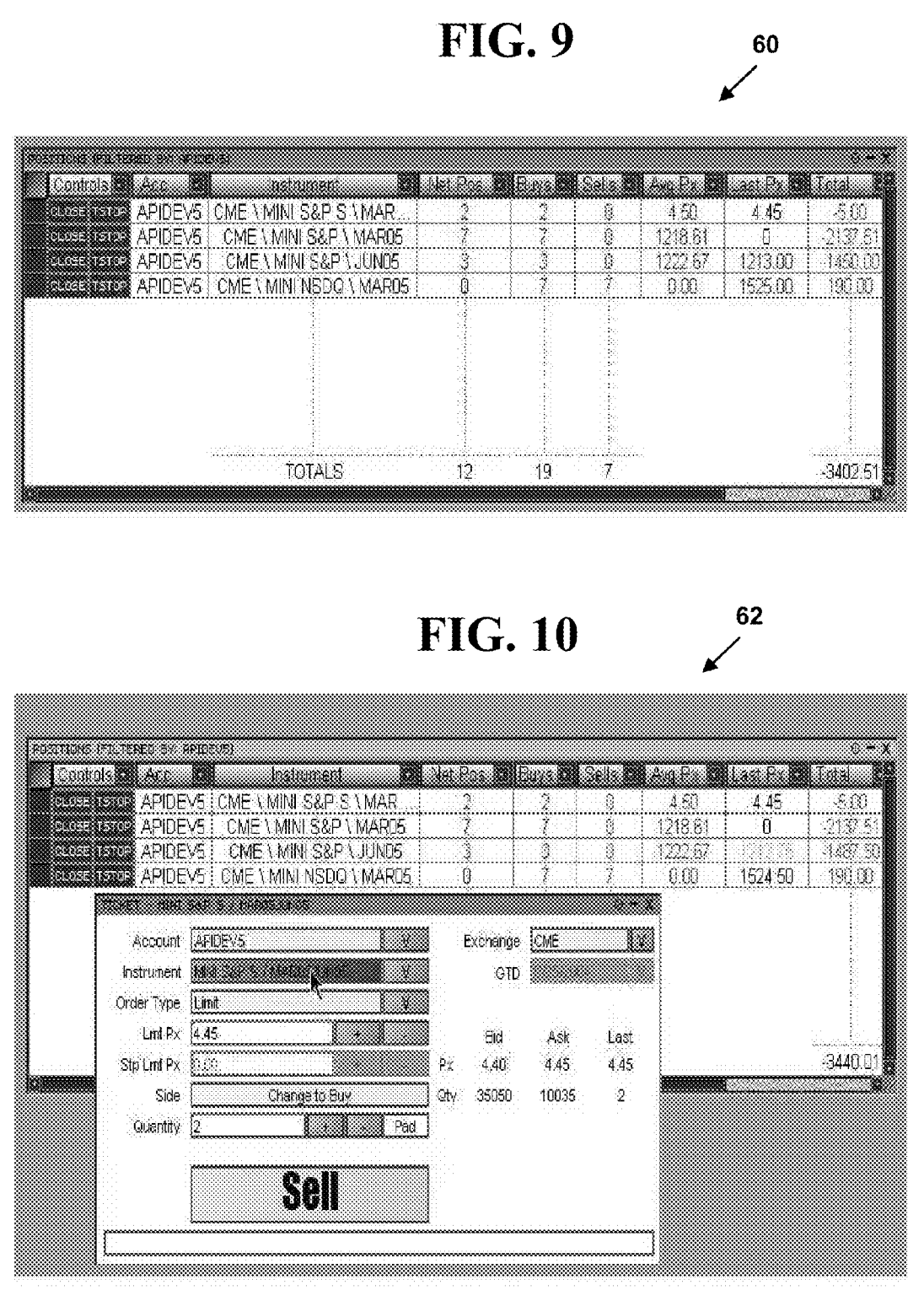

Display ID
Exchange Order ID
User Name
Trader Account
Order Type
Exchange Name
Contract Name
Contract Date
Buy or Sell
Lots
Price
Average Price
    This field will need to be calculated by the application because the API does not return the correct value if there is only one lot.
Date Filled
Time Filled
Date Host Received
    This field will never be displayed to the user, but is used for logging.
Time Host Received
    This field will never be displayed to the user, but is used for logging
Fill Type
Fill, External, Netted, Retained Positions/Market Data Window FIG. 9 is a block diagram of screen shot of an exemplary GUI 32 Position and Market Data window 60 produced by application 30 displayed on the GUI 32. The Positions and Market Data Window 60 provides representation and display of open positions and market data in the application 30.

In one embodiment, the Positions and Market Data window 60 includes, but is not limited to a display of a controls identifier, an account identifier, a net position, a number of buys, a number of sells, an average price, an last price and a total. However, the present invention is not limited to displaying these items and more, fewer or other items can be displayed in the Position and Market Data window 58 to practice the invention.

The user can display any combination of order and fill information that they choose (although some information must be displayed in order for other information to be displayed). The user is provided with an Orders template and a Fills template, which will each display different default data (and, therefore, functionality).

An "open position" is a long, short, or profit or loss in an instrument or contract in an account. This open position is the aggregation of all the fills received in the instrument. Market data is delivered to the application 30 in real-time through the APIs used. A new or saved Positions/Market window 60 can be launched from the Application Manager window. The user can launch an Order Ticket window 84 from a specific position.

FIG. 10 is a block diagram of screen shot of an exemplary Position and Market Data window for an Order Ticket from a sell position 62 produced by application 30 and displayed on the GUI 32. When a ticket is opened from a position, an Order Ticket window 84 is pre-populated with the data that corresponds to that position (e.g., exchange, instrument, quantity, etc.). For example in FIG. 10, an Order Ticket window includes data (e.g., APIDEV5, CME\MINI S&P, Limit, Limit Px 4.45, Quantity 2, etc.). The side of the Order Ticket will be opposite that of the position. The user can launch a window that will allow them to create a Profit/Loss (P/L) Bracket around an open position. The order sides default to opposite of the position. The order quantities default to the position quantity. The user can also launch a window that will allow them to create a Stop or Stop Limit order against an open position.

Figure 11:
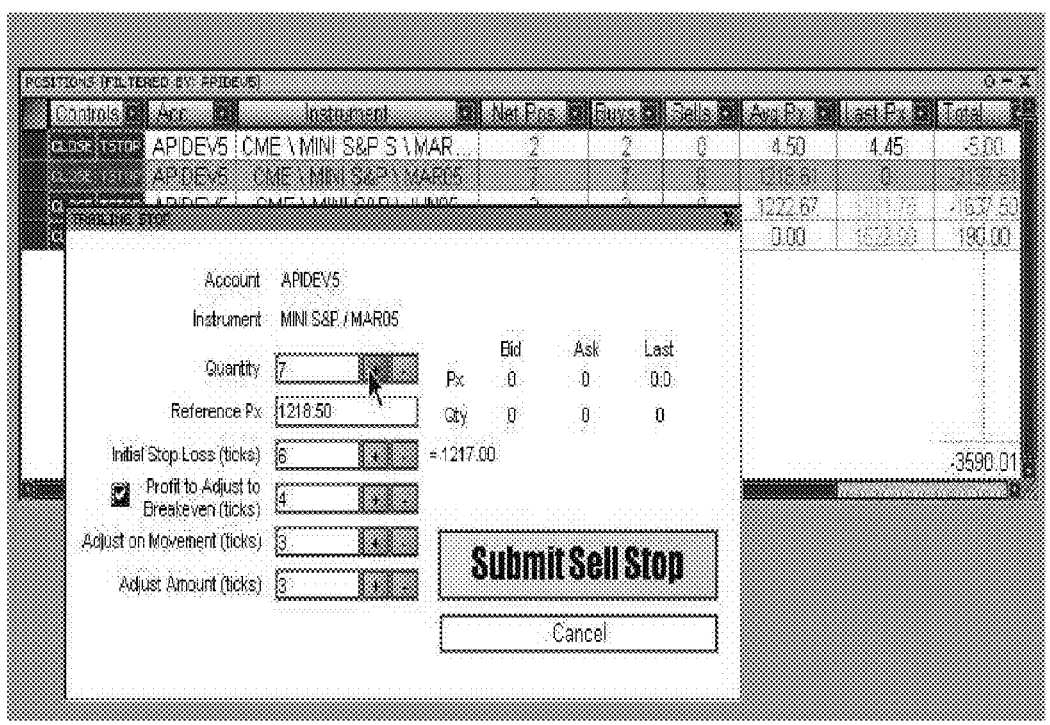
FIG. 11 is a block diagram of a screen shot of an exemplary position and market data window for a stop order.

FIG. 11 is a block diagram of screen shot of an exemplary Position and Market Data window for a sell stop order 64 produced by application 30 displayed on the GUI 32. The order side defaults to opposite of the position. The order quantity defaults to the position quantity. The user can also launch a window that will allow them to create a Limit order against an open position. The order side defaults to opposite of the position. The order quantity defaults to the position quantity.

The user can display all of the fills that comprise a position. The user can flatten the open position in the instrument for the selected account. The window 60 includes a Flatten button for flattening a net position. When the user chooses to flatten, working orders for the instrument are canceled and an order is entered that flattens the net position (i.e., the quantity of the order will be equal to the net position and the order will be placed on the opposite side of the net position). The flattening is achieved with a single order (i.e., the user cannot enter more than one order to flatten).

Position information and Market Data is displayed following standard window rules laid out in the Standard Window. The data in this window 60 is displayed in the standard grid format, as described in the Standard Grid.

Table 6 illustrates a list of position information that is available from this window 60. However, the present invention is not limited to this position information and more, fewer or other types of position information can be used to practice the invention.

TABLE 6

Account
Exchange Name
Contract Name
Contract Date
Net Position
Avg. Price
Open P&L
Cumulative P&L
Total P&L
Commission The GUI 32 will also show market data and position information. The user chooses which fields should be displayed in the grid (i.e., some market data fields will appear by default). Table 7 is a list of market data that is available from this window 60. However, the present invention is not limited to this market data more, fewer or other types of market data can be used to practice the invention.

TABLE 7

Exchange Name
Contract Name
Contract Date
Bid Price
Bid Size
Ask Price
Ask Size
Last Traded Volume
Net Price Change
Last Traded Price
High Price
Low Price
Opening Price
Closing Price
Total Traded Volume
Contract Status
    This is the status of the contract on the exchange (i.e. open, pre-open, trading, etc.)

Aggregated Book View (ABV) Window

The ABV Window allows the user to view bid size and offer size by price for a particular instrument in a market depth-type format. The window displays working orders for a selected account in a single instrument. The data on this window is displayed and updated in real-time. The window also allows the user to enter various order types. In one embodiment, two ABV widows are displayed by default. In another embodiment, one or more than two ABV windows are displayed by default.

Figure 12:
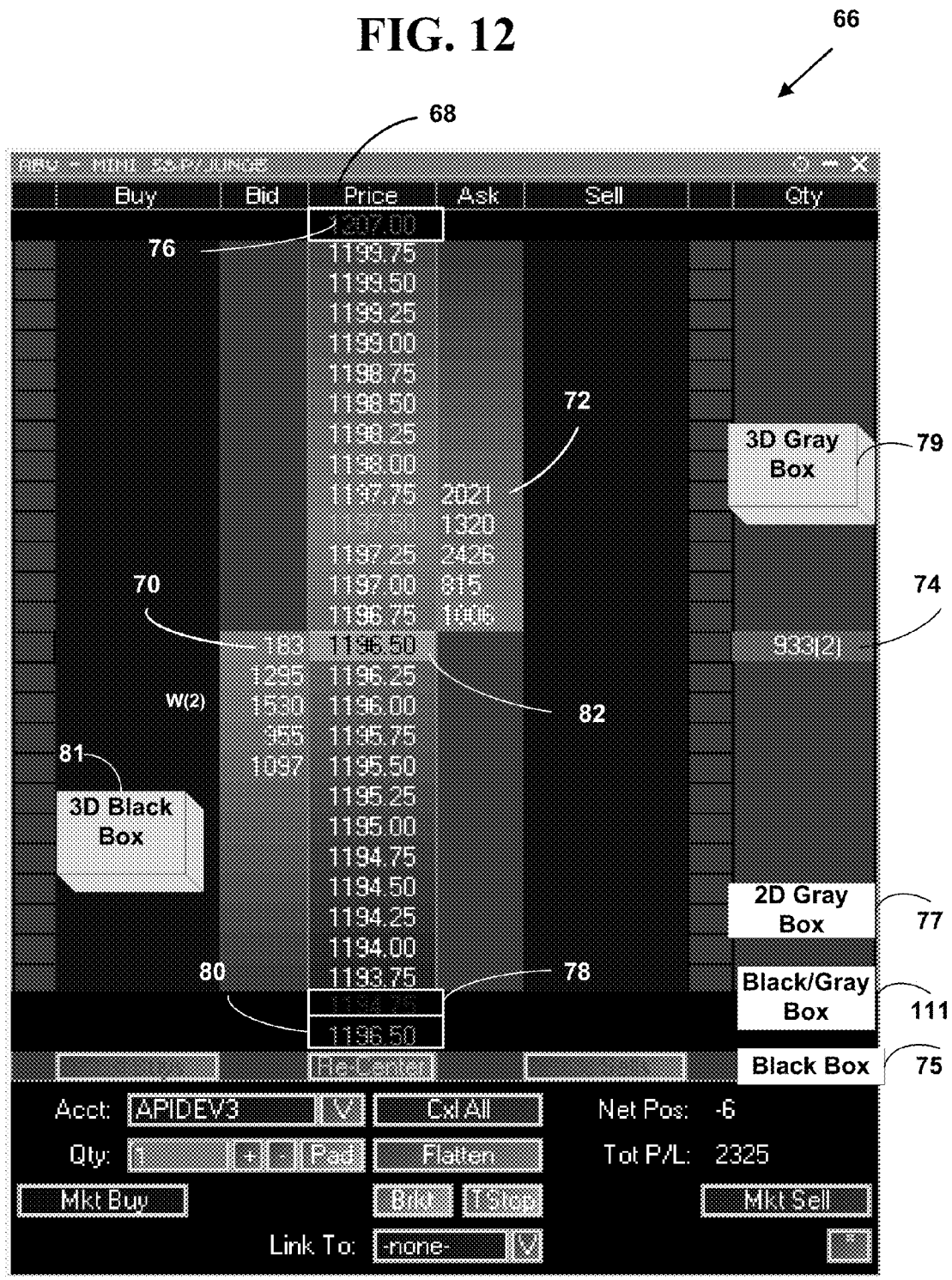
FIG. 12 is a block diagram of a screen shot of an exemplary ABV window.

FIG. 12 is a block diagram of screen shot of an exemplary ABV window 66 produced by application 30 displayed on GUI 32. The ABV window 66 includes a dynamically displayed Price column 68.

In one embodiment, the ABV window displays a buy column, a bid column, a dynamic price column, an ask column, a sell column, a quantity column, a re-center button, a cancel buy button, a cancel sell button, a cancel all button, a market buy button, a flatten button, a bracket button, a TStop button, a net position and a total P/L. However, the present invention is not limited to displaying these items and more, fewer or other items can be displayed in the ABV window 66 to practice the invention.

The user can select an instrument or contract to view in an ABV window 66, and can change the instrument or contract from this window 66. Changing the instrument or contract changes the data displayed to that of the selected instrument or contract. The user can select an account from available accounts. The window 66 displays the total quantity of orders working in the market at each price. Both buy and sell quantities are displayed. Quantities are updated as the instrument order book changes. The window 66 displays an indicator depicting the all of the user's open orders, for the selected account, at each price. The window 66 indicates a state of each order. Open order states include, but are not limited to: Queued, Sent, Working, Part Filled, Cancel Pending and Amend Pending, Held, Cancelled, Filled.

This window 66 indicates the order type for each order. The window 66 indicates the working quantity of each order. The window 66 displays parked orders for the selected instrument. The window 66 displays the user's net position in the selected instrument for the selected account. The window 66 displays the trade quantities for each corresponding price level. The user can select to view the total quantity currently trading at a price. This quantity is increased as each trade at a price occurs. The cumulative quantity remains in the window 66 until the price changes (at which time the cumulative trade quantity for the new price will be shown).

The user selects to view the last quantity currently trading at a price. This view shows the individual trade quantities. Only quantities for the current price are shown. The window 66 displays the total traded volume for the instrument. The window 66 displays all of the aforementioned data at once.

The user sets and adjusts the specified quantity for orders entered via this window 66. The quantity is set via a spinner, text entry or keypad entry. Each key-pad input increases a specified quantity by an amount displayed on the key (key value). The user selects to have the specified quantity set to zero after order entry. The user resets the quantity to zero (i.e., without entering an order). A right click on the mouse increases the quantity, left click decreases the quantity.

Orders entered via this window 66 will have a quantity equal to the quantity specified at time of entry. The default account for any orders entered from the ABV window 66 is the selected account. The can enter a limit order by clicking a cell in the bid quantity or offer quantity columns. Limit orders are default order type.

Order side will be set to BUY if the user clicks in the bid quantity column 70. Order side will be set to SELL if the user clicks in the offer quantity column 72. Orders will have a quantity equal to the specified quantity. Order limit price must equal the price corresponding to the clicked offer/bid quantity.

The user enters a stop order by clicking a cell in the bid or offer quantity columns 70, 72. Order side will be set to BUY if the user clicks in the bid quantity column 70. Order side will be set to SELL if the user clicks in the offer quantity column 72. Orders must have a quantity equal to the specified quantity. The order stop price will equal the price corresponding to the clicked offer/bid quantity. The order is entered for the selected account. The user is able to enter a buy stop below the market or a sell stop above the market. If the user does this, a window appears, warning the user that the buy or sell will be immediately executed.

The user can enter an OCO (One Cancels Other) pair of orders. The user can also enter a profit/loss bracket. The user can enter a trailing stop. The user can also enter an "If-Then Strategy."

The user can change the limit price of a working limit order by dragging the working order indicator to a new price. The user can change the stop price of a working stop order by dragging the working order indicator to a new price. This will cause a cancel replace to be entered at the electronic trading exchange 20, 22. The user can change the quantity of a working order by right clicking in the cell displaying the working order. A right click on a mouse displays a context menu listing order quantities centered on the current quantity. The user can also adjust account number.

The user can cancel a working order with a single mouse click. The user can cancel all open orders in the instrument for the selected account. The can cancel all open buy orders in the instrument for the selected account. The user can cancel all open sell orders in the instrument for the selected account.

Users can have orders at a price displayed as a concatenated total, or displayed as each individual order. When the display of individual orders is to large for the display, individual orders will be displayed starting with the first order entered and then the remaining orders that do not fit in the display will be concatenated. Concatenated orders are indicated as such using a symbol that is attached to the total. Users can also adjust the display of the ABV by adding or removing columns, buttons and functions.

The user uses the open position in the instrument for the selected account. This window 66 includes a Flatten button for flattening the net position. When the user chooses to flatten, all working orders for the instrument are canceled and an order is entered that flattens the net position (i.e., the quantity of the order will be equal to the net position and the order will be placed on the opposite side of the net position). The flattening is achieved with a single order (i.e., the user cannot enter more than one order to flatten).

The user can center the dynamic Price column 68 on the current market. The user can scroll the dynamic Price column 68 to display prices above or below the current market. All data is displayed real-time.

This ABV window 66 follows the standard window rules laid out in the Standard Window. The data in this window is displayed in a grid, but this grid will not follow all of the standard grid rules.

The user can choose from a list of columns to display. Certain columns will be displayed by default. Certain columns will not be removable (price for example). The user can change the order of the displayed columns by dragging a column heading to a new position. The user can manually resize a column. The user can resize all columns to fit the screen. The user can resize all columns to fit the contents. The user can resize a selected column to fit the contents. Double clicking on the column heading border sizes a column so that data only is displayed with no redundant space.

The user can change the font for all columns in the grid. The user can change the font for an individual column. The user can change the foreground color of a column. The user can change the background color of a column. The user can restore the default grid settings.

The ABV window 66 is resizable. When it is resized, the columns expand and contract so that all data is still shown. However, after resizing the window, the user can resize the columns to get rid of wasted space and then change the font size (i.e., so it's more readable when the screen is small).

This ABV window 66 will display the following fields illustrated in Table 8 in a ladder format. However, the present invention is not limited there fields and more, fewer or other types of fields can be used to practice the invention.

TABLE 8

Price
    Centered on the current market prices when launched.
Market Bid Quantity
Market Offer Quantity
Trade Quantity as determined in section 11.3 above
Open Buy Orders indicating status, type and quantity for each order
Open Sell Orders indicating status, type and quantity for each order
Parked Orders The ABV window 66 displays real-time data for a particular contract, allowing a user to get a current snapshot of the market. Thus, the ABV window 66 can also be considered an "Ask, Bid, Volume" window.

An instrument or contract can be added to an open ABV window 66 in the same way that a contract was added to the Quotes window 50. Simply select the contract that to display and then drag it into the ABV window 66. Contracts can be dragged from any of the windows displayed on the screen.

Once a contract has been added to the ABV window, the data illustrated in Table 9 is displayed on the ABV window.

TABLE 9

A current number of Bids 70 and Asks 72 on an electronic trading exchange 20, 22 for particular price levels.
A total quantity currently trading at a certain price.
A number in parentheses 74 next to the total quantity is the last quantity traded at that price.
A price in red is the daily high 76. A price shown in blue is the daily low 78. A last traded price is shown in gray 80.
The last traded price 82 is also highlighted on a dynamic price column 68. When there has been an uptick in this price, this cell will be green. When there has been a downtick, this cell will be red. If there has been no change, this cell will appear yellow.
The Buy and Sell columns display a total number of open orders at each particular price. For example, a "W2" in the Buy column indicates that there are working orders with a total quantity of two at the specified price.
Net Position and Total P/L on the ABV can be monitored by simply referring to the lower right hand corner of the window.

On the ABV window 66, the price of any open Buy or Sell orders can be amended. To change the price of an order, a row selector that corresponds with the order to amend is selected buy left-clicking and holding down a left mouse button, dragging a cursor connected to the mouse up or down to a desired new price and releasing the mouse button. A white cursor arrow appears to indicate a change in price. The price amended will be submitted as soon as the mouse is released. If there multiple orders at the same price (and on the same side), all of the orders will be amended to the new price when dragging the concatenated order. The user can cancel a signal order at a price where multiple orders exist. They can also modify a single order at a price where multiple orders exist. They do this by selecting the individual order and dragging and dropping.

Another feature of the ABV window 66 is that a desired position on the dynamically displayed Price column 68 can be moved. If it is desired to scroll up or down on a market price on the dynamically displayed Price column 68, the dynamically displayed Price column 66 is hovered over with a mouse. A yellow cursor arrow will appear, pointing up if the mouse cursor is in the top half of the dynamic price column 68, or down, if the mouse cursor is in the bottom half of the dynamic Price column 68. Clicking on the cursor arrow will scroll the grid in the direction that the arrow points.

The ABV window 66 provides a dynamic Price column 68 centered upon the lasted traded price that dynamically, automatically and continuously changes and moves with fluctuations in the last traded price. To enter an order, a mouse cursor is hovered anywhere in the ABV window 66. This mouse hover puts a user in the "order entry mode." In the order entry mode a trade near last traded price can be entered or prices on the dynamic price column can be manually adjusted away from the last traded price. To scroll up or down the market prices on the dynamic Price column 68 to enter a trade, the mouse cursor is hovered over the dynamic Price column 68. A large yellow arrow will appear, pointing up if the mouse curser is in the top half of the dynamic price column, or down, the mouse cursor is in the bottom half of the dynamic price column. Clicking on the large yellow arrow will scroll the prices in the dynamic price column in the direction that the large arrow points so a trade can be entered away from a current market price.

If the dynamic Price column 68 is scrolled up or down and the last traded price is not centered on your ABV, the dynamic price column will start to scroll until the last traded price is again centered in the ABV window 66. In addition, if there is no further activity from a mouse for a period of time the dynamic Price column 68 will also start to scroll. As a visual indication, just before the dynamic price column begins to scroll, the mouse cursor will turn yellow and start to flash. This is a warning that the ABV window is about to begin re-centering around the last traded price. If, at any time, the mouse cursor is moved out of the ABV window, you leave the order entry mode and the ABV will automatically re-center the dynamic price column on the last traded price the next time the market price changes.

Stop and limit orders can also be entered on the ABV window 66 with just a click of a mouse. Before entering limit or stop orders an account is chosen and a quantity is entered. If a user has access to multiple accounts, the user can select the desired account by using the Account drop down menu. The user can input a number of lots to trade by typing the number in, by using the + or − buttons, or by using a keypad. A default quantity can be set via the Settings window. After selecting an account and quantity, limit and stop orders can be placed.

To enter a Buy Limit order, the mouse is clicked in the Bid column next to the Price to enter the order for. A limit order to buy will be entered at that price for the quantity specified, and a new working order will be reflected in the Buy column.

Likewise, to enter a Sell Limit order, the mouse is clicked in the Ask column next to the Price to enter the order for.

To enter a Buy Stop order, the mouse is right-clicked in the Bid column next to the Price to enter the order for. A stop order to buy will be entered at that price for the quantity specified, and a new order will be reflected in the Buy column. Similarly, to enter a Sell Stop order, the mouse is right-clicked in the Ask column next to the Price that you want to enter the order for.

In addition to Limit and Stop orders, Market orders can be executed on the ABV window 66 using the Market Buy and Market Sell buttons. The ABV window can also be set up so that a Bracket or Trailing Stop order will automatically be created any time an order entered via the ABV is filled. The Bracket and Trailing Stop parameters will default to the values set up on the Settings window. To link a Bracket or Trailing Stop order to all orders entered via the ABV, choose Bracket or TStop from the Link To drop down box. A small window pops up with the default parameters for a bracket. The bracket levels can be changed by typing in a desired number, or using the "+" and "−" buttons. A limit order will be the profit order type, and for a loss order type, either choose a stop or a trailing stop can be selected.

For example, if a stop order is chosen, as soon as the order was filled, two new orders were entered. A limit order was created at a price that is five ticks above the market order's price and a stop order was created at a price that is three ticks below the market order's price Both orders have the same quantity that the market order had. Because these orders were entered as part of a bracket, when one of these orders is filled, the other will automatically be cancelled. Likewise, TStop is chosen from the Link To drop down box, a small window will appear that allows you to view and change trailing stop parameters. Like the bracket, a trailing stop will be entered once an order entered via the ABV window 66 is filled.

The ABV also allows cancellation of some or all of working orders as well. To cancel a particular order, the mouse cursor is placed over that order in the Buy or Sell column, whichever applies, and a yellow X appears over the working order. A mouse click on the yellow X will cancel that particular order. If multiple orders are entered at the same price (and on the same side), they will all be cancelled.

Order Ticket Window

Figure 13:
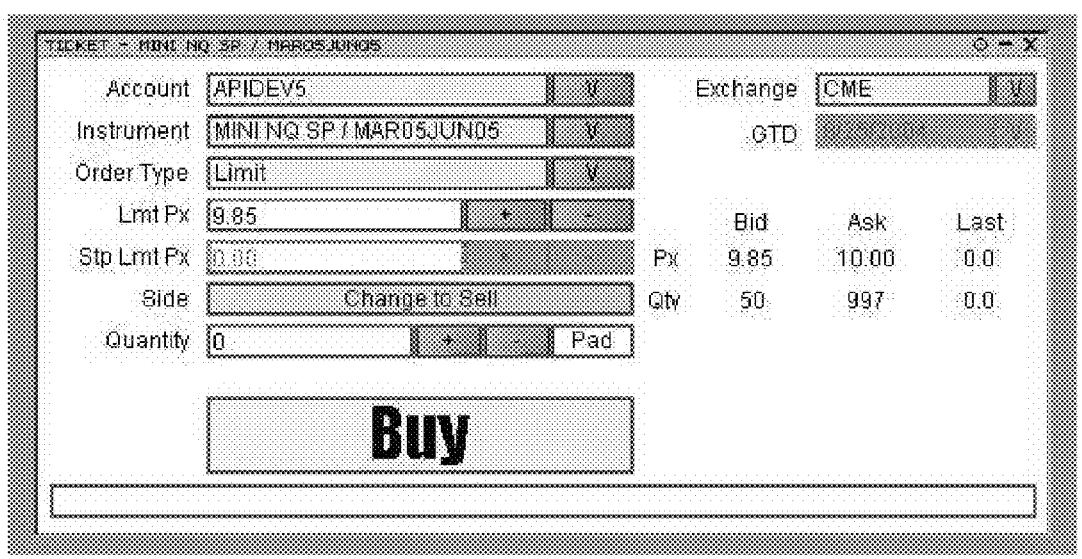
FIG. 13 is a block diagram of screen shot of an exemplary order ticket window.

FIG. 13 is a block diagram of screen shot of an exemplary Order Ticket window 84 produced by application 30 and displayed on GUI 32. This window 84 allows the user to create and enter all types of orders supported by the application and the APIs used. This window 84 is accessible via all windows except for Login, Settings, Client Messaging and Reports windows. Multiple order tickets can be launched and multiple windows 84 will be created. The Order Ticket window 84 is a member of a Desktop Layout. Order types, including Synthetic order types can be entered from this window.

In one embodiment, the Order Ticket window 84 displays, but is not limited to, an account identifier, an instrument or contract identifier, an order type, a limit price, if any, a stop limit price if any, a side identifier, a quantity identifier, an exchange identifier a current bid, ask, and last traded price, a current bid, ask or last traded quantity and a buy or sell identifier. However, the present invention is not limited to displaying these items and more, fewer or other items can be displayed in the Order Ticket window 84 to practice the invention.

If necessary, the Order Ticket window 84 will change or launch supporting windows to accommodate more complex order types. In one embodiment, the Order Ticket window 84 displays, but is not limited to, an account identifier, an instrument or contract identifier, an order type, a limit price, if any, a stop limit price if any, a side identifier, a quantity identifier, an exchange identifier a current bid, ask, and last traded price, a current bid, ask or last traded quantity and a buy or sell graphical button. However, the present invention is not limited to this embodiment and other embodiments can be used to practice the invention.

The user can select the account that the order applies to. The user can change the side of the order. The ticket background color depends upon the side chosen. For example, the background is set to blue for buy orders and set to red for sell orders. The following market data is displayed, but is not limited to, on this window 84 for the selected instrument: bid price, bid size, ask price, ask size, and last traded price.

This window 84 also does follow the standard window rules laid out in the Standard Window. The window can also be resized. The user can select to have the order ticket always on top. The default for this functionality is determined in the Settings Window. The Order Ticket window 84 is member of a Desktop Layout window. The Order Ticket window 84 settings are saved when it is a member of a Desktop Layout.

This window 84 is comprised of all the fields necessary to enter an order. The field defaults are set in the Settings window 48, but this window 84 may display different defaults depending on where it was launched from (for example, if it was launched from a specific fill or position).

Table 10 illustrate a list of the fields that are used to create a standard order. Synthetic orders also created directly from this window 84. In another embodiment, a separate window may be launched, or there may be some other method of accessing synthetic order entry. However, the present invention is not limited to this order information and more, fewer or other types of order information can be used to practice the invention.

TABLE 10

Exchange
    The default value for this field is determined from the window where it was launched or in Settings.
Instrument
    This field is filtered to display valid instruments based on the exchange that is selected.
Contract Date
    This field is filtered to display valid contract dates based on the instrument that is selected.
Order Type
    This field is filtered to display valid order types based on the exchange that is selected.
Limit Price
    This field defaults to either the current bid, ask or last as determined by Settings and by the side.
    This price does not change once the order is open.
    This field is enabled only for stop, stop limit, MIT orders and the synthetic equivalents for those order types.
    The use is able to enter the price via keyboard entry or spinner,
Order Quantity
    The user is able to change the specified order quantity through a key-pad control.
    Each key-pad input increases the specified quantity by the amount displayed on the key (the key value).
    The user has ability to set the quantity back to zero.
    The user is able to select to have the specified quantity set to zero after order entry.
Secondary Price
    This field is enabled only for stop limit orders.
Good-Till-Date
    This field is enabled only for orders with TIF (Time in Force) of GTD.
    This field defaults to the current trade date.

Reports Window

FIG. 14 is a block diagram of screen shot of an exemplary Reports window 86 produced by application 30 displayed by GUI 32. The Reports window 86 allows the user to create and enter all types of orders supported by the application 30 and APIs used. This window is accessible via all windows except for Login, Settings, Client Messaging and Reports. Multiple order tickets can be launched. The order ticket can be a member of a Desktop Layout window.

In one embodiment, the Reports window 86 displays, but is not limited to, an account identifier, an order identifier, an instrument identifier, a side identifier, a quantity, a price, an order type, an average price, a state, a price2, file, number of fills and an open column. However, the present invention is not limited to displaying these items and more, fewer or other items can be displayed in the Reports window 68 to practice the invention.

Order types, including synthetic order types are summarized from this window 86. If necessary, the Order Ticket window 84 changes or launches supporting windows to accommodate more complex order types. The user can select the account that the order applies to. The user changes the side of the order. Ticket background color depends upon the side chosen. For example, the background is blue for buy orders ant he background is red for sell orders.

Table 11 illustrates a list of the fields used to create a standard order report. However, the present invention is not limited to this order information more, fewer or other types of order information can be used to practice the invention.

TABLE 11

Exchange
　The default value for this field is determined from the window where it was launched or in Settings.
Instrument
　This field is filtered to display valid instruments based on the exchange that is selected.
Contract Date
　This field is filtered to display valid contract dates based on the instrument that is selected.
Order Type
　This field is filtered to display valid order types based on the exchange that is selected.
Limit Price
　This field defaults to either the current bid, ask or last as determined by Settings and by the side.
　This price does not change once the order is open.
　This field is enabled only for stop, stop limit, MIT orders and the synthetic equivalents for those order types.
　The user is able to enter the price via keyboard entry or spinner.
Order Quantity
　The user is able to change the specified order quantity through a key-pad control.
　Each key-pad input increases the specified quantity by the amount displayed on the key (the key value).
　The user has ability to set the quantity back to zero.
　The user is able to select to have the specified quantity set to zero after order entry.
Secondary Price
　This field is enabled only for stop limit orders.
Good-Till-Date
　This field is enabled only for orders with TIF (Time in Force) of GTD.
　This field defaults to the current trade date.
　This window allows the user to view and print reports.
Screen Access
　This window is accessed via the Manager window. Multiple report windows cannot be launched. The report window is not a member of any Desktop Layout.
Functional Requirements
　No trading functionality is available from this window.

TABLE 11-continued

Fill Report
　The user is able to view and print a fill report by account for the current day.
　The data for this report is saved on the client.
Order History Report
　The user is able to view and print an order history report for the current day or for any range of time up to 30 days.
　History includes parked orders.
　The data for this report should is on the client machine 30.
Orders Entered Report
　The user is able to view a report showing orders entered that were filled for the current day or for any range of time up to 30 days.
　The data for this report is saved on the client.

Client Logs

This functionality allows the user to send error and audit logs. A log of application errors is maintained. Application error logs, created daily, are retained for ten trading days. The user does not have ability to view the application error log. Logs are stored on the client and are not be encrypted, but should not be easily accessible to the user. The user can send the application error log to another location from within the application 30.

An audit log is created. The audit log contains detailed order history, including all available times associated with the order. The log also contains fills associated with the order. The log contains messages pertaining to the application which indicate connection activities and statuses. Audit logs, created daily, are retained for ten trading days. The user does not have ability to view the audit log. Logs are stored on the application 30 and should not be encrypted, but should not be easily accessible to the user. The user can send the audit log to another location from within the network 18.

Specialized Order Functionality

The application 30 also provides specialized order functionality. This functionality is available to the user wherever orders can be entered. The user creates one-cancels-other (OCO) order pairs. An OCO order is one that allows the user to have two working orders in the market at once. With the execution of one order the other is canceled. The user can construct an OCO pair across different instruments traded on a single electronic exchange. The user can construct an OCO pair across different instruments on two electronic trading exchanges. The user can construct an OCO pair combining orders of any order type that is supported by the exchange (or supported synthetic order types).

The user cancels OCO orders before exiting the application 30. If the user has any open OCO's upon logoff, the GUI 32 warns the user that the orders will be cancelled and allow the user to cancel the logoff if desired. By default, entering a quantity for the OCO enters that same quantity for both sides of the OCO.

A complete fill of one order cancels the other order. If there is a partial fill on one leg of the OCO, the other side of the OCO is reduced by the amount that was filled. This functionality will only occur if both legs of the OCO are entered with the same quantity. The user has the ability to turn off this functionality, so that the order quantities don't automatically decrement and the orders are canceled only when one order is completely filled. If the user enters different quantities, this functionality are automatically turned off and disabled.

The user can cancel individual orders of the pair, leaving the remaining order in the market. The user can cancel both orders in the pair simultaneously. The user can change the price for an individual order of the pair. The user can create a profit/loss bracket order pair. A Profit/Loss bracket is a specific case of an OCO order pair. This order pair consists of a limit order to establish a profit and a stop loss order to limit loss. The stop loss portion of the bracket should be able to be a "trailing stop." The use is able to create a profit/loss bracket around an existing position. The user is able to create a profit/loss bracket around a fill. The use can create a profit/loss bracket around an order in the filled state.

The user can create trailing stop orders. A trailing stop is an order that tracks a price of the instrument and adjusts the stop trigger price in accordance with a predefined rule (i.e., stop trigger is changed when the market changes a certain number of ticks).

Trailing stop orders can be either of type stop or stop limit. For stop limit orders, the limit price will be changed such that it keeps the same differential from the stop trigger price. In order to set up the trailing stop rule, the user must enter: the number of ticks that the market must change before the stop trigger price should be adjusted. The number of ticks that the stop trigger price should be adjusted when an adjustment is warranted. A trailing stop order is purely synthetic.

The stop order should only be known to the client until it is actually triggered. At that time either a market order (in the case of an order type of stop) or a limit order (in the case of a stop limit order) will be entered into the market. A trailing stop only adjusts the stop trigger price in the profitable direction of the trade. A trailing stop order to sell does not adjust the stop trigger price to a value less than the initial trigger value. A trailing stop order to sell only increases the stop trigger price. A trailing stop order to sell only adjusts the stop trigger price when new high prices are traded in the instrument. This will prevent adjusting the stop trigger price if the instrument price retraces a profitable move but does not trigger the stop.

A trailing stop order to buy does not adjust the trigger price to a value greater than the initial trigger value. A trailing stop order to buy only decreases the stop price. A trailing stop order to buy must adjusts the trigger price when new low prices are traded in the instrument. This will prevent adjusting the stop trigger price if the instrument price retraces a profitable move but does not trigger the stop. Trailing stops are only valid while the user is logged into the application 30. Application 30 exit will have the effect of the trailing stop not being in the market. On application exit, if the user has trailing stops entered, the user will be warned that the stop will not be worked while the application is closed.

The user is to choose to save trailing stops. On application 30 launch, the user is advised of any saved trailing stops and given the opportunity to reenter them.

The user is able to create parked orders. A parked order is an order that is created by the user but not submitted to the market. The user is able to release a parked order. Releasing a parked order submits it to the market. The user can change a working order to a parked order. This sends a cancel to the exchange. On receipt of the cancel acknowledgement, the application 30 changes the order state to indicate that the order is parked. Parked orders are saved on application exit. Parked orders are restored on application 30 launch.

If-Then Strategies

The user can create an "If-Then Strategy." With an If Then Strategy, an order is entered into the market. Upon receipt of a fill acknowledgement for the order, one or more other orders are automatically entered by the application 30 based on the If-Then strategy. Typically, the orders that are entered with If-Then Strategy will be orders to manage profit and loss expectations for the fill that was received on the original order. The user can create an If-Then strategy where on the receipt of the acknowledgement of an order fill, a profit/loss bracket is entered around the fill price for the filled quantity. The user can create an If-Then strategy where on the receipt of the acknowledgement of an order fill, a stop or stop limit order is entered at an offset from the fill price for the quantity of the fill. The user can create an If-Then strategy where on the receipt of the acknowledgement of an order fill, a trailing stop order is entered at an offset from the fill price for the quantity of the fill. The user can create an If-Then strategy where on the receipt of the acknowledgement of an order fill, a limit order is entered at an offset from the fill price for the quantity of the fill. The user can create an If-Then strategy where on the receipt of the acknowledgement of an order fill, an OCO order pair is entered.

Automatically Trading Spreads

As is known in the art, a "futures spread" includes a purchase of one futures delivery month contract against the sale of another futures delivery month contract of the same commodity; the purchase of one delivery month contract of one commodity against the sale of that same delivery month contract of a different commodity; or the purchase of one commodity contract in one market against the sale of the commodity contract in another market, to take advantage of a profit from a change in price relationships. The term spread is also used to refer to the difference between the price of a futures month contract and the price of another month contract of the same commodity.

An "intra-commodity" spread (e.g., a calendar spread) is long at least one futures contract and short at least one other futures contract. Both have the same underlying futures contract but they have different maturities.

An "inter-commodity" spread is a long-short position in futures contracts on different underlying futures contracts. Both typically have the same maturity. Spreads can also be constructed with futures contracts traded on different exchanges. Typically this is done using futures on the same underlying contract, either to earn arbitrage profits or, in the case of commodity or energy underlying contracts, to create an exposure to price spreads between two geographically separate delivery points.

A "different commodities spread" is a spread between two or more different commodities contracts of any type of any maturity and any type of position. (e.g., (Mini S&P)/(Mini NSDAQ), or (Mini S&P)/(Mini DJ), etc.).

A "crack spread" is a commodity contract—commodity product contract spread involving the purchase of a commodity and the sale of a product. For example, the purchase of crude oil futures contracts and the sale of gasoline and/or heating oil futures contracts.

Spread trading offers reduced risk compared to trading futures contracts outright. Long and short futures contracts comprise a spread that correlated, so they tend to hedge one another. For this reason, exchanges generally have less strict margin requirements for future contract spreads.

A "butterfly spread" for futures contracts includes a spread trade in which multiple futures contract months are traded simultaneously at a differential. The trade basically consists of two or futures spread transactions with either three or four different futures months at one or more differentials.

Spread trading is also used for options. An option spread trade is when a call option is bought at one strike price and another call option is sold against a position at a higher strike price. This is a called a "bull spread." A "bear spread" includes buying a put option at one strike price and selling another put option at a lower strike price.

A "butterfly spread" for options includes selling two or more calls and buying two or more calls on the same or different markets and several expiration dates. One of the call options has a higher strike price and the other has a lower strike price than the other two call options. If the underlying stock price remains stable, the trader profits from the premium income collected on the options that are written.

A "vertical spread" for options includes a simultaneous purchase and sale of options of the same class and expiration date but different strike prices. A vertical spread for futures contracts includes a simultaneous purchase and sale of futures contracts with the same expiration date but different prices.

A "horizontal spread" includes the purchase and sale of put options and call options having the same strike price but different expiration dates. A horizontal spread for futures contracts includes the purchase and sale of futures for the same purchase price but different expiration dates.

A "ratio spread" applies to both puts and calls, involves buying or selling options at one strike price in greater number than those bought or sold at another strike price. "Back spreads" and "front spreads" are types of ratio spreads.

A "back spread" is a spread which more options are bought than sold. A back spread will be profitable if volatility in the market increases. A "front spread" is a spread in which more options are sold than bought. A front spread will increase in value if volatility in the market decreases.

The purpose of an option spread trade is two-fold. First, it bets on the direction that a trader thinks a certain stock will go. And second, it reduces a trader's cost of the trade to the difference between what is paid for the option and what profit is obtained from selling the second option. An option profit is the spread, or the difference between the two strike prices, minus a cost of the spread.

An "inter-exchange" spread is a difference in a price of same security, instrument or contract traded on different exchanges. For example, the price of a stock for a computer of brand-X on the New York Stork Exchange and the Toyko Stock exchanges.

Spreads are also used for synthetic trading entities. For example, a difference between the price of a first synthetic futures contract and a second synthetic futures contract.

Various types of spreads (e.g., vertical, horizontal, ratio, back, front, etc.) are also used to trade futures contracts, stocks, bonds and other financial instruments and financial contracts in addition to options.

Yield Curve Trading

As is known in the electronic trading arts, a "yield curve" is a chart in which a yield level is plotted on one axis (e.g., a vertical axis, etc.), and the term to maturity of debt instruments or other similar instruments are plotted on another axis (e.g., a horizontal axis, etc.). In general, when yields are failing, a yield curve will steepen. When yields are rising, a yield curve wild flatten.

In finance, a yield curve is a relationship between treasury securities that are traded for a given maturity and a spread that is derived between them. The yield of a debt instrument is the return an investor should expect at that price by investing in that instrument and is its coupon. Investing for a period of time t gives a yield Y(t). This function Y is called the "yield curve." The nomenclature "curve" is used rather than "yield function" because when plotted on a graph, the function is a curve.

Yield curves are used by commodity and other financial instrument traders to seek trading opportunities. For commodities trading, market participants often sell short and buy long, or sell long positions and buy short positions using yield curves and use trading spreads to determine trading opportunities. However, the present invention is not limited to these trading strategies for commodities and other trading strategies can also be used.

In one embodiment, yield curve electronic trading strategies are used with the electronic trading system 10 described above for black box trading. Yield curve trading permits electronic traders to price any commodity contract, financial instrument or security instrument off of any other security commodity contract, financial instrument or security instrument with a yield curve using a price, yield, basis spread or other spreads. The yield curve electronic trading strategies include electronic trading via multiple yield curves by asset class, curves-off-curve, curves-on-curve, one or two standard deviations or yield curve results, etc.

In one embodiment, yield curve electronic trading strategies include, real trading strategies, synthetic trading strategies, spread trading strategies and supply differential trading strategies, or any combination thereof.

Black-Box Trading Entities

"Black box trading entities" are trading entities used for entering trading orders for real and/or synthetic trades with pre-determined black box trading strategies automatically and dynamically deciding on aspects of the trades such as the timing, price, or quantity of the order automatically without human intervention. Recently, black box trading entities have been used for high-frequency trading, which comprises a broad set of buy-side as well as market making sell-side trades. These high-frequency black box trading strategy techniques are commonly given names such as "Stealth", "Dagger", "Guerrilla", "Sniper" and "Sniffer" and are developed using simple and complex mathematical concepts for automatic execution of electronic trades across many different trading market.

FIG. 15 is a flow diagram illustrating a Method 88 for automatically executing a black box trading entity. At Step 90, a black box trading entity is created for two or more real and/or synthetic trading entities. At Step 92, two or more sets of electronic trading information are received from one or more electronic trading exchanges including trading information for the two or more real or synthetic trading entities for the created black box trading entity. At Step 94, one or more electronic trades for the black box trading entity are automatically electronically executed on the appropriate one or more electronic trading exchanges to execute the black-box trading entity.

Method 88 is illustrated with an exemplary embodiment. However, the invention is not limited to this embodiment and other embodiments can also be used to practice the invention.

In such an exemplary embodiment at Step 90, a black box trading entity 11 is created from two or more real or synthetic trading entities.

A black box trading entity 11 includes, but is not limited to, trading strategies developed by one or more traders for futures contracts, options contracts, or other instruments for differed shipment or delivery or otherwise, or other contracts or financial or other instruments traded electronically. The black box trading entity may be created only for sell-side trades, only for buy-sides trades, both buy and sell trades, spreads, and other types of real and/or synthetic trades that can be executed electronically.

A synthetic trading entity is a virtual trading entity equivalent to real trading entity and is created with two or more real trading entities. For example, the synthetic trading entity may be a synthetic ten year bond contract created from two more existing ten year bond contracts or two or more non-ten year bond contracts. As another example, the synthetic trading entity may simulate a synthetic ten year bond contract created from a difference between a cash and futures price for a selected financial instrument or financial contract.

In one embodiment, the black box trading entity is created by selecting two or more real or synthetic trading entities from the GUI 32 via the ABV window 66 or Order Ticket window 84. In another embodiment, the black box trading entity is created by other than the ABV window 66 or Order Ticket window 84 such as specialized black box graphical window 111.

At Step 92, one or more sets of electronic trading information are received from one or more electronic trading exchanges on an application 30 on a target device 12, 14, 16 including trading information for the two or more real or synthetic trading entities for the created black box trading entity. For example, the application 30 on the target device 12, 14, 16 may receive two or more sets of bond trading information for the exemplary synthetic ten year bond contract used to create the black box trading entity.

At Step 94, two or more electronic trades for the black box trading entity are automatically electronically executed from via the application 30 on the target device 12, 14, 16 on the appropriate one or more electronic trading exchanges 20, 22 to execute the black box trading entity.

For example, the black box trading entity may include a synthetic ten year bond contract. In this example, the application 30 on the target device 12, 14, 16 may automatically execute a sell for a call for a first real bond contract and automatically execute a buy for a put for a second real bond contract, on one or more electronic trading exchanges, thereby automatically executing the synthetic ten year bond contract as part of black box trading entity.

In one embodiment, the application 30 allows a trader to create a black box trading entity to setup a strategy to trade two or more distinct markets (e.g., cash and futures) which have a pre-determined relationship (e.g., one-to-one, two-to-one, multi-to-one, etc.) and automatically execute one or more electronic trading markets simultaneously.

In one embodiment, the black box trading entity includes a real and/or synthetic spread. As is known in the art, a spread includes a purchase of one futures delivery month against the sale of another futures delivery month of the same commodity; the purchase of one delivery month of one commodity against the sale of that same delivery month of a different commodity; or the purchase of one commodity in one market against the sale of the commodity in another market, to take advantage of a profit from a change in price relationships. The term spread is also used to refer to the difference between the price of a futures month and the price of another month of the same commodity. A spread also applies to options and financial instruments. Synthetic spreads to refer to a difference between two or more different or similar real entities of virtually any kind or real instrument or contract.

In one embodiment, the application 30 includes a black box trading entity with a configurable slippage factor portion that is pre-determined and/or configurable via the graphical user interface 32. The configurable slippage factor portion allows the trader to safely execute an alternative $2^{nd}$ leg, $3^{rd}$ leg, etc. of a trade if an initial primary trade for a real and/or synthetic futures contract or cash instrument is missed. The configurable slippage factor portion also allows a trader to automatically trade within a pre-determined range of trading prices.

In one exemplary embodiment, for a long entry, an exemplary slippage factor for a pre-determined trading range is calculated by measuring a range from a theoretical entry price to a trading day's highest price, and multiplying that amount by a slippage percentage. For short entries, a slippage factor is calculated by measuring the range from a theoretical entry price to a trading day's lowest price. The slippage factor is then added to, or subtracted from a theoretical entry price, to obtain a simulated fill price used in a black box trading strategy. For example, Table 12 illustrates an exemplary slippage factor for a long entry. However, the present invention is not limited to such a slippage factor and other slippage factors can also be used to practice the invention.

TABLE 12

Slippage percent: 35%
Black box desired buy order price: $100
High Price (for the trading day): $120
Slippage Factor: (120 − 100) × 0.35 = (20 × 0.35) = 7
Black box fill price using slippage: Order Price + Slippage Factor = (100 + 7) = $107

In another embodiment, the black box trading entity includes a one-to-one or multi-to-one trade from either the cash side or the futures side first. In another embodiment, the black box trading entity includes a best cash market to trade from.

In another embodiment, the black box trading entity includes a configurable duration portion that allows traders to enter synthetic "one-to-one strategies" which are may or may not be in pre-determined cash-to-futures ratio, or visa-versa. For example, the configuration duration portion allows a one-to-one real or synthetic trading strategy for one real cash entity to ten futures real entity ratio, or visa-versa, one real cash entity and eleven real futures entities, or visa-versa, etc. depending on the trader's preferences.

In another embodiment, the application 30 also includes a graphical Profit and Loss (P&L) blotter provides risk monitoring at a firm, group, or trader level. The Multi-Execution Trading System calculates P&L on a real-time basis with Market-to-Market functionality. The application 30 includes firm wide status messages that can be broadcast to all traders who are viewing a graphical blotter and it will illustrate actual P&L and not just intraday by including previous days total equity position.

The application 30 also allows traders to receive futures and cash market data real-time into a spreadsheet (e.g., Excel, etc.) or from a spreadsheet and allows traders to receive both cash and futures trades real-time into and from a spreadsheet.

FIG. 16 is a flow diagram illustrating a Method 96 for automatically creating a black box trading entity. At Step 98, a first real or synthetic trading entity is selected from plural real or synthetic trading entities displayed on a graphical user interface for a creating black box trading entity. At Step 100, one or more other real or synthetic trading entities are selected from plural other real or synthetic trading entities displayed on the graphical user interface for creating the black box trading entity. At Step 102, a black box trading entity is created from the selected first real or synthetic trading entity and the selected one or more other real or synthetic trading entities. At Step 104, automatic electronic trading of the black box trading entity is provided via the graphical user interface.

Method 96 is illustrated with an exemplary embodiment. However, the invention is not limited to this embodiment and other embodiments can also be used to practice the invention.

In such an exemplary embodiment at Step 98, a first real or synthetic trading entity is selected from plural real or synthetic trading entities displayed on a graphical user interface 32 displayed by an application 30 on a target device 12, 14, 16 for a black box trading entity.

At Step 100, one or more other real or synthetic trading entities are selected from plural other real or synthetic trading entities displayed on the GUI 32 for the black box trading entity.

At Step 102, a black box trading entity is created from the selected first real or synthetic trading entity and the selected one or more other real or synthetic trading entities.

At Step 104, automatic electronic trading of the black box trading entity is provided via the GUI 32. For example, two or more electronic trades for real or synthetic trading entities comprising the black box trading entity are automatically electronically executed on appropriate one or more electronic trading exchanges 20, 22 to execute the black box trading entity.

In one embodiment, Step 102 allows a trader to enter one or more desired trading formulas directly into the application 30, or extract or use directly, one or more trading formulas from a spreadsheet (e.g., Microsoft Excel, etc.) thereby allowing the application 30 to automatically execute the black box entity via one or more electronic trading exchanges. The black box entity allows automatic tracking and execution of both real and synthetic trading entities on both a target network device and/or a server network device.

Figure 17:
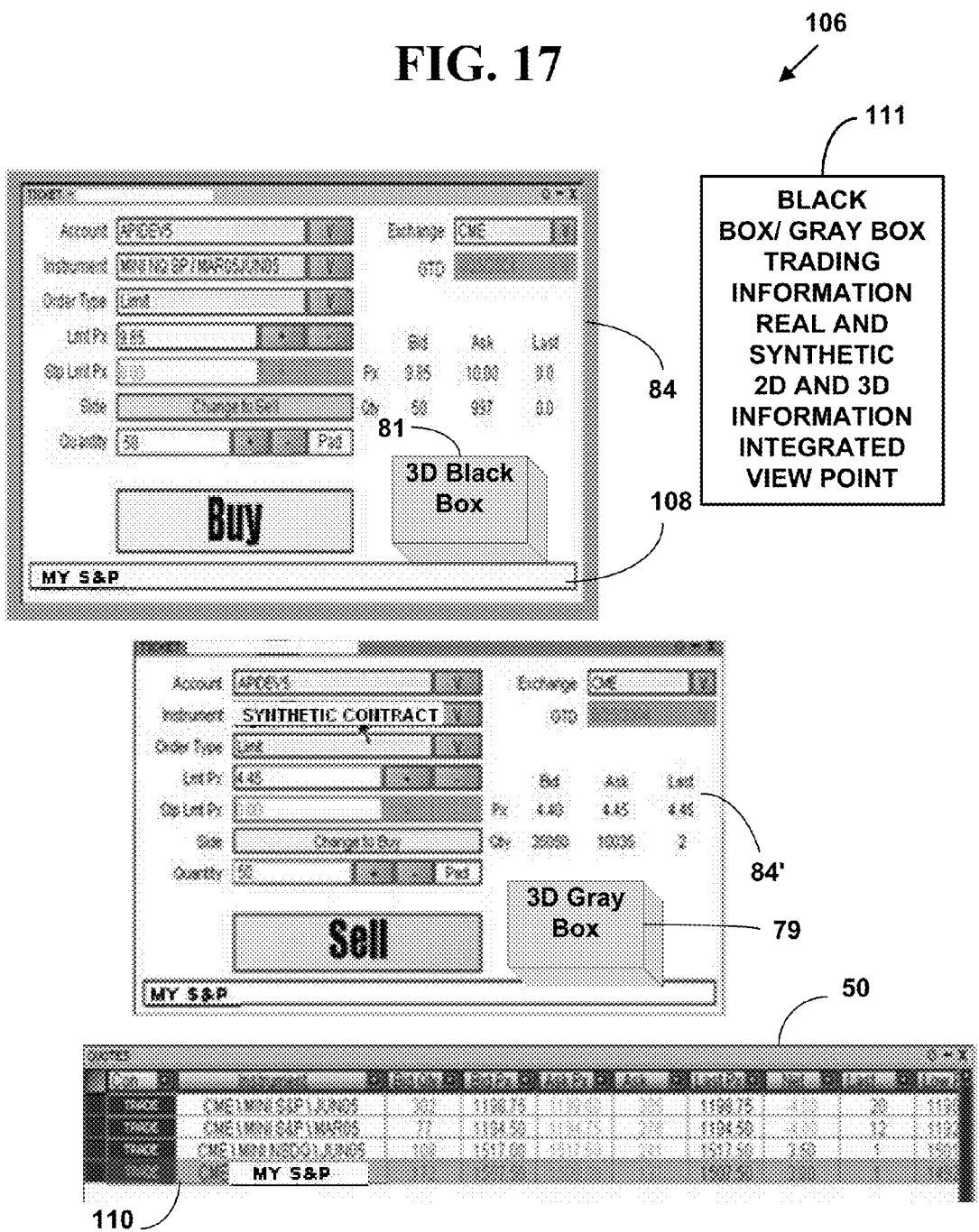
FIG. 17 is a block diagram illustrating creation of a black box trading entity.

FIG. 17 is a block diagram 106 illustrating creation of a black box trading entity. This exemplary block diagram illustrates creation of a black box trading entity called "MY S&P" 108 created with two Order Ticket windows 84, 84'. Order Ticket window 84 includes a selection of a real trading entity and Order Ticket window 84' includes a selection of synthetic trading entity. In one embodiment synthetic trading entities are displayed with a different color 110 that real trading entity to distinguish them for a trader when then are displayed on a Quotes window 50.

FIG. 17 illustrates creating an exemplary black box trading entity MY S&P using two or more Order Ticket windows 84, 84'. However, the present invention is not limited to such an embodiment and other a synthetic trading entity can be created using the ABV window 66 or other specialized windows, such as a specialized black box graphical window 111 displayed by the GUI 32 via application 30, 30'.

In one embodiment, black box trading is completed using a combination client network device 12, 14, 16 and a server network device 24. Black box trading entities and black box trading strategies input on an application 30 a client network device 12, 14, 16 are stored and executed on an application 30' on the server network device 24.

In the event that a network connection from a client network device 12, 14, 16 to a server network device 24 is lost, all working black box trading orders will continue to be automatically traded on the server network device 24. Server side black box trading with a client trading electronic trading interface is significantly faster (e.g., 1-2 milliseconds vs. 5-10 milliseconds) and more reliable than client side trading alone.

In one embodiment, executing black box trading orders on the server network device 24 provides fault tolerance. "Fault tolerance" enables the electronic trading system 10 to continue operation for black box trading, possibly at a reduced level rather than failing completely, when some part of the system fails (e.g., loss of communications with the communications network 18 by the target network device, 12, 14, 16, etc.) The fault tolerance includes a two-level redundancy that allows any single component within the trading system 10 to fail without forcing users off the trading system 10 or causing the trading system 10 to fail. In another embodiment, the fault tolerant components includes an N-level redundancy that allows multiple components to fail without forcing users off the trading system 10 or causing the trading system 10 to fail or prevent any electronic trades to fail.

The client/server black box trading allows for black box trading strategies such as OCO, MOO, MOC, spreads, etc. to be more easily and efficiently executed as such black box trading orders are held on the server network device 24 until the market opens and/or closes and then released for execution. The client/server-side solution provides creating, trading, and managing single-legged, multi-legged, intra-market and inter-market black box trading spreads across plural trading accounts, plural trading exchanges for both real and/or synthetic trading instruments.

The present invention also provides black box trading via an "integrated viewpoint" for black box electronic trading. The present invention is unique and provides unexpected results because the present invention provides black box and gray box electronic trading by aggregating an electronic trader's activities across all their trading accounts, their current trades and trade locations on all trading exchanges (e.g., Chicago Board of Trade (CBOT), New York Stock Exchange (NYSE), NASDAQ, Tokyo Stock Exchange (TSE), London International Financial and Futures Options Exchange (LIFFE), etc.). The integrated viewpoint and other black box trading information for black box trading is displayed 75 in the ABV window 66 (FIG. 12) and/or other graphical windows on the target network device 12, 14, 16 and/or the server network device 24, via application 30.

Figure 18B:
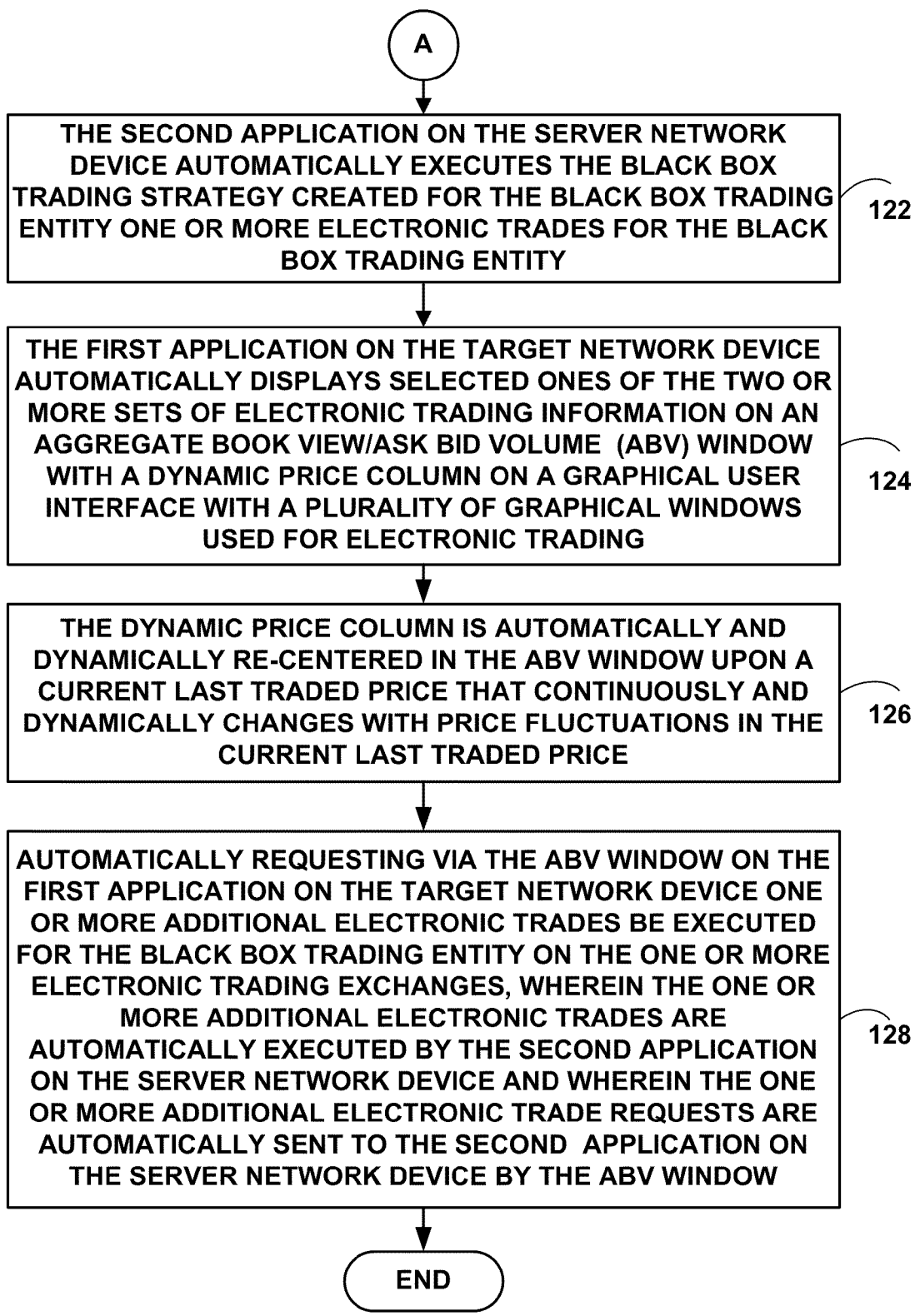

FIGS. 18A and 18B are a flow diagram illustrating a Method 112 for automatically executing a black box trading entity. In FIG. 18A at Step 114, a black box trading entity is created from two or more real or synthetic trading instruments or contracts on a first application on a target network device with one or more processors. At Step 116, a black box trading strategy is created on the first application on the target network device for the black box trading entity to automatically and simultaneously execute one or more trades for the black box trading entity in one or more distinct electronic trading markets. Two or more trades in the black box trading strategy have a pre-determined relationship. At Step 118, the black box trading entity and the black box trading strategy is sent to a second application on a server network device with one or more processors via a communications network to automatically execute the one or more electronic trades for the black box trading entity, thereby making the execution of electronic trades for the black box trading entity faster and more reliable than executing the electronic trades via the first application on the target network device alone. At Step 120, two or more sets of electronic trading information from one or more electronic trading exchanges including electronic trading information for the two or more real or synthetic trading entities for the black box trading entity are simultaneously received on the first application on the target network device and on the second application on the server network device via the communications network. In FIG. 18B at Step 122, the second application on the server network device automatically executes one or more electronic trades the black box trading strategy created for the black box trading entity. At Step 124, the first application on the target network device automatically displays selected ones of the two or more sets of electronic trading information on an aggregate book view/ask bid volume (ABV) window on a graphical user interface with a plurality of graphical windows used for electronic trading, including displaying bid size and bid offer by price in a market depth format for the two or more real or synthetic electronic trading entities used to create the black box trading entity and displaying prices in a dynamic price column in the ABV window. The ABV window includes an order entry mode for entering a trade near, or away from a current last traded price. The ABV window allows entering and canceling of electronic trading orders and automatically sending electronic trading orders entered into the ABV window at a selected price to the one or more electronic trading exchanges. At Step 126, the dynamic price column is automatically and dynamically re-centered in the ABV window upon a current last traded price that continuously and dynamically changes with price fluctuations in the current last traded price. At Step 128, automatically requesting via the ABV window on the first application on the target network device one or more additional electronic trades be executed for the black box trading entity on the one or more electronic trading exchanges. The one or more additional electronic trade requests are automatically executed by the second application on the server network device. The one or more additional electronic trades are automatically sent to the second application on the server network device by the ABV window.

Method 112 is illustrated with an exemplary embodiment. However, the invention is not limited to this embodiment and other embodiments can also be used to practice the invention.

In such an exemplary embodiment in FIG. 18A at Step 114 a black box trading entity 11 (FIG. 1) is created from two or more real or synthetic trading instrument or contracts on a first application 30 on a target network device 12, 14, 16 with one or more processors.

In one embodiment, the black box trading entity is created by selecting two or more real or synthetic trading entities from the GUI 32 via the ABV window 66 or Order Ticket window 84. In another embodiment, the black box trading entity is created by other than the ABV window 66 or Order Ticket window 84 such as black box trading window 111.

At Step 116, a black box trading strategy 11 is created on the first application 30 on the target network device 12, 14, 16 for the black box trading entity to automatically and simultaneously execute one or more trades for the black box trading entity in one or more distinct electronic trading markets. Two or more trades in the black box trading entity have a pre-determined relationship (e.g., cash/futures, synthetic, short month/long month, options, etc.)

In one embodiment, Step 116 allows a trader to enter one or more desired trading formulas directly into the application 30, or extract or use directly, one or more black box trading formulas from a spreadsheet (e.g., Microsoft Excel, etc.). The black box entity allows automatic tracking and execution of both real and synthetic trading entities on both a target network device and/or a server network device.

At Step 118, the black box trading entity and the black box trading strategy 11 is sent to a second application 30' on a server network device 24 with one or more processors via the communications network 18 to automatically execute electronic trades for the black box trading entity, thereby making the execution of electronic trades for the black box trading entity faster and more reliable than executing the electronic trades via the first application 30' on the target network device 12, 14, 16 alone.

At Step 120, two or more sets of electronic trading information from one or more electronic trading exchanges 20, 22 including electronic trading information for the two or more real or synthetic trading entities for the black box trading entity are simultaneously received on the first application 30 on the target network device 12, 14, 16 and on the second application 30' on the server network device 24 via the communications network 18.

In FIG. 18B at Step 122, the second application 30' on the server network device 24 automatically executes the black box trading strategy created for the black box trading entity 11 on an the one or more electronic trading exchanges 20, 22 to automatically execute the black box trading entity.

In one embodiment, the server network device 24 communicates with the electronic trading exchanges 20, 22 and the target network devices 12, 14, 16 via 4G technologies over the communications network 18. As is known in the art "4G" refers to the fourth generation of communications standards. It is a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G technologies include IP packet-switched devices, wired and wireless ultra-broadband (i.e., gigabit speed) access devices, WIMAX devices and multi-carrier transmissions. However, the present invention is not limited to this embodiment and 1G, 2G and 3G and/or any combination thereof, with or without 4G communications technologies can be used to practice the invention.

At Step 124, the first application 30 on the target network device 12, 14, 16 automatically displays selected ones of the two or more sets of electronic trading information on an aggregate book view/ask bid volume (ABV) window 66 on a graphical user interface 32 with a plurality of graphical windows used for electronic trading, including displaying bid size and bid offer by price in a market depth format for the two or more real or synthetic electronic trading entities used to create the black box trading entity 11 and displaying prices in a dynamic price column 68 in the ABV window 66. The ABV window 66 includes an order entry mode for entering a trade near, or away from a current last traded price 82. The ABV window 66 allows entering and canceling of electronic trading orders and automatically sending electronic trading orders entered into the ABV window 66 at a selected price to the one or more electronic trading exchanges 20, 22.

At Step 126, the dynamic price column 68 is automatically and dynamically re-centered in the ABV window 66 upon a current last traded price that continuously and dynamically changes with price fluctuations in the current last traded price 82.

At Step 128, automatically requesting via the ABV window 66 on the first application 30 on the target network device 12, 14, 16 one or more additional electronic trades be executed for the black box trading entity on the one or more electronic trading exchanges 20, 22. The one or more additional electronic trade requests are automatically sent to and executed by the second application 30' on the server network device 24.

The black box trading entity 11 is automatically traded via one or more electronic trading exchanges 20, 22 on a client device 12, 14, 16 and/or a server device 24 and/or a combination thereof, thereby making the execution of electronic trades for the black box trading entity faster and more reliable than when executing on one network device alone.

In one embodiment, the black box trading entity 11 includes a configurable slippage factor portion to execute an alternative real or synthetic trade if a primary real or synthetic trade is missed as was described above.

In one embodiment, the black box trading strategies include if-then trading strategies, one-cancels-other (OCO), market-on-open (MOO), market-on-close (MCO), block trading, good-til-canceled (GTC), good-til-date (GTD), fill-and-kill (FAK), fill-or-kill (FOK), Iceberg, spread or over-the-counter (OTC) black box trading strategies or a combination thereof for real and/or synthetic financial instruments or contracts. These same trading strategies can also used directly for non-black box trading.

In one embodiment, the black box trading spread includes a intra-commodity spread, inter-commodity spread, butterfly spread, back spread, vertical spread, horizontal spread, ratio spread or an inter-exchange black box trading spread.

In one embodiment, the first application 30 on the target network device 12, 14, 16 and the second application 30' on the server network device 24 provide an integrated viewpoint of black box trading across all trading accounts and across all electronic trading exchanges 20, 22 for an electronic trader. In one embodiment the integrated viewpoint information is displayed on the ABV window 66 on the target network device 12, 14, 16.

In one embodiment, the second application 30' on the server network device 24 includes on a aggregate book view/ask bid volume (ABV) window 66 on a graphical user interface 32 with a plurality of graphical windows used for electronic trading.

In one embodiment, the first application 30 on the target network device 12, 14, 16 automatically executes a first trade for the black box trading entity on a first electronic trading exchange 20. The second application 30' on the server network device 24 automatically executes a second trade for the black box trading entity on a second electronic trading exchange 24, thereby splitting execution of the black box trading entity between the first application 30 on the target network device 12, 14, 16 and the second application 30' on the server network device 24. In such an embodiment, the first trade includes a first leg of a black box trading spread and the second trade includes a second leg of a black box trading spread. Black box trading spreads with more than two trading legs are trading in a similar manner.

In one embodiment, the second trade executed on the second application 30' on the server network device 24 is for a larger trade order than the first trade executed on the first application 30' the target network device 12, 14, 16. In another embodiment, the second trade executed on the second application 30' on the server network device 24 is for a smaller trade order than the first trade executed on the first application 30' the target network device 12, 14, 16.

In one embodiment, the application 30, 30' automatically displays in a three-dimensional (3D) format black box trading information 81 on the ABV window 66, the specialized black box trading window 111, and other graphical windows (e.g., 106, etc.) on the GUI 32. The 3D format provides an additional visual indicator on the multi-windowed graphical user interface 32 for electronic trading via yield curves individual 3D indicators are displayed in different outlining display colors. The GUI 32 includes graphical windows with two-dimensional (2D) and/or 3D graphical objects displayed. When the 3D graphical objects are displayed on the GUI 32, they provide a more distinct graphical object that is more easily viewable and one that "pops" off the GUI 32 when viewed by a trader.

In one embodiment, 3D glasses are used to view the 3D graphical objects. In such an embodiment, the 3D graphical objects are displayed in a specialized 3D format using a 3D API. However, 3D glasses are not required to view the 3D graphical objects and the invention can be practiced without 3D glasses, the specialized 3D format or the 3D API. For example, 3D stereoscopy is used. As is known in the art, 3D stereoscopy (also called stereoscopic or 3-D imaging) is a technique capable of recording three-dimensional visual information and/or creating the illusion of depth in an image for 3D display. However, the present invention is not limited to 3D stereoscopy and other 3D techniques can also be used to practice the invention.

Gray Box Trading Entities

A "gray box" is a hybrid electronic trading system that includes an automatic portion (e.g., a black box trading portion) and a manual portion (e.g., a white box trading portion) and/or a combination of portions thereof.

A "gray box" provides an electronic trader with automation for selected trades while allowing the electronic to use his her judgment and manually execute other trades. One key advantage of a gray box trading entity is that it allows an electronic trader to use his/her expertise to react quickly to changing market conditions to manually execute certain trades while other selected trades are automatically executed.

Figure 19:
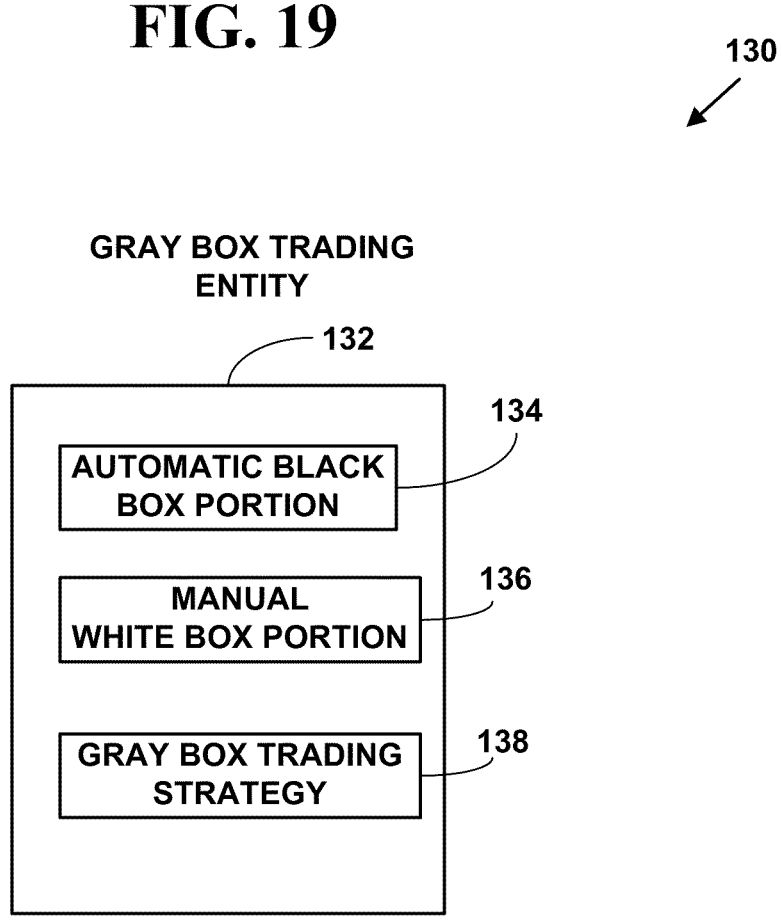
FIG. 19 is a block diagram illustrating creation of a gray box trading entity.

FIG. 19 is a block diagram 130 illustrating a gray box trading entity 132. The gray box trading entity 132 includes an automatic black box portion 134, a manual white box portion 136 and a gray box trading strategy 138. The automatic black box portion 134 includes the methods and system described above for FIGS. 1-18. The automatic black box portion 134 includes automatic trading methods that are typically "not visible" to the electronic trader (even if the electronic trader configured the black box trading entity in the first place). The manual white box portion is "visible" to an electronic trader.

Figure 20B:
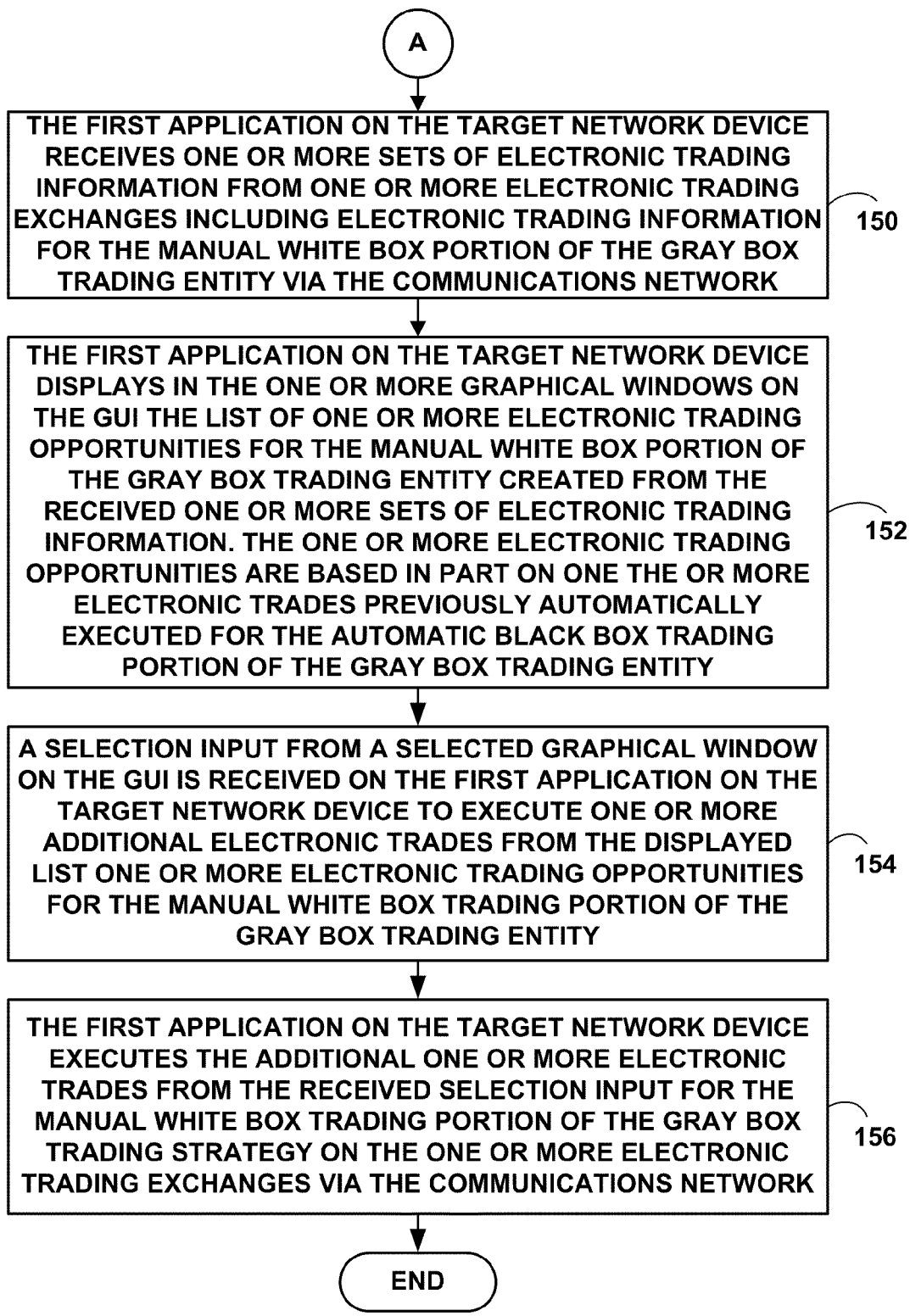

FIGS. 20A and 20B are a flow diagram illustrating a Method 140 for automatically executing a gray box trading entity. In FIG. 20A at Step 142, a gray box trading entity is created including an automatic black box trading portion and a manual white box trading portion on a first application on a target network device with one or more processors. At Step 144, a gray box trading strategy is created on the first application on the target network device to automatically execute one or more electronic trades for the automatic black box trading portion of the gray box trading entity on one or more electronic trading exchanges and automatically and simultaneously display a list of one or more other electronic trading opportunities for the manual white box trading portion of the gray box trading entity in one or more graphical windows on a graphical user interface (GUI) with a plural graphical windows on the first application used for electronic trading. At Step 146, a first selection input is received on the first application the target network device including a list of specific electronic trades and/or trading strategies to execute for automatic black box trading portion and the manual white box trading portion of the gray box trading entity. At Step 148, the first application on the target network device automatically executes one or more electronic trades for the gray box trading strategy with automatic black box trading portion of the gray box trading entity on the one or more electronic trading exchanges via a communications network. In FIG. 20B at Step 150, the first application on the target network device receives one or more sets of electronic trading information from one or more electronic trading exchanges including electronic trading information for the manual white box portion of the gray box trading entity via the communications network. At Step 152, the first application on the target network device displays in the one or more graphical windows on the GUI the list of one or more electronic trading opportunities for the manual white box portion of the gray box trading entity created from the received one or more sets of electronic trading information. The one or more electronic trading opportunities are based in part on one the or more electronic trades previously automatically executed for the automatic black box trading portion of the gray box trading entity. At Step 154, a selection input from a selected graphical window on the GUI is received on the first application on the target network device to execute one or more additional electronic trades from the displayed list one or more electronic trading opportunities for the manual white box trading portion of the gray box trading entity. At Step 156, the first application on the target network device executes the additional one or more electronic trades from the received selection input for the manual white box trading portion of the gray box trading strategy on the one or more electronic trading exchanges via the communications network.

Method 140 is illustrated with an exemplary embodiment. However, the invention is not limited to this embodiment and other embodiments can also be used to practice the invention.

In such an exemplary embodiment in FIG. 20A at step 142, a gray box trading entity 132 is created including an automatic black box trading portion 134 and a manual white box trading portion 136 on a first application 30 on a target network device 12, 14, 16.

In one embodiment, the gray box trading entity 132 includes one or more real or synthetic trading entities created from two or more selected real or synthetic financial instruments. In one embodiment, the gray box trading entity 132 includes a gray box trading entity 132 created from two or more selected real or synthetic financial or commodity futures contracts.

In one embodiment, the gray box trading entity 132 includes a configurable slippage factor portion (e.g., Table 12, etc.) to execute an alternative real or synthetic trade if a primary real or synthetic trade is missed or execute within a pre-determined slippage range of trading prices. However, the present invention is not limited to these embodiments and the gray box trading entity 132 can be created with more, fewer or other types of real and/or synthetic financial instruments and/or contracts.

At Step 144, a gray box trading strategy 138 is created on the first application 30 on the target network device 12, 14, 16 to automatically execute one or more electronic trades for the automatic black box trading portion 134 of the gray box trading entity 132 on one or more electronic trading exchanges 20, 22 and automatically and simultaneously display a list of one or more other electronic trading opportunities for the manual white box trading portion 136 of the gray box trading entity 132 in one or more graphical windows 66, 106 on a graphical user interface (GUI) 32 with a plural graphical windows on the first application 30 used for electronic trading.

In one embodiment, the gray box trading strategy 138 includes, but is not limited to, if-then trading strategies, one-cancels-other (OCO), market-on-open (MOO), market-on-close (MCO), block trading, good-til-canceled (GTC), good-til-date (GTD), fill-and-kill (FAK), fill-or-kill (FOK), Iceberg, multi-leg spread, over-the-counter (OTC) or yield curve, gray box trading strategies or a combination thereof. In one embodiment, the black box portion 134 and/or the white box trading strategy 136 also include one or more of these trading strategies. However, the present invention is not limited to these gray box (or black box or white box) trading strategies and more, fewer or other gray box trading strategies can also be used to practice the invention.

The gray box trading strategy 138 is split between the automatic black box trading portion 134 and the manual white box trading portion 136 of the gray box trading entity 132. This allows a first portion of the gray box trading strategy 138 to be executed on the automatic black box trading portion 134 of the gray box trading entity 132 and a second portion of the gray box trading strategy 138 to be executed with the manual white box trading portion 136 of the gray box trading entity 132. The two portions can be designated in any quantity as decided by the electronic trader. For example, a first electronic trader may select 90% white box trading and 10% black box trading while a second electronic trade may select 24% white box trading and 76% black box trading. However, the present invention is not limited to this gray box trading strategy split and more, fewer or other gray box trading strategies can also be used to practice the invention.

At Step 146, a first selection input is received on the first application 30 the target network device 12, 14, 16 including a selection of specific electronic trades and/or trading strategies to execute for automatic black box trading portion 134 and the manual white box trading portion 136 of the gray box trading entity 132. The gray box trading is dynamically configurable by an electronic trader. The electronic trader has the ability to select the specific electronic trades and/or trading strategies that will be executed automatically and manually for gray box trading. The electronic trader has the ability to dynamically change the selection of trades at any time during electronic trading. For example, a user may select one-cancels-other (OCO) and block trading strategies for the automatic black box trading portion 134 and market-on-open (MOO), market-on-close (MCO) and yield curve trading strategies for the manual white box trading portion 136. Another electronic trader may select specific trades such as buy 100 soybean contracts at $2.36 for the manual white box trading portion 136 and a specific trades for trading spread for November wheat contracts and July wheat contracts for the automatic black box trading portion 134.

At Step 148, the first application 30 on the target network device 12, 14, 16 automatically executes one or more electronic trades for a first portion of the gray box trading strategy 138 with automatic black box trading portion 134 of the gray box trading entity 132 on the one or more electronic trading exchanges 20, 22 via a communications network 18.

In one embodiment, the one or more electronic trades executed for the automatic black box trading portion 136 of the gray box trading strategy 138 include a first leg of a and a second leg of a gray box trading spread.

In one embodiment, the gray box trading spread includes a intra-commodity spread, inter-commodity spread, butterfly spread, back spread, vertical spread, horizontal spread, ratio spread, synthetic spread or an inter-exchange gray box trading spread. In one embodiment, the gray box trading spread includes a first trade for a real financial instrument or contract and the second trade includes a trade or synthetic financial instrument or contract.

In FIG. 20B at Step 150, the first application 30 on the target network device 12, 14, 16 receives one or more sets of electronic trading information from one or more electronic trading exchanges 20, 22 including electronic trading information for the manual white box portion 136 of the gray box trading strategy 138 via the communications network 18.

At Step 152, the first application 30 on the target network device 12, 14, 16 displays 77 (FIG. 12), 111 (FIG. 15) in the one or more graphical windows 66, 150 on the GUI 132 the list of one or more electronic trading opportunities for the manual white box portion 136 of the gray box trading strategy 138 created from the received one or more sets of electronic trading information. The one or more electronic trading opportunities are based in part on one the or more electronic trades previously automatically executed for the automatic black box trading portion 134 of the gray box trading entity 132.

In one embodiment, selected ones of the list of one or more electronic trading opportunities and/or the received one or more sets of electronic trading information for the automatic black box portion 134 for gray box trading are displayed in the ABV window 66 or other graphical window (e.g., 150, etc.) in a three dimensional (3D) format 79, 81 (FIG. 12). In one embodiment, the application 30 display a mixture of two-dimensional (2D) or 3D information.

In one embodiment, only the list of one or more electronic trading opportunities for the manual white box portion 136 of the gray box trading strategy 138 is displayed in a graphical window 66, 106, 111 on the application 30. In another embodiment, the list of one or more electronic trading opportunities for the manual white box portion 136 of the gray box trading strategy 138 and the received one or more sets of electronic trading information for the automatic black box trading portion 134 are displayed in a graphical window 66, 106 on the application 30. In another embodiment, only the received one or more sets of electronic trading information for the automatic black box trading portion 134 are displayed in a graphical window 66, 106, 111 on the application 30. However, the present invention is not limited to these display options and more, fewer or other gray box trading display options can also be used to practice the invention.

At Step 154, a second selection input from a selected graphical window 66, 106, 111 on the GUI 32 is received on the first application 30 on the target network device 12, 14, 16 to execute one or more additional electronic trades from the displayed list one or more electronic trading opportunities for the manual white box trading portion 136 of the gray box trading strategy 138.

At Step 156, the first application 30 on the target network device 12, 14, 16 executes the additional one or more electronic trades from the received selection input for the manual white box trading portion 136 for a second portion of the gray box trading strategy 138 on the one or more electronic trading exchanges 20, 22 via the communications network 18.

In one embodiment, the first application 30 on the target network device 12, 14, 16 provides an integrated viewpoint of gray box trading across all trading accounts across all trading exchanges. The integrated viewpoint was discussed above for black box trading.

FIG. 21 is a block diagram illustrating an exemplary gray box electronic trading system 158.

In another embodiment, the automatic black box portion 134 of the gray box trading strategy 138 is sent to a second application 30' on a server network device 24 with one or more processors via the communications network 18 to automatically execute the one or more electronic trades for the automatic black box trading portion 134 of the gray box trading entity 132, thereby making the execution of the one or more electronic trades for the automatic black box trading portion 134 of the gray box trading entity 132 faster and more reliable than executing the one or more electronic trades for the automatic black box trading portion 134 of the gray box trading entity 132 only on the first application 30 on the target network device alone 12, 14, 16. The second application 30' on the server network device 24 automatically executes the one or more electronic trades for the automatic black box trading portion 134 of the gray box trading strategy 138. This embodiment is illustrated in part in FIG. 21.

The first application 30 on the target network device 12, 14, 16 and the second application 30' on the server network device 24 simultaneously receive one or more sets of electronic trading information from one or more electronic trading exchanges 20, 22 including electronic trading information the one or more electronic trades automatically executed for the automatic black box trading portion 134 of the gray box trading strategy 138. The received one or more set of electronic trading information are displayed in the one or more graphical windows 66, 111, 106 on the GUI 32 on the first application 30 on the target network device 12, 14, 16. The execution of electronic trades for the gray box trading entity is thereby split between the first application 30 on the target network device 12, 14, 16 and the second application 30' on the server network device 24.

Automatically executing on the second application 30' on the server network device 24 the one or more electronic trades for the automatic black box trading portion 134 of the gray box trading entity 134 provides fault tolerance against loss of communication between the target network device 12, 14, 16 and the communications network 18 for a portion of electronic trading for the gray box trading entity 132. The execution of the automatic and manual trades can also be reversed between the server network device 24 and the target network device 12, 14, 16 thereby providing another type of fault tolerance.

In another embodiment, both the automatic black box portion 134 and the manual white box portion 136 of the gray box trading strategy 138 is sent to a second application 30' on a server network device 24 with one or more processors via the communications network 18 to manually execute the one or more electronic trades for the manual white box trading portion 136 and one or more automatic trades for the automatic black box trading portion 134 of the gray box trading entity 132. Such an embodiment may be used by commodity brokers or other types of brokers.

In another embodiment, the manual white box portion 136 of the gray box trading strategy 138 is sent to a second application 30' on a server network device 24 with one or more processors via the communications network 18 to manually execute the one or more electronic trades for the manual white box trading portion 136 of the gray box trading entity 132. The black box portion 134 of the gray box trading strategy 138 is sent to two or more target network devices 12, 14. In such an embodiment, the two or more target network devices 12, 14, etc. are used to provide an ad hoc parallel processing platform for gray box electronic trading. In such an embodiment, one or more electronic trades may be executed on each of the two or more target network devices 12, 14. Such an embodiment may be used by commodity brokers or other types of brokers to execute gray box trading strategies 138. Such an embodiment, may also be used by an individual trader with access to a server network device 24 (e.g., through a broker, etc.) who has plural network devices 12, 16, 16 the individual electronic trader can simultaneously connect to the communications network 18.

In these embodiments in which the manual white box portion 136 is used on the server network device 24, the second application 30 on the server network device 24 includes at least an ABV window 66 with a dynamic price column 68 used for electronic trading as was described above or other graphical windows described above 106, etc. Such an embodiment may be used by one or more types of brokers to execute one or more electronic trades for groups of traders, groups of accounts, individual accounts, etc. Various other combinations are also possible to practice gray box trading.

In other embodiments, various portions of the manual white box portion 136 and/or the automatic black box trading portion 134 can be allocated on the target network device 12, 14, 16, the server network device 24 and/or a combination thereof of the target and server network devices. In such embodiments, the portions allocated to the white box portion 136 and the black box portion 134 and/or to the target network device 12, 14, 16 and/or to the server network device 24 are selectable by an electronic trader based on trader preferences for gray box electronic trading.

The methods and system described herein include a gray box trading entity that includes a black box portion (automatic trade execution) and a white box portion (manual trade execution). An electronic trader selects trades for black box and white box trades in the gray box trading entity. The trades can be dynamically changed. Selected trades for gray box trading entity are automatically traded with a black box trading entity on one or more electronic trading exchanges while a trader is prompted to manually execute selected other trades for the gray box trading entity with a white box trading entity.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A method for automatically executing a gray box trading entity, comprising:
    creating the gray box trading entity including an automatic black box trading portion and a manual white box trading portion on a first application on a target network device with one or more processors;
    creating a gray box trading strategy on the first application on the target network device to automatically execute one or more electronic trades for the automatic black box trading portion of the gray box trading entity on one or more electronic trading exchanges and automatically and simultaneously display a list of one or more other electronic trading opportunities for the manual white box trading portion of the gray box trading entity in one or more graphical windows on a graphical user interface (GUI) with a plurality of graphical windows used for electronic trading on the first application;
    receiving on the first application on the target network device a first selection input including a list of specific electronic trades or trading strategies to execute for the automatic black box trading portion and the manual white box trading portion of the gray box trading entity;
    automatically executing on the first application on the target network device one or more electronic trades for a first portion of the gray box trading strategy on the automatic black box trading portion on the one or more electronic trading exchanges via a communications network;
    receiving on the first application on the target network device one or more sets of electronic trading information from one or more electronic trading exchanges including electronic trading information for the manual white box portion of the gray box trading entity via the communications network;
    displaying in the one or more graphical windows on the GUI on the first application on the target network device the list of one or more electronic trading opportunities for the manual white box portion of the gray box trading entity created from the received one or more sets of electronic trading information, wherein the list of one or more electronic trading opportunities is based in part on one the or more electronic trades previously automatically executed for the automatic black box trading portion of the gray box trading strategy;
    receiving a second selection input from a selected graphical window on the GUI on the first application on the target network device to execute one or more additional electronic trades from the displayed list of one or more electronic trading opportunities for the manual white box trading portion of the gray box trading strategy; and
    executing on the first application on the target network device the additional one or more electronic trades from the received selection input for the manual white box trading portion for a second portion of the gray box trading strategy on the one or more electronic trading exchanges via the communications network.

2. The method of claim 1 wherein the gray box trading entity includes one or more real or synthetic trading entities created from two or more selected real or synthetic financial instruments.

3. The method of claim 1 wherein the gray box trading entity includes a gray box trading entity created from two or more selected real or synthetic financial or commodity futures contracts.

4. The method of claim 1 wherein the gray box trading entity includes a configurable slippage factor portion to execute an alternative real or synthetic trade if a primary real or synthetic trade is missed or execute within a pre-determined slippage range of trading prices.

5. The method of claim 1 wherein the gray box trading strategies and trading strategies for the automatic black box portion and manual white box portion include if-then trading strategies, one-cancels-other (OCO), market-on-open (MOO), market-on-close (MCO), block trading, good-til-canceled (GTC), good-til-date (GTD), fill-and-kill (FAK), fill-or-kill (FOK), Iceberg, multi-leg spread, over-the-counter (OTC) or yield curve, trading strategies or a combination thereof.

6. The method of claim 1 wherein the one or more electronic trades for the automatic black box trading portion of the gray box trading entity include a first leg of a and a second leg of a gray box trading spread.

7. The method of claim 6 wherein the gray box trading spread includes a intra-commodity spread, inter-commodity spread, butterfly spread, back spread, vertical spread, horizontal spread, ratio spread, synthetic spread or an inter-exchange gray box trading spread.

8. The method of claim 7 wherein gray box trading spread includes a first trade for a real financial instrument or contract and the second trade includes a trade or synthetic financial instrument or contract.

9. The method of claim 1 wherein selected ones of the list of one or more electronic trading opportunities for the manual white box portion of the gray box trading entity are displayed in the one or more graphical windows in a three dimensional (3D) format.

10. The method of claim 1 wherein the first application on the target network device provide an integrated viewpoint of gray box trading across all trading accounts across all trading exchanges.

11. The method of claim 1 further comprising:
sending the automatic black box portion of the gray box trading strategy to a second application on a server network device with one or more processors via the communications network to automatically execute the one or more electronic trades for the automatic black box trading portion of the gray box trading entity, thereby making the execution of the one or more electronic trades for the automatic black box trading portion of the gray box trading entity faster and more reliable than executing the one or more electronic trades for the automatic black box trading portion of the gray box trading entity only on the first application on the target network device alone;
automatically executing on the second application on the server network device the one or more electronic trades for the automatic black box trading portion of the gray box trading entity; and
receiving simultaneously on the first application on the target network device and on the second application on the server network device one or more sets of electronic trading information from one or more electronic trading exchanges including electronic trading information the one or more electronic trades automatically executed for the automatic black box trading portion of the gray box trading entity, wherein the received one or more set of electronic trading information are displayed in the one or more graphical windows on the GUI on the first application on the target network device, and thereby splitting execution of electronic trades for the gray box trading entity between the first application on the target network device and the second application on the server network device.

12. The method of claim 10 wherein the second application on the server network device includes on a aggregate book view/ask bid volume (ABV) window with a dynamic price column on a graphical user interface with a plurality of graphical windows used for electronic trading.

13. The method of claim 10 wherein the step of automatically executing on the second application on the server network device the one or more electronic trades for the automatic black box trading portion of the gray box trading entity provides fault tolerance for a portion of electronic trading against loss of communication between the target network device and the communications network for electronic trading for the gray box trading entity.

14. The method of claim 1 further comprising:
displaying in an aggregate book view/ask bid volume (ABV) window on the GUI on the first application on the target network device the list of one or more electronic trading opportunities for the manual white box portion of the gray box trading strategy, wherein the list of one or more electronic trading opportunities are based in part on one the or more electronic trades previously automatically executed for the automatic black box trading portion of the gray box trading strategy;
displaying automatically in a ABV window on the first application a bid size and bid offer by price in a market depth format the list of one or more electronic trading opportunities for the manual white box portion of the gray box trading strategy and displaying prices in a dynamic price column in the ABV window, wherein the ABV window includes an order entry mode for entering a trade near, or away from a current last traded price, wherein the ABV window allows entering and canceling of electronic trading orders and automatically sending electronic trading orders entered into the ABV window at a selected price to the one or more electronic trading exchanges;
automatically and dynamically re-centering the dynamic price column in the ABV window upon a current last traded price that continuously and dynamically changes with price fluctuations in the current last traded price;
receiving a selection input from the ABV window to execute one or more additional electronic trades from the displayed list one or more electronic trading opportunities for the manual white box trading portion of the gray box trading strategy; and
requesting from the ABV window on the first application on the target network device the execution of one or more additional electronic trades for the manual white box portion of the gray box trading strategy on the one or more electronic trading exchanges, wherein the one or more additional electronic trades are sent by the ABV window via the communications network for execution on the one or more electronic trading exchanges.

15. The method of claim 14 further comprising:
displaying in the ABV window on the GUI on the first application on the target network device the received one or more sets of electronic trading information from one or more electronic trading exchanges including electronic trading information from the one or more electronic trades automatically executed for the automatic black box trading portion of the gray box trading entity
displaying automatically in a ABV window on the first application a bid size and bid offer by price in a market depth format received one or more sets of electronic trading information and displaying prices in a dynamic price column in the ABV window, wherein the ABV window includes an order entry mode for entering a trade near, or away from a current last traded price, wherein the ABV window allows entering and canceling of electronic trading orders and automatically sending electronic trading orders entered into the ABV window at a selected price to the one or more electronic trading exchanges; and
automatically and dynamically re-centering the dynamic price column in the ABV window upon a current last traded price that continuously and dynamically changes with price fluctuations in the current last traded price.

16. The method of claim 1 wherein the communications network includes fourth generation (4G) communications including Worldwide Interoperability for Microwave Access (WiMAX) 4G communications.

* * * * *